(12) United States Patent
Johnson

(10) Patent No.: US 12,545,454 B2
(45) Date of Patent: *Feb. 10, 2026

(54) APPARATUS FOR BAGGING A BALE AND METHOD OF BAGGING SUCH BALE

(71) Applicant: Langston Companies, Inc., Memphis, TN (US)

(72) Inventor: Stacy Johnson, Roscoe, TX (US)

(73) Assignee: LANGSTON COMPANIES, INC., Memphis, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/307,237

(22) Filed: Apr. 26, 2023

(65) Prior Publication Data

US 2023/0257143 A1 Aug. 17, 2023

Related U.S. Application Data

(63) Continuation of application No. 17/172,754, filed on Feb. 10, 2021, now Pat. No. 11,667,419, which is a
(Continued)

(51) Int. Cl.
*B65B 27/12* (2006.01)
*A01F 25/14* (2006.01)
(Continued)

(52) U.S. Cl.
CPC ............ *B65B 27/125* (2013.01); *A01F 25/14* (2013.01); *B65B 5/045* (2013.01); *B65B 7/02* (2013.01);
(Continued)

(58) Field of Classification Search
CPC ....... B65B 5/045; B65B 61/28; B65B 43/465; B65B 35/20; B65B 7/02; B65B 25/02; B65B 27/125; B65B 51/062; A01F 25/14
See application file for complete search history.

(56) References Cited

U.S. PATENT DOCUMENTS 2,751,134 A 6/1956 Walldow
3,078,633 A 2/1963 Strömberg et al.
(Continued)

FOREIGN PATENT DOCUMENTS

EP 0 340 380 B1 5/1992

OTHER PUBLICATIONS

International Search Report for corresponding PCT Application No. PCT/IB2013/000993 dated Feb. 7, 2014.

*Primary Examiner* — Thomas M Wittenschlaeger
(74) *Attorney, Agent, or Firm* — Workman Nydegger

(57) ABSTRACT

A bale bagging apparatus and method are provided. The bale bagging apparatus includes a bale feeding station, a bale chute, a bale bagging station, and a transportation system that transports a bale to be bagged from the bale feeding station through the bale chute and into the bale bagging station. The bale bagging station includes a bag receptacle, a first opening, and a bag retrieval assembly. The bag receptacle is positioned on a side opposite of the first opening from the side of the first opening on which the bale to be bagged is to be transported. The bag retrieval assembly retrieves a bag from the bag receptacle through the first opening. The bag retrieval assembly positions a first end of said bag around at least a portion of the bale chute before the bale to be bagged is transported through the bale chute by the transportation system.

27 Claims, 48 Drawing Sheets

Related U.S. Application Data continuation of application No. 16/417,108, filed on May 20, 2019, now Pat. No. 10,926,903, which is a continuation-in-part of application No. 15/083,013, filed on Mar. 28, 2016, now Pat. No. 10,292,337.

(60) Provisional application No. 62/139,605, filed on Mar. 27, 2015.

(51) Int. Cl.
| | | |
|---|---|---|
| *B65B 5/04* | (2006.01) | |
| *B65B 7/02* | (2006.01) | |
| *B65B 25/02* | (2006.01) | |
| *B65B 35/20* | (2006.01) | |
| *B65B 43/46* | (2006.01) | |
| *B65B 51/06* | (2006.01) | |
| *B65B 61/28* | (2006.01) | |

(52) U.S. Cl.
CPC .............. *B65B 25/02* (2013.01); *B65B 35/20* (2013.01); *B65B 43/465* (2013.01); *B65B 51/062* (2013.01); *B65B 61/28* (2013.01)

(56) References Cited

U.S. PATENT DOCUMENTS

| | | | |
|---|---|---|---|
| 3,206,913 | A | 9/1965 | Fleigher et al. |
| 3,228,173 | A | 1/1966 | Reynolds |
| 3,287,882 | A | 11/1966 | Smith |
| 3,490,195 | A | 1/1970 | Abramson |
| 3,503,180 | A | 3/1970 | Myles et al. |
| 3,508,379 | A | 4/1970 | Noyes et al. |
| 3,538,671 | A | 11/1970 | Wallace |
| 3,540,179 | A | 11/1970 | Watts, Jr. |
| 3,584,435 | A | 6/1971 | Grasvoll et al. |
| 3,628,720 | A | 12/1971 | Schmedding |
| 3,868,807 | A | 3/1975 | Noyes et al. |
| 3,948,015 | A | 4/1976 | Lerner |
| 4,047,362 | A | 9/1977 | Lister et al. |
| 4,241,562 | A | 12/1980 | Meyer |
| 4,300,327 | A | 11/1981 | Bridger |
| 4,370,845 | A | 2/1983 | Perolls et al. |
| 4,385,722 | A | 5/1983 | Brewill |
| 4,586,318 | A | 5/1986 | Litt et al. |
| 4,590,747 | A | 5/1986 | Schjeldahl |
| 4,730,437 | A | 3/1988 | Benno |
| 4,805,381 | A | 2/1989 | Hannon |
| 5,099,736 | A | 3/1992 | Evers |
| 5,226,735 | A | 7/1993 | Beliveau |
| 5,442,898 | A | 8/1995 | Gabree et al. |
| 5,551,215 | A | 9/1996 | McDonald et al. |
| 6,045,838 | A | 4/2000 | Davis et al. |
| 6,131,733 | A | 10/2000 | Ergle et al. |
| 6,318,894 | B1 | 11/2001 | Derenthal |
| 6,394,727 | B1 | 5/2002 | Lundberg |
| 6,457,863 | B1 | 10/2002 | Vassallo |
| 6,659,644 | B2 | 12/2003 | Gebhardt |
| 6,672,038 | B2 | 1/2004 | McGrane et al. |
| 6,895,726 | B2 | 5/2005 | Pinto et al. |
| 7,013,625 | B2 | 3/2006 | Curles |
| 7,134,256 | B2 | 11/2006 | Kujubu et al. |
| 7,448,185 | B2 | 11/2008 | Zeedyk et al. |
| 7,497,622 | B2 | 3/2009 | Kozak |
| 7,665,278 | B2 | 2/2010 | Griggs et al. |
| 7,861,500 | B2 | 1/2011 | Bennett |
| 7,891,156 | B2 | 2/2011 | Beer |
| 7,987,651 | B2 | 8/2011 | Beeland et al. |
| 9,617,021 | B2 | 4/2017 | Mccorkle et al. |
| 10,292,337 | B2 * | 5/2019 | Johnson .................. B65B 51/10 |
| 11,667,419 | B2 * | 6/2023 | Johnson .................... B65B 7/02 53/459 |
| 2002/0112452 | A1 | 8/2002 | Desmedt |
| 2002/0134702 | A1 | 9/2002 | Desmedt et al. |
| 2002/0170274 | A1 | 11/2002 | Huseman |
| 2003/0230052 | A1 | 12/2003 | Rabiea |
| 2004/0035087 | A1 | 2/2004 | Kujubu et al. |
| 2004/0216431 | A1 | 11/2004 | Curles |
| 2005/0022467 | A1 | 2/2005 | Kujubu et al. |
| 2005/0047685 | A1 | 3/2005 | Tsutsumi |
| 2005/0229547 | A1 | 10/2005 | Koke |
| 2009/0188332 | A1* | 7/2009 | Actis .................... B65B 43/267 73/864.31 |
| 2009/0241474 | A1* | 10/2009 | Actis ...................... B65B 39/12 53/469 |
| 2009/0241487 | A1 | 10/2009 | Actis |
| 2010/0126118 | A1 | 5/2010 | Actis |
| 2010/0146908 | A1 | 6/2010 | Honegger |
| 2011/0041459 | A1 | 2/2011 | Kivela |
| 2011/0094396 | A1 | 4/2011 | Borrelli et al. |
| 2011/0209439 | A1 | 9/2011 | Actis |
| 2012/0208686 | A1 | 8/2012 | Iwasa et al. |
| 2013/0291485 | A1* | 11/2013 | McCorkle ............... B65B 39/02 53/473 |
| 2014/0041339 | A1 | 2/2014 | Borrelli |
| 2014/0174209 | A1 | 6/2014 | Hart et al. |
| 2014/0360135 | A1 | 12/2014 | Honegger |
| 2014/0360138 | A1 | 12/2014 | Honegger |
| 2015/0329228 | A1 | 11/2015 | Spatafora |

\* cited by examiner

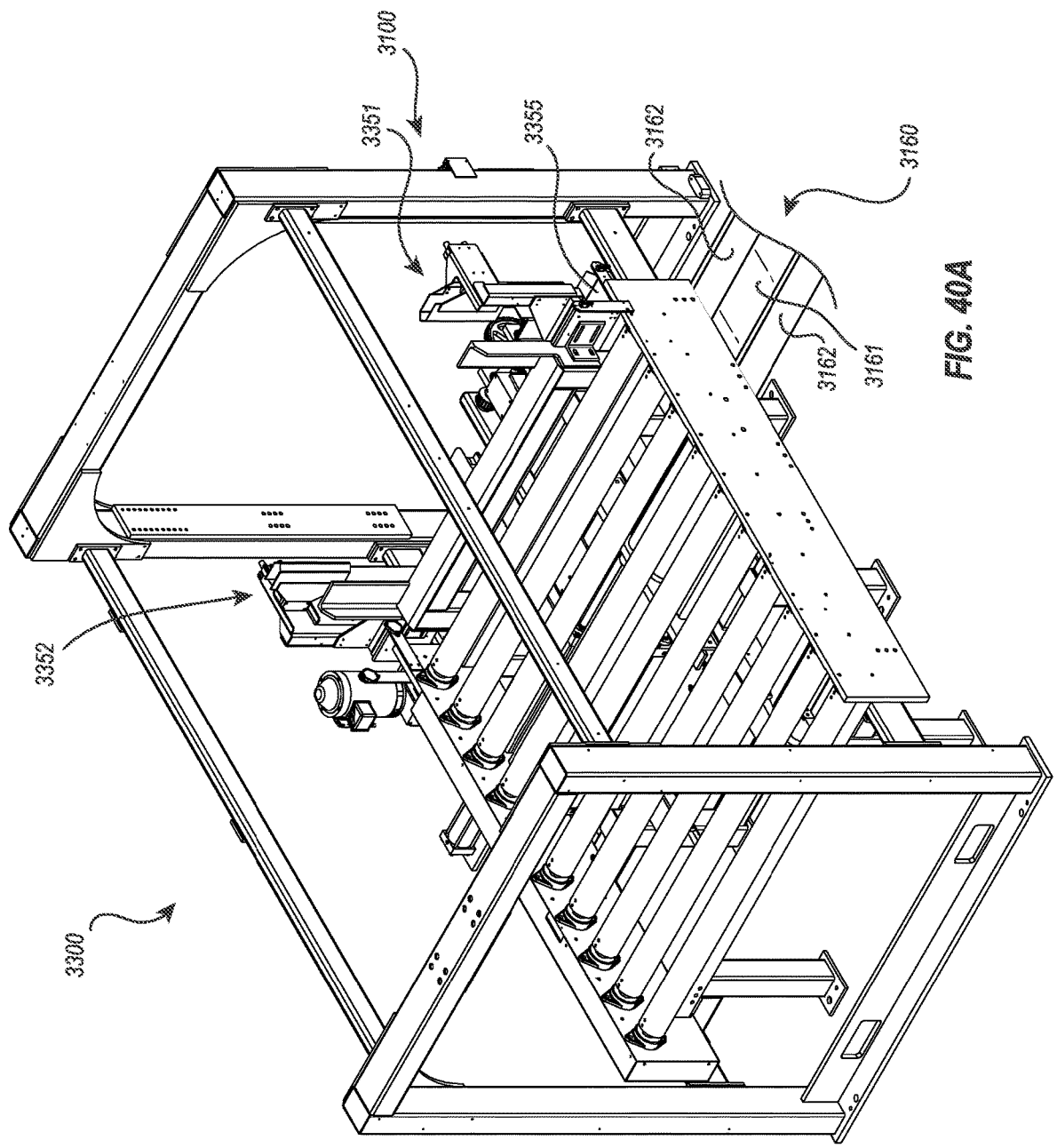

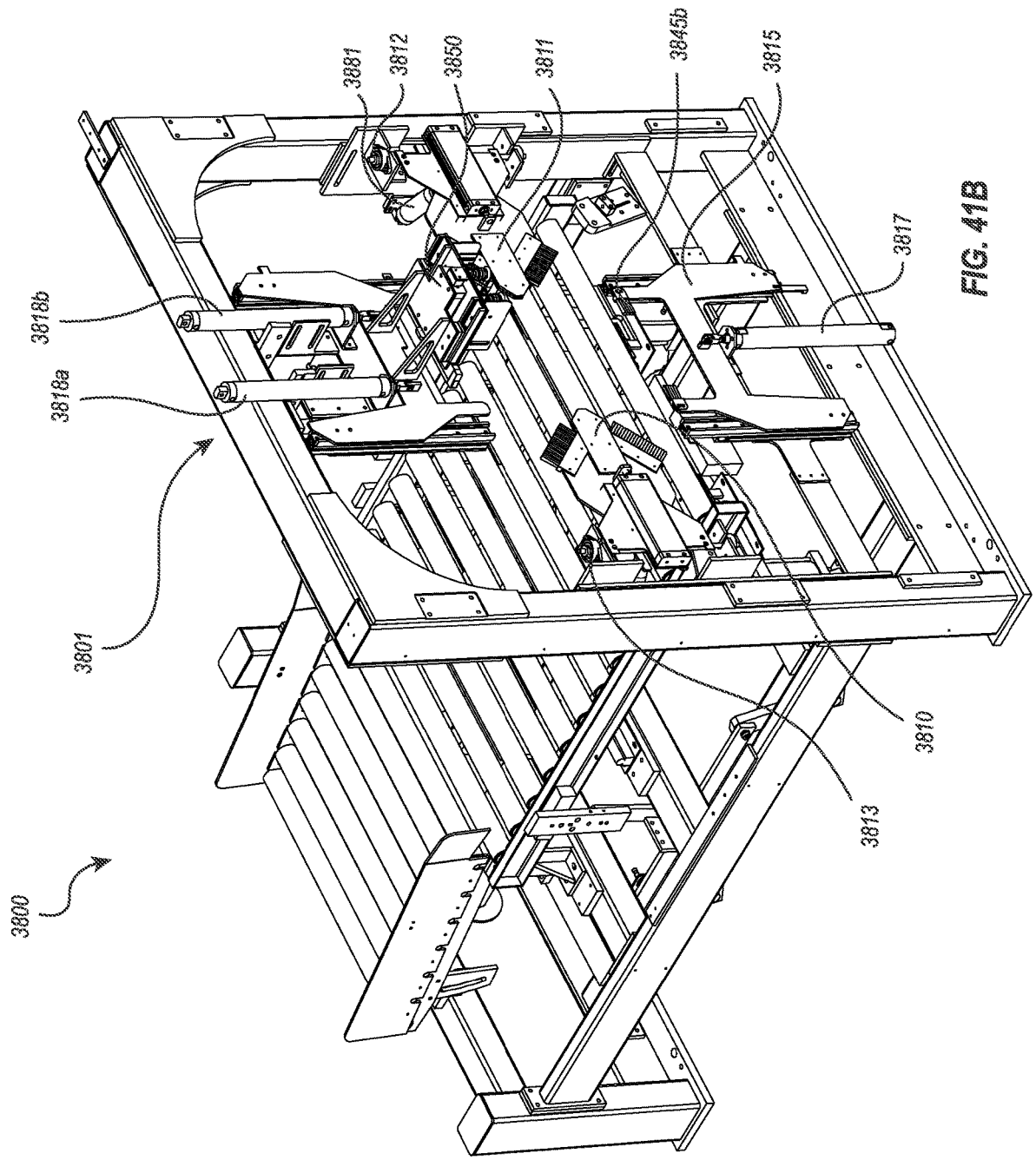

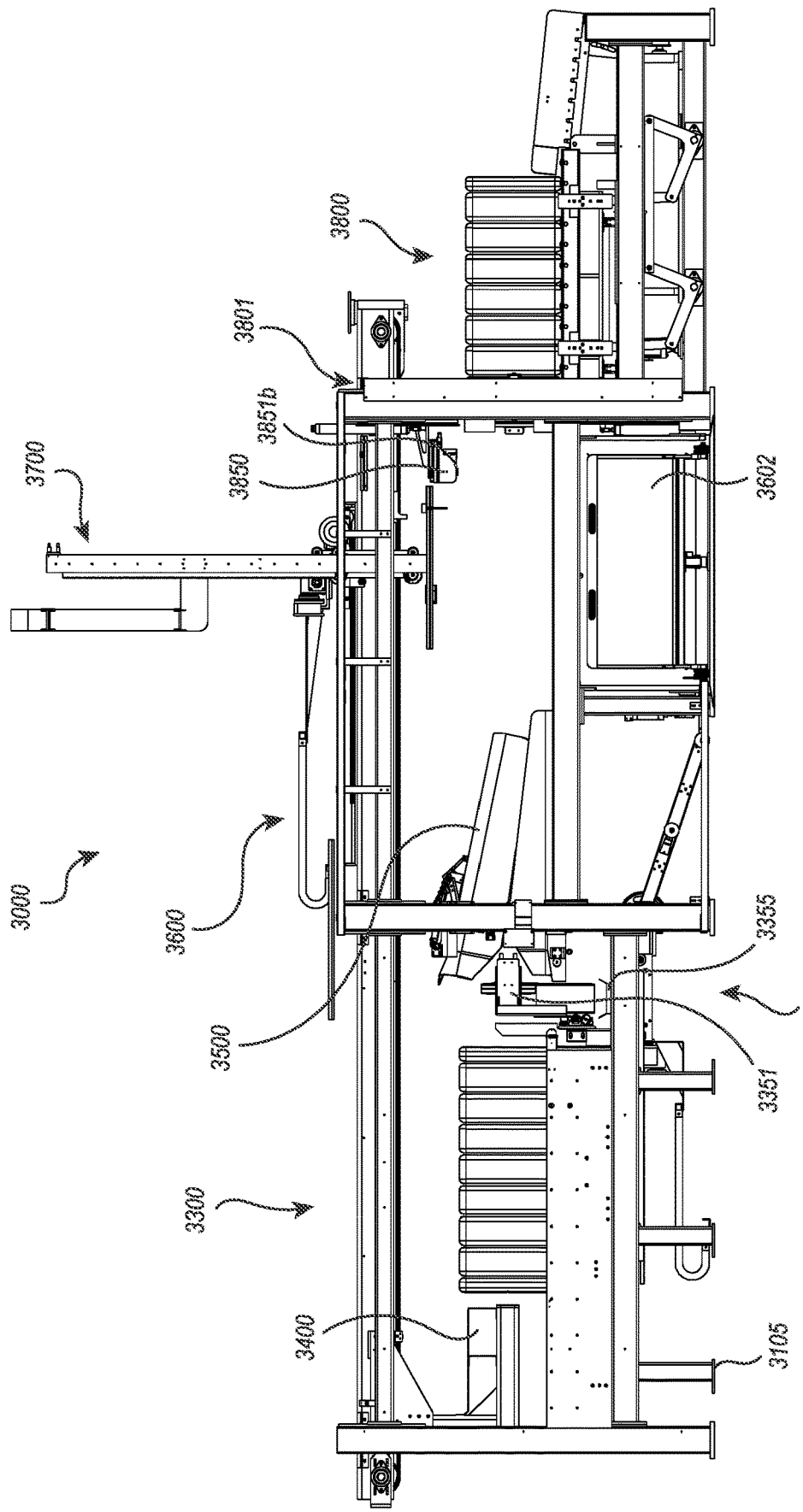

APPARATUS FOR BAGGING A BALE AND METHOD OF BAGGING SUCH BALE

CROSS REFERENCE

This application is a continuation of U.S. non-provisional application Ser. No. 17/172,754, filed Feb. 10, 2021, which is a continuation of U.S. non-provisional application Ser. No. 16/417,108, filed May 20, 2019, now U.S. Pat. No. 10,926,903, which is a continuation-in-part of U.S. non-provisional application Ser. No. 15/083,013, filed Mar. 28, 2016, now U.S. Pat. No. 10,292,337, which claims the benefit of U.S. provisional application No. 62/139,605, filed Mar. 27, 2015, both of which are incorporated herein by reference in their entirety.

FIELD

The present disclosure relates to an apparatus for bagging a bale of fibrous material and method of bagging such bale.

SUMMARY

The present disclosure describes a bale bagging apparatus that includes a bale feeding station, a bale bagging station, and a sealing module, provided in that order along an axis of the bale bagging apparatus. The bale bagging apparatus further comprises a bale pusher assembly configured to push a bale to be bagged through the bale feeding station, the bale bagging station, and the sealing module. The bale bagging station includes a bale chute through which the bale to be bagged is pushed, a bag receptacle provided below a bale-bag gate, the bale-bag gate being configured to support the bale to be bagged when the bale to be bagged is pushed over the bale-bag gate, while the bale-bag gate is opening when not supporting a bale to be bagged to allow a bag retrieval assembly to retrieve a bag from the bag receptacle.

The present disclosure also describes an embodiment of a bagging apparatus for bales of compressed material, such as cotton, having a base frame parallel to a longitudinal feed direction, a conveyor system coupled to the base frame, a bale feeding station at one end of the base frame member, a bale chute coupled to the base frame downstream of the bale feeding station along the longitudinal feed direction, a bagging station coupled to the base frame member between the first and second ends after the bale chute, a gantry having a gantry beam coupled to top sections of vertical supports parallel the longitudinal feed direction between the first and second ends of the base frame member, a bale pusher having a driving mechanism coupled to the base frame arranged to move in the longitudinal feed direction, and a sealing module located at the second end of the base frame member and a method for bagging thereof.

The resulting bale bagging apparatus has a simple construction for easy installation that allows the efficient and easy placement of a bag around the bag chute for bagging a bale.

In accordance with the structure of the described embodiment, the bagging station is located downstream of the bale chute along the longitudinal feed direction between the first and second ends of the base frame member. The bagging station has a gantry and the second section and gap section of the conveyor system, where the at least one gap section is provided between second and third sections of the conveyor system in the bagging station. The gantry has at least two vertical supports having top sections, a gantry beam having ends coupled to the top sections of the two vertical supports, a track coupled to the gantry beam, and a retrieval device movably coupled to the gantry beam. The vertical supports are positioned transversely from the base frame member so that the gantry and retrieval assembly is positionable along the longitudinal feed direction and second gap section.

The retrieval assembly is configured to pick-up an open end of the bag from a pallet of bags so that a closed end of the bag hangs downwardly. The retrieval device can then move from a first position to a second position, where the second position is a position where the closed end of the bag is aligned perpendicularly to the longitudinal feed direction to the at least one gap section. After which, the retrieval device moves in a direction transverse to the longitudinal feed direction so that the closed end of the bag is positioned in the at least one gap section. The open end of the bag can then be moved in the longitudinal direction forwardly towards the bag chute to position the open end of the bag around the bale chute.

This inventive structure allows the straightening of the bag for placement of the bag around the bale chute in a compact, efficient arrangement. By straightening the length of the bag, the bag is better positioned to receive the bale fed into the bale chute using a simple and easy to install structure.

Additionally, the second section of the conveyor system can comprise rollers inclined outwardly and upwardly from a center position of the second section. By inclining the rollers, the bagged bale fed from the bale chute only contacts the rollers of the second section of the conveyor system along corners of the bale. Since the corners of the bale are mostly cotton and the bottom surface of the bale does not directly contact the rollers, damage to the bag from the bailing wire or other hard surfaces is mitigated. Additionally, there is lower frictional resistance for bagging the bale.

According to another embodiment, a bale bagging apparatus is provided. The bale bagging apparatus includes a bale feeding station, a bale chute, a bale bagging station, and a transportation system that transports a bale to be bagged from the bale feeding station through the bale chute and into the bale bagging station. The bale bagging station includes a bag receptacle, a first opening, and a bag retrieval assembly. The first opening is defined by a first rail and a second rail. The bag receptacle is positioned on a side opposite of the first opening from the side of the first opening on which the bale to be bagged is to be transported. The bag retrieval assembly retrieves a bag from the bag receptacle through the first opening. The bag retrieval assembly positions a first end of said bag around at least a portion of the bale chute before the bale to be bagged is transported through the bale chute by the transportation system.

According to another embodiment, a method of bagging a bale is provided. A bale to be bagged is received at a feeding station. A bag is retrieved from a bag receptacle through a first opening. The first opening is defined by a first rail and a second rail. The bag receptacle is positioned on a side opposite of the first opening from the side of the first opening on which the bale to be bagged is to be transported. A first end of the bag is positioned around at least a portion of said chute. The bale to be bagged is transported through said bale chute and is thereby placed within said bag.

The numerous advantages, features and functions of the various embodiments of the disclosure will become readily apparent and better understood in view of the following description and accompanying drawings. The following description is not intended to limit the scope of the apparatus for bagging a cotton bale, but instead merely provides exemplary embodiments for ease of understanding. Although a cotton bale is described in some of the embodiments described herein, bales or bundles or any finished or unfinished material may be bound and bagged according to the various examples and embodiments described herein.

BRIEF DESCRIPTION OF THE DRAWINGS

Examples of a cotton bale bagging apparatus according to different embodiments of the disclosure will now be explained in more detail with reference to the drawings, wherein:

FIG. 40A shows a perspective view of another embodiment of a bale sampling station.

FIG. 41B shows a left perspective view of a closer assembly according to another embodiment.

FIG. 46C illustrates right-side profile view of the bale bagging apparatus according to the embodiment of FIG. 46A.

Figure 1:
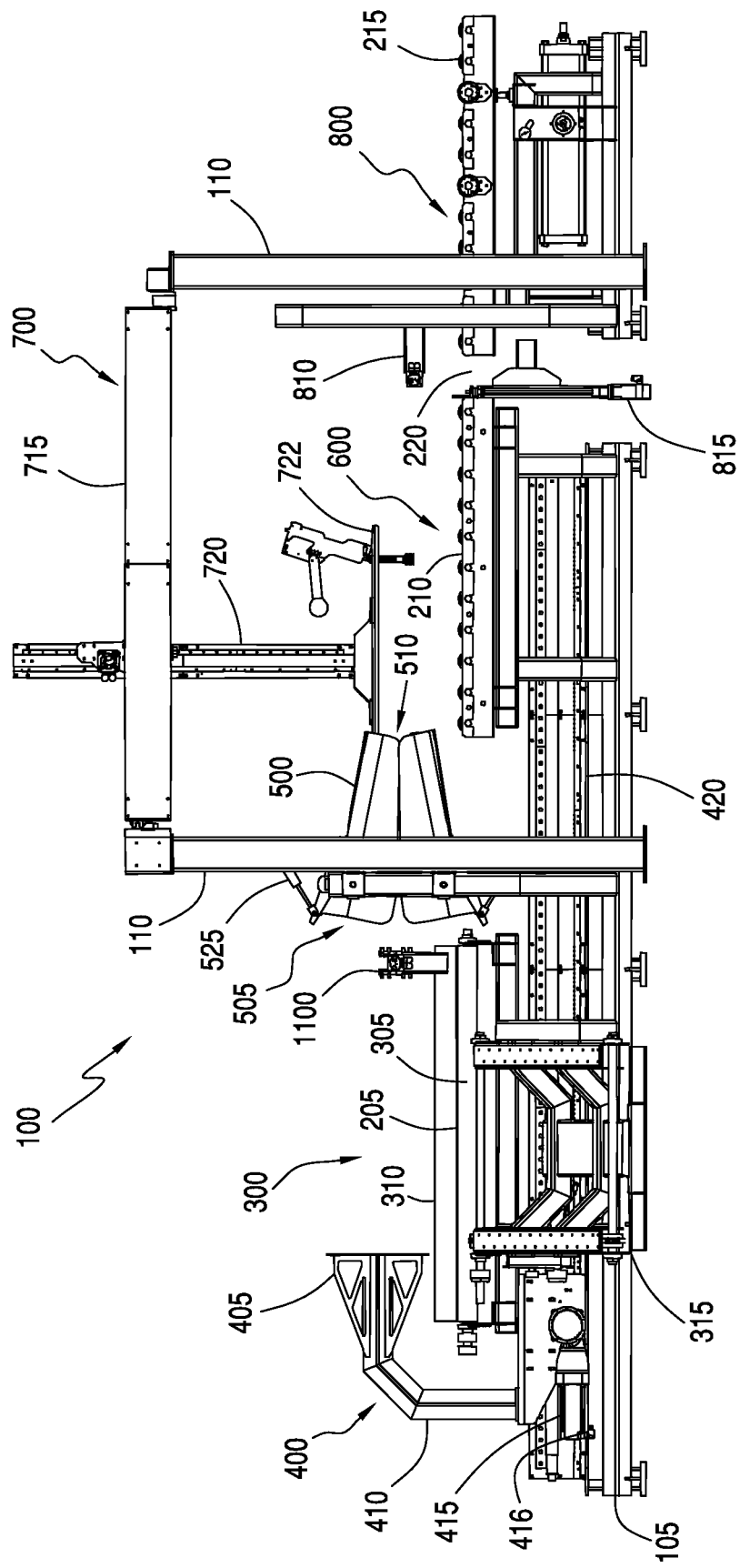
FIG. 1 shows a right side view of a bale bagging apparatus according to an embodiment showing a bale feeding station, a bale pusher, a bale chute, a gantry, a bale bagging station, a sealing module, and a conveyor system for transporting a bale along the bale bagging apparatus along a longitudinal feed direction.

In the various figures, similar elements are provided with similar reference numbers. It should be noted that the drawing figures are not necessarily drawn to any scale, or proportion, but instead are drawn to provide an understanding of the method according to the disclosure and the resulting piston form and components. Thus, the illustrations are not intended to be limiting as to the scope of the disclosure described herein, but rather to provide exemplary illustrations thereof.

DETAILED DESCRIPTION

A. Discussion of Various First Embodiments

As generally discussed above, known bale bagging systems have complicated designs involving multiple separate modules and steps including various moving mechanical parts and complex structures that require careful maintenance and that are prone to malfunction. Mechanical systems and modules of known bagging systems are often open and thus more dangerous to operate and due to the various separate and isolated modules of the process have a large physical footprint in a cotton bale processing plant. To overcome this shortcoming, the embodiments in the present disclosure were developed to create an easy to install cotton bale bagging machine that is simpler to manufacture efficiently and commercially practical. The bale bagging system described herein is also much safer and compact, having a much smaller footprint.

For example, as seen in FIG. 1, one embodiment of the cotton bale bagging machine 100 includes a bale feeding station 300 on a first end of the cotton bale bagging machine 100, a sealing module 800 on a second end of the cotton bale bagging machine 100, a bale chute 500, a gantry 700, and a bale bagging station 600 between the first and second ends of the bale bagging machine 100, and a conveyor system 200 that is coupled to the bale feeding station 300, sealing module 800, and bale bagging station 600 in a way such that the conveyor system 200 is used to transfer a bale, e.g., cotton bale, in a longitudinal and linear feed direction from the bale feeding station 300 to the sealing module 800.

The cotton bale bagging machine 100 also has a base and a bottom frame member 105 at the base of the bale bagging machine 100 that runs substantially linearly in the longitudinal direction to support the bale feeding station 300, the bale chute 500, the scaling module 800 and the conveyor system 200. One end of the bottom frame member 105 is positioned near the bale feeding station 300, while the second end is positioned near either the sealing module 800 or near the bale bagging station 600. When the second end of the bottom frame member 105 is positioned near the bale bagging station 600, the bottom frame member 105 further comprises a second section for supporting the sealing module 800.

The bottom frame member 105 has a solid or hollow beam and/or at least two linear bars or beams to create a frame that has the linear bars or beams positioned parallel to the longitudinal feed direction and connected transversely by feet for supporting the base. The bottom frame member 105 is made from steel, ferrous alloys, composite materials, or other material that can be used to support the stations and bale during the bale bagging operation.

Additionally, the bale bagging machine 100 has at least two vertical supports 110 for supporting the gantry 700 between the first and second ends of the bale bagging machine 100. Preferably, four vertical supports 110 are used for supporting the gantry 700, so that the gantry 700 is movable in longitudinal, transverse, and vertical directions with respect to the longitudinal feed direction. The four vertical supports 110 are positioned transversely on outer sides of the bottom base frame 105, where one end of each of the supports 110 is located near the base of the bale bagging machine 100 and the second end of the support 110 is located above the conveyor system 200.

This efficient design for a bale bagging machine 100 uses a conveyor system 200 comprising at least a first section 205, a second section 210, a third section 215, and a gap section 220. The first section 205 of the conveyor system 200 is located at the first end of the bale bagging machine 100 near the bale feeding station 300, while the second section 210 is located at the bale bagging station 600 after the bale chute 500, and the third section 215 is located near the sealing module 800 at the second end of the bale bagging machine 100. The gap section 220 is located between the second section 210 and the third section 215 and has a gap distance greater than the thickness of a bag used for bagging the bale, e.g., a gap distance greater than at least 6 inches.

The conveyor system 200 uses conventional conveyors known in the art. For example, rollers are used which are rotatably coupled to a frame or tray. The rotating rollers can then be used as a guiding mechanism to help move the bale in the desired directions by having the rollers rotate in the transverse and longitudinal directions. The rotating rollers can be made from Teflon, plastic, metal, or other material that facilitates the movement of the bale along the bale bagging machine 100. Additionally, the conveyor system 200 can also use belts, chains, and/or other driving mechanisms to move the bale in the longitudinal and transverse directions.

The embodiment of the bale bagging machine 100 as seen in FIGS. 1-5 will be described in greater detail below.

As further seen in FIGS. 1-4, the bale feeding station 300 includes a bale receiver 305, a staging device 310 located at the first end of the bale bagging machine 100, and the first section 205 of the conveyor system 200. The bale feeding station 300 is coupled to the first end of the bottom frame member 105 along vertical beams coupled to the bottom frame member 105.

The bale receiver 305 is an opening along the first section 205 that is used to receive a bale from a bale feeder 315 connected to the first end of the bottom frame member 105. The bale feeder 315 uses an inclined drag chain conveyor, guided or non-guided motorized or actuated transfer cart, carriages, slides, or other device to move the bale from a floor or input bale feed to the bale receiver 305. The bale feeder 315 may be coupled to the bale feeding station 300 or to the bottom frame member 105 to allow the feeding of the bale in a transverse direction with respect to the longitudinal feed direction or in the same direction as the longitudinal feed direction.

The first section 205 uses transverse rotating rollers 206 coupled to a frame using pins or other fastening devices to allow the rollers to rotate in a transverse direction with respect to the longitudinal feed direction. By having the transverse rotating rollers 206 rotate in the transverse direction, the bale fed through the bale receiver 305 can continue to move transversely onto the first section 205 of the conveyor system 200 for the simple staging of the bale.

Figure 2:
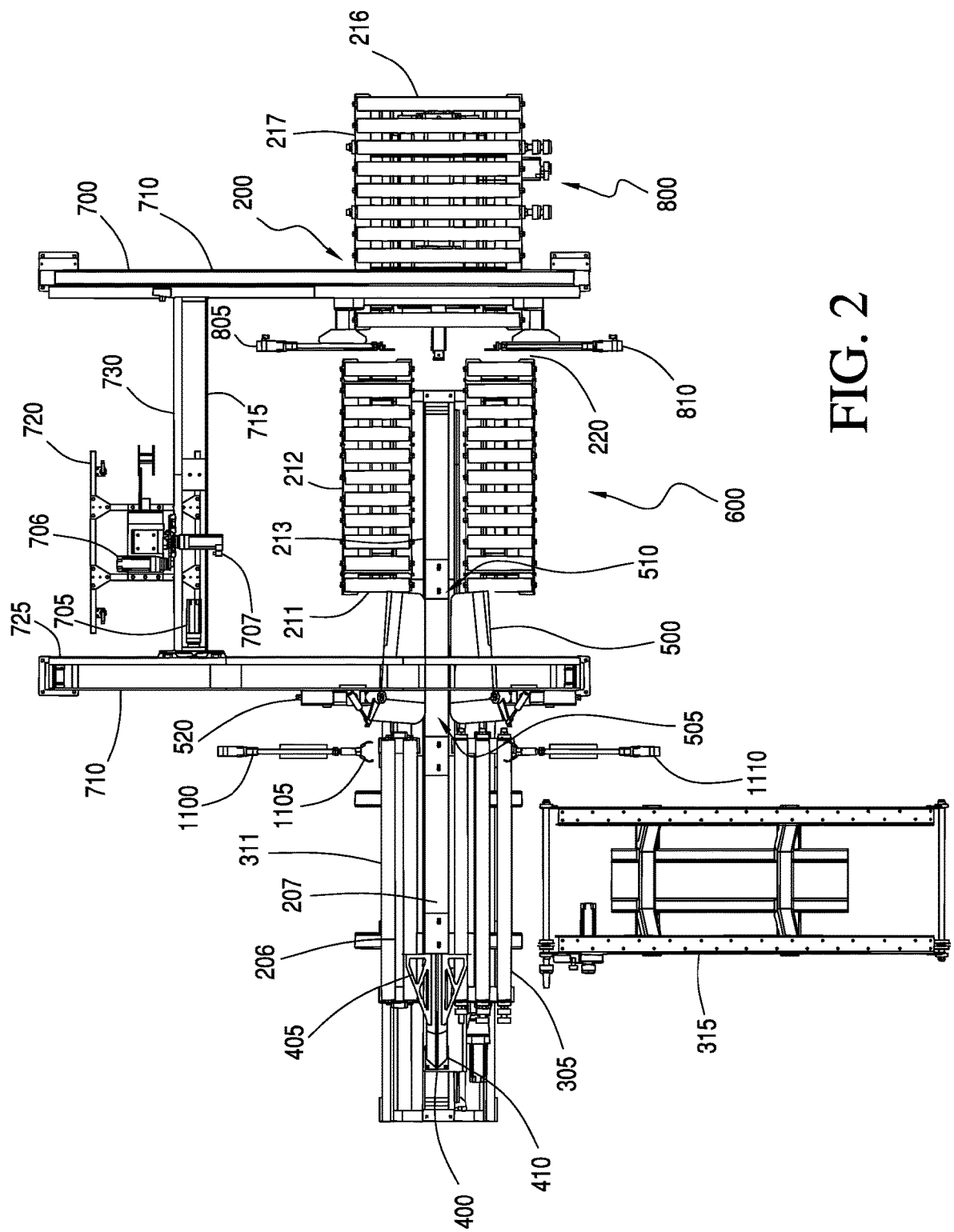
FIG. 2 is a top side view of the bale bagging apparatus of an embodiment showing the tops of each section of the bale bagging apparatus.

FIG. 2 shows that a first gap 207 can be provided between two or more transverse rotating rollers 206 of the first section 205. The first gap 207 has a gap width that allows a bale pusher 400 to move in the longitudinal feed direction between the at least two transverse rotating rollers 206, as discussed below in detail. The transverse rotating rollers 206 of the first section 205 can be driven to rotate in the transverse direction using a roller drive (not shown) or can freely rotate.

The staging device 310 of the bale feeding station 300 is a side bumper 311 located on the opposite side of the bale receiver 305 across the first section 205 of the conveyor system 200 to stage the bale being fed from the bale feeding device 315. For example, the side bumper 311 runs linearly in the longitudinal feed direction, i.e., has one end near the first end of the bale bagging machine 100 and has another end closer to the bale bagging station 600. By having the side bumper 311 located on the opposite side of the bale receiver 305, the side bumper 311 is arranged to stop the bale fed onto the transverse rotating rollers 206 to easily and simply stage the bale in an appropriate position for the longitudinal feeding of the bale along the bale bagging machine 100.

The staging device 310 can also include a switch or a photoeye or light curtain (not shown) to detect the presence of the bale at the appropriate location. When the bale is detected by the switch or photoeye or light curtain in the appropriate position, the switch or photoeye or light curtain can be used to control the movement of the roller drive of the first section 206.

As seen in FIG. 1, the bale pusher 400 has a start position near the bale feeding station 300. The bale pusher 400 has a pushing section 405, a pushing section carriage 410, and a driving mechanism 415 for moving the bale pusher 400 from the bale feeding section 305 to the second section 210 of the conveyor system 200 and back to the bale feeding section 305. The pushing section carriage 410 couples the pushing section 405 to the driving mechanism 415 to allow the pushing of the bale in the longitudinal feed direction.

The pushing section 405 of the bale pusher 400 has a planar face that runs transversely to the longitudinal feed direction. The planar face has a surface contact area that allows the distribution of force on the pushed bale, so that the pushed bale is not damaged. The pushing section 405 and pushing section carriage 410 are made from steel, metal alloys, composites, and other material that is designed for moving loads.

The driving mechanism 415 moves the bale pusher 400 along a linear drive track 420 coupled to the bottom frame member 105 linearly in the longitudinal feed direction. The driving mechanism 415 can be driven by a servo gear motor 416 that drives a rack (not shown), i.e., a gear, along a pinion (not shown) on the linear drive track 420. In another embodiment, other drive mechanisms could be used to move the driving mechanism 415 along the linear drive track 420, such as, chains, pulleys, or similar devices.

The bale chute 500 is positioned after the first section 205 but before the bale bagging station 600. The bale chute 500 has an input end 505 near the bale feeding station 300 and an output end 510 near the bale bagging station 600 for receiving and discharging the bale moved longitudinally along the bale bagging machine 100. The bale chute 500 comprises at least two pivoting sections, but preferably, has at least four pivoting sections 515, 516, 517, 518, mounted on a chute frame 520 attached to the bottom frame member 105.

Figure 5:
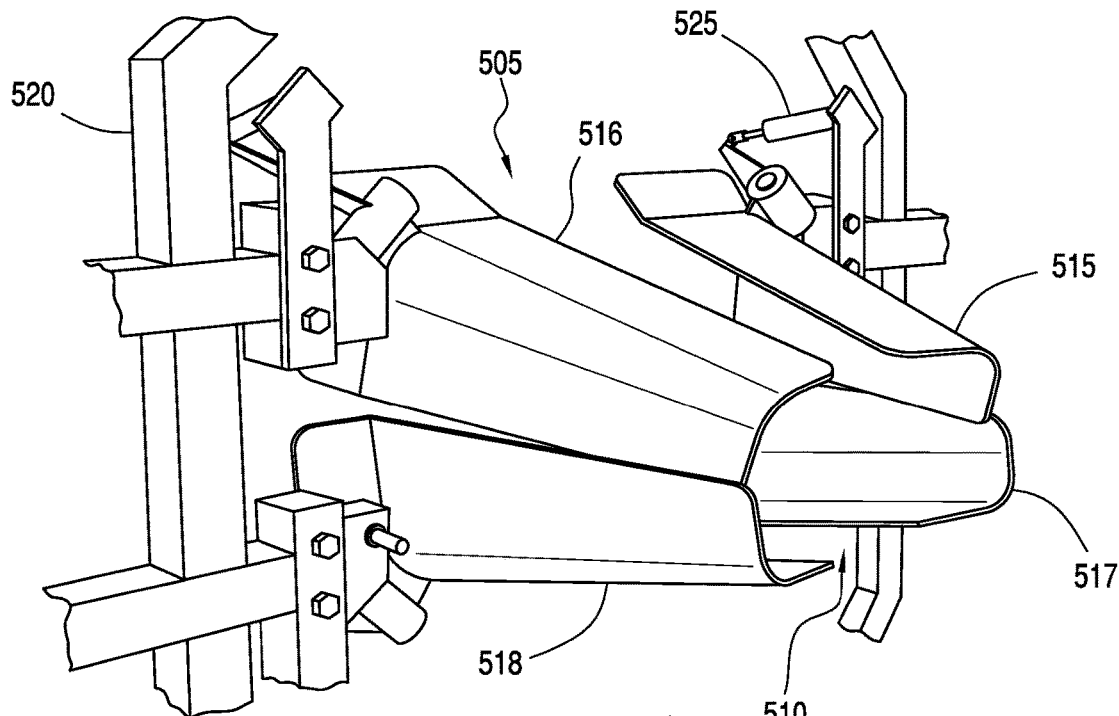
FIG. 5 is a right side isometric view of the bale chute illustrated according to the embodiments in FIGS. 1-3 showing a closed position of at least four pivotable sections.
Figure 6:
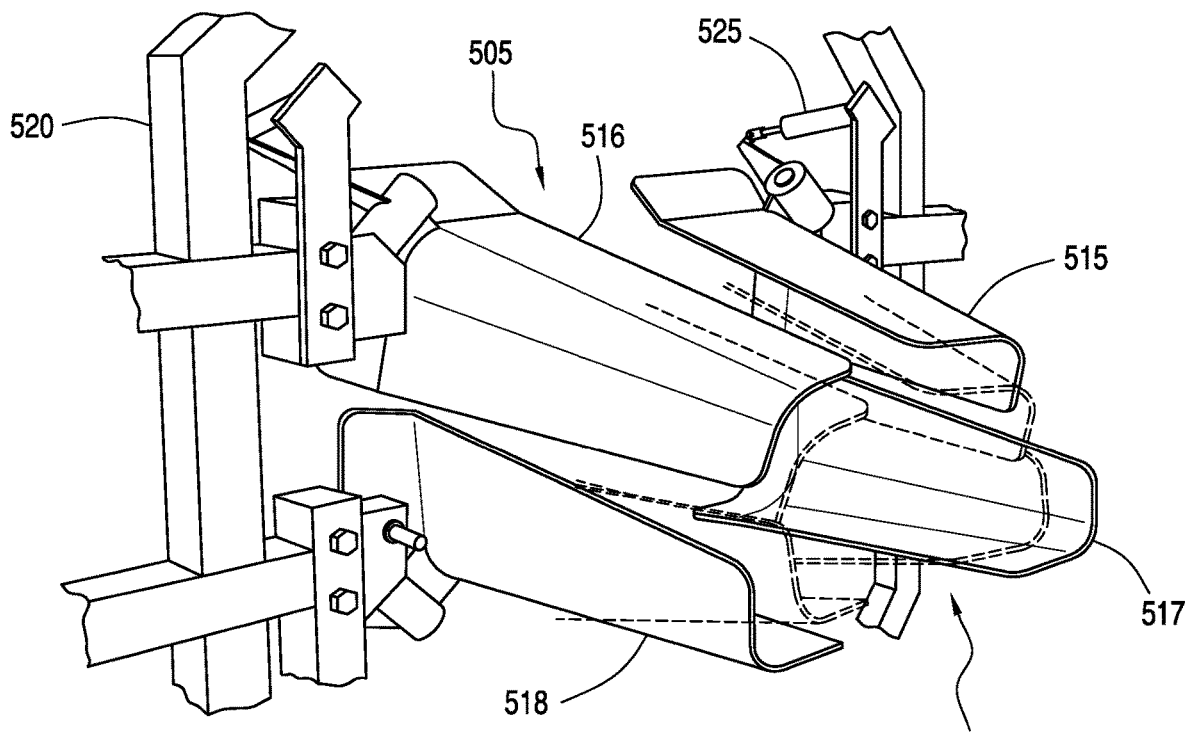
FIG. 6 is a right side isometric view of the bale chute illustrated according to the embodiments in FIGS. 1-3 showing an intermediary open position of the at least four pivotable sections.
Figure 7:
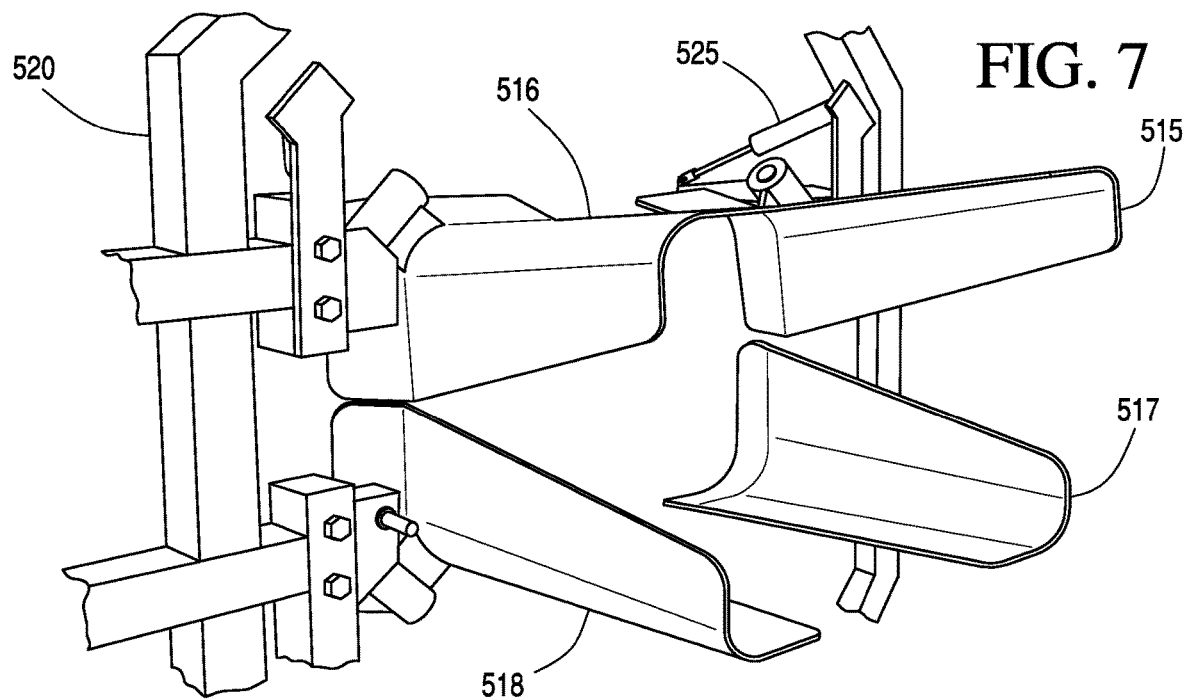
FIG. 7 is a right side isometric view of the bale chute illustrated in FIGS. 1-3 showing an open position of the at least four pivotable sections.

As seen in FIGS. 5-7, the at least four pivoting sections 515, 516, 517, 518 are pivotally connected to the chute frame 520 using actuators 525, e.g., double acting
   pneumatic cylinders, to move between at least a closed position and an open position. The positioning of the actuators 525 are controlled using a controller (not shown).

FIG. 5 shows the at least four pivoting sections 515, 516, 517, 518 pivoted in the closed position, where the actuators 525 pivot the pivoting sections 515, 516, 517, 518 towards each other to a center position of the bale chute 500, i.e., the pivoting sections are pivoted towards the other pivoting sections. As seen in FIG. 7, the at least four pivoting sections 515, 516, 517, 518 can also be pivoted from the closed position to the open position, where the four pivoting sections 515, 516, 517, 518 are driven outwardly away from the center position of the bale chute 500, i.e., the pivoting sections are pivoted away from the other pivoting sections.

FIG. 6 illustrates an intermediary open position that can also be used where the at least four pivoting sections 515, 516, 517, 518 are not fully opened. In this intermediary position, the at least four pivoting sections 515, 516, 517, 518 are pivoted outwardly away from the central position of the bale chute 500 to a position where outer sides of the pivoting sections are substantially parallel to each other. From this position, at least the top pivoting sections 515, 516 are pivoted further away from the center of the bale chute 500, i.e., a more open position as seen in FIG. 7. In this more open position, the outer sides of the pivoting sections 515, 516 are no longer parallel with the remaining pivoting sections.

Referring back to FIGS. 1-4, the bagging station 600 is located after the bale feeding station 300 and the bale chute 500. The bagging station 600 includes the second section 210 and the gap section 220 of the conveyor system 200 and the gantry 700. The design of the bagging station 600 provides an easy to assemble and uniquely designed machine for the placing of the bag for bagging the bale that utilizes the gap section 220 and/or inclined rollers for the positioning and the feeding of the bale in the bag.

The second section 210 has at least two roller frames 212 coupled to and supported by vertical beams connected to the bottom frame member 105 and at least two sets of longitudinally rotating rollers 211 rotatably coupled to the roller frames 212. A second gap 213 is located at a center position 214 between the at least two roller frames 212 that has a width to allow the movement of the bale pusher 400 between the two roller frames in the longitudinal feed direction.

Figure 8:
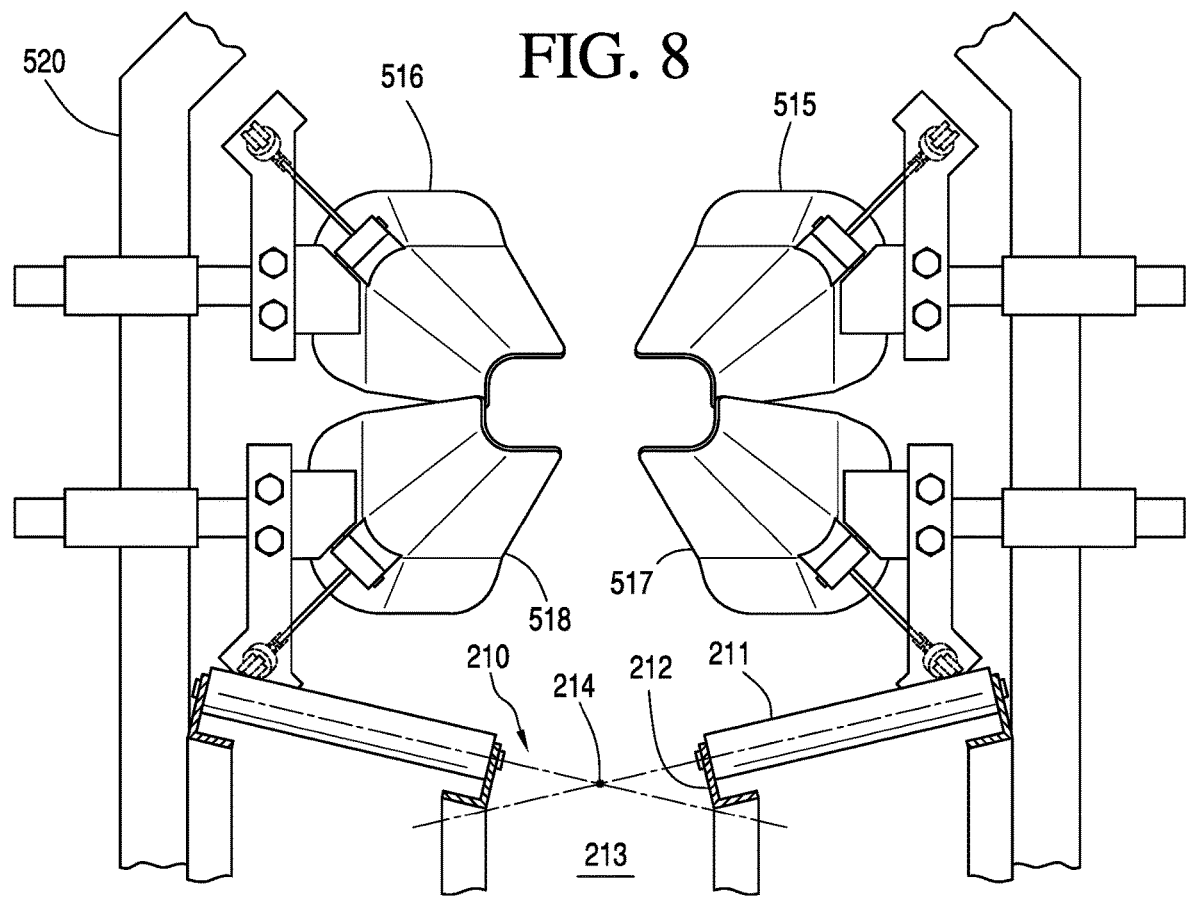
FIG. 8 is a longitudinal back view of a bagging station and bale chute of a second embodiment of a bale bagging apparatus having inclined rollers.
Figure 9:
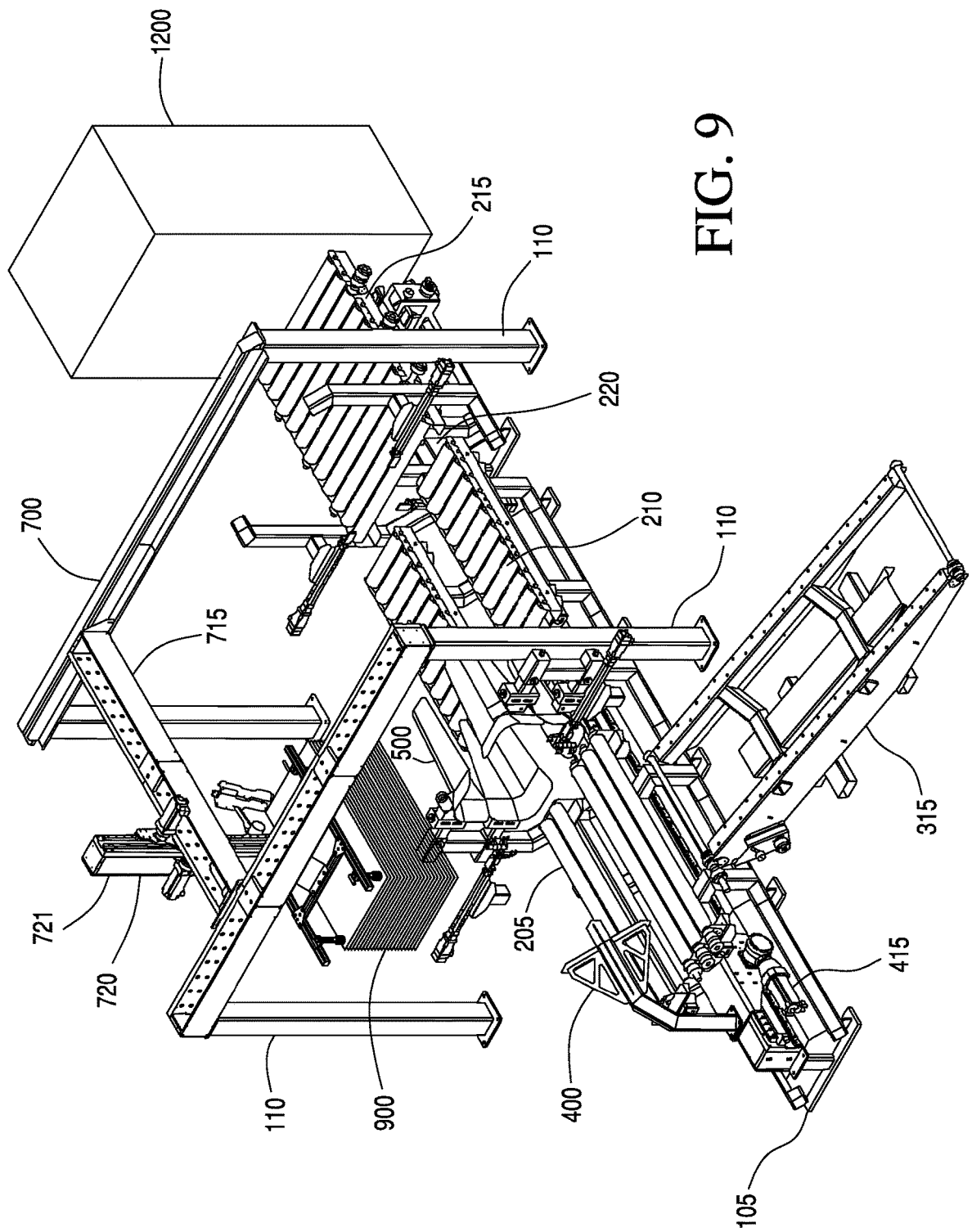
FIG. 9 is a right side isometric view of a bale bagging apparatus showing an embodiment of a method for placing a bag around pivoting sections of an output end of the bale chute by picking up a bag from a bag pallet.

The two sets of longitudinally rotating rollers 211 can be substantially horizontal with respect to the base of the bale bagging machine 100. Alternatively, as seen in FIG. 8, the rotating rollers 211 can be inclined where one end of the longitudinally rotating rollers 211 is located near the center position 214 of the second section 210 and the other end is located at an outward position above the one end, i.e., the longitudinally rotating rollers 211 have an incline angle greater than 5° from an imaginary horizontal plane (dotted lines) at the center position 214 of the second section 210 to an outer position of each set of roller frames 212.

FIGS. 1-4 show that the gantry 700 is coupled to top sections of the at least four vertical supports 110 of the bale bagging machine 100 above the conveyor system 200. The gantry 700 comprises at least three servo driven motors 705, 706, 707 that are configured to move the gantry in longitudinal, transverse, and vertical directions, at least two transverse beams 710 coupled to top sections of the at least four vertical supports 110 in the transverse direction, a first track coupled to the at least two transverse beams 710, a gantry beam 715 positioned parallel with respect to the longitudinal feed direction, a second track 730 coupled to the gantry beam 715, and a bag retrieval assembly 720.

Figure 3:
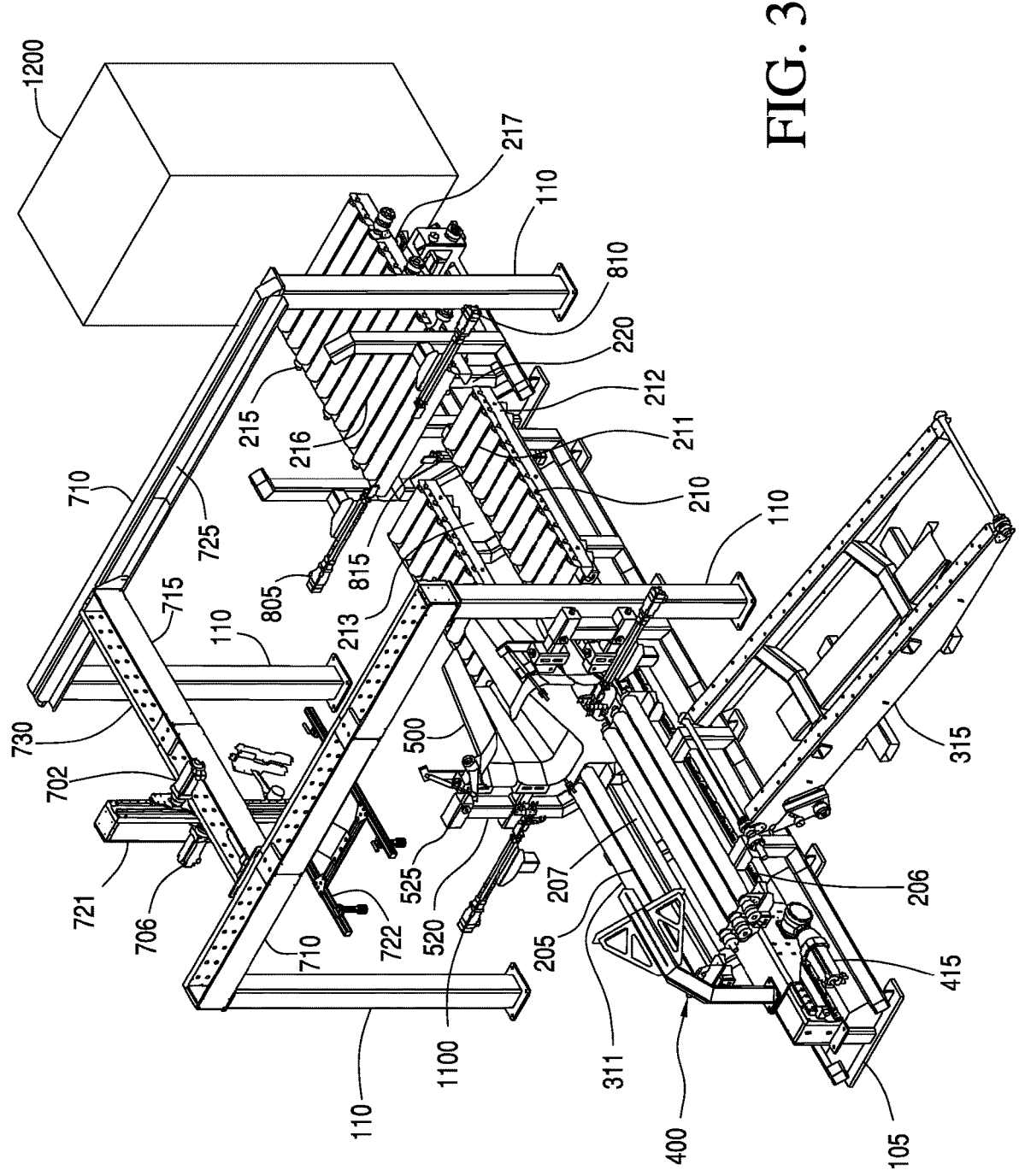
FIG. 3 is a right side isometric view of the bale bagging apparatus according to an embodiment showing the sections of the bale bagging apparatus.
Figure 4:
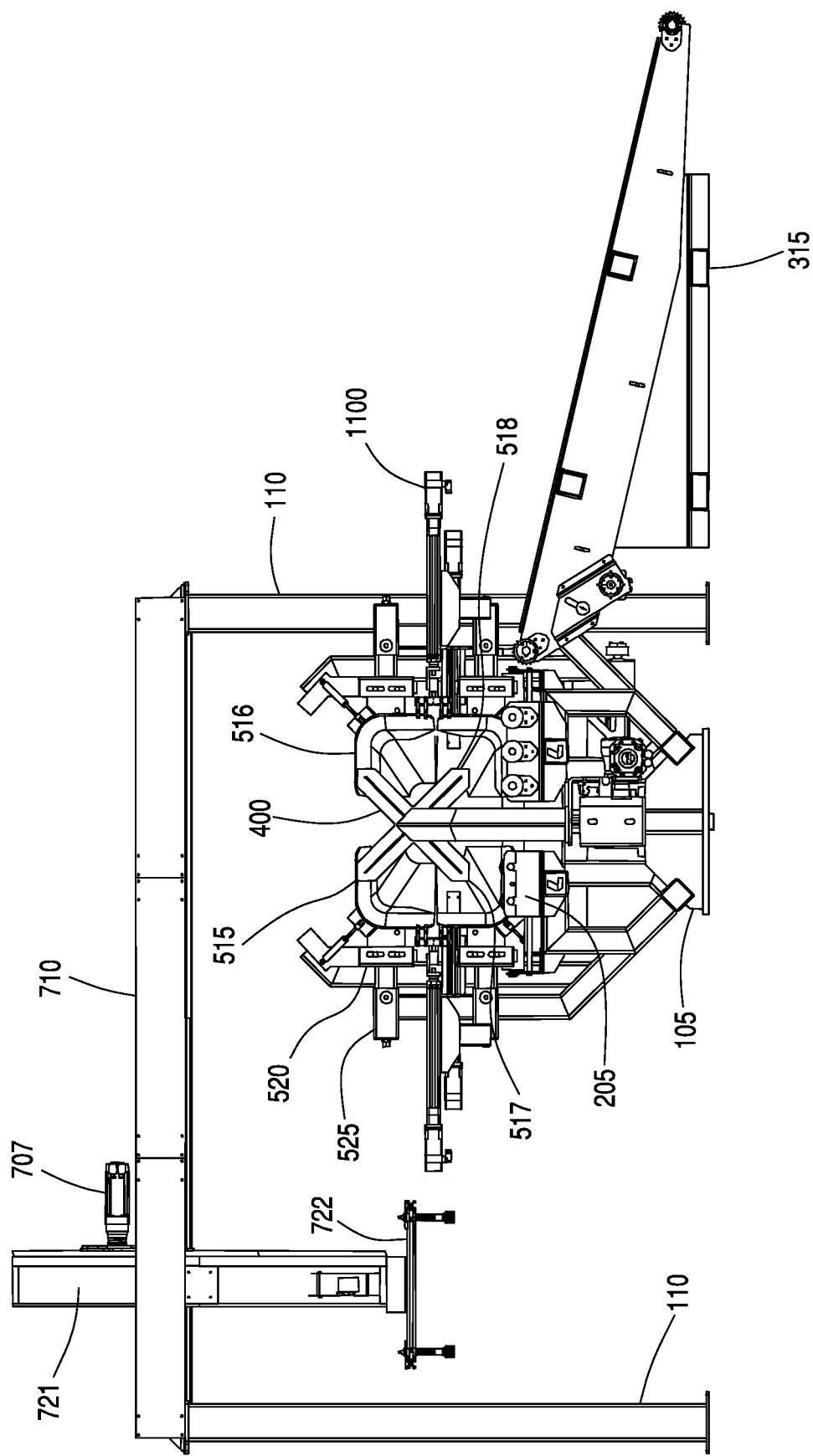
FIG. 4 is a longitudinal front view of the bale bagging apparatus according to an embodiment showing the bale feeding station and the bale feeder towards the bale chute.

As seen in FIG. 3, a first servo motor 705 is coupled to the gantry beam 715 to move the gantry beam 715 along the first track 725 in the transverse direction with respect to the longitudinal feed direction, i.e., a Y-direction. Additionally, a second servo motor 706 and the bag retrieval assembly 720 are coupled to the gantry beam 715, so that the second servo motor 706 can control the positioning of the bag retrieval assembly 720 along the second track 730 parallel to the longitudinal feed direction, i.e., the x-direction. According to an embodiment, the first and second tracks 725 comprise belts and motors to allow the movement of the gantry beam 715 and the bag retrieval assembly 720 in their respective directions. Additionally, chains, pulleys, rack and pinion gears, or other devices known in the art can be used with the tracks to allow the movement of the devices.

The bag retrieval assembly 720 comprises the third servo motor 707, a retrieval arm 721, and a bag retaining device 722. The bag retaining device 722 is coupled to one end of the retrieval arm 721 closest to the conveyor system 200. The retrieval arm 721 is coupled to the third servo motor 707 in a way such that the third servo motor 707 is used to control the vertical position, i.e., the Z-direction, of the retrieval arm 721 in directions towards and away from the conveyor system 200. The bag retaining device 722 coupled to one end of the retrieval arm 721 has devices, e.g., suction cups, clamps, gripping fingers, that are configured to grasp the baling bags for displacing the bags, i.e., pick up, from a bag feed position through the bale bagging station 600 to the bale chute 500. The bag retaining device 722 can also have a bag opening device 740 coupled to either the bag retaining device 722 or the suction cups closest to the open end of the bag for maintaining the bags in the open position. For example, the device for maintaining the bags in the open position 740 can use a nozzle to inject air into the open end of the bag to inflate the bag and maintain the bag in the open position.

In one embodiment, the third servo motor 707 can use various structures to move the retrieval arm 721 in the vertical direction. For example, the retrieval arm 721 can be positioned vertically using a rack and pinion gear structure, pulleys, belts, chains, or other devices that allow the controlled positioning of the retrieval arm.

The sealing module 800 is a sealing module known in the art that can use tape or a heating element (830) to close the open end of the bag around a bagged bale. The sealing module 800, as shown in FIGS. 1-4, includes the third section 215 of the conveyor system 200, a left closing actuator 805, a right closing actuator 810, and a bottom closing actuator 815.

The sealing module 800 is located at the second end of the bale bagging machine 100 after the gap section 220 of the bale bagging station 600. The scaling module 800 in this embodiment is supported by and attached to the second section of the bottom frame member 105 of the bale bagging machine 100.

The left, right, and bottom actuators 805, 810, and 815 are actuators that have a closing tool 825 attached on one end of the actuator. The closing tool 825 is a closing device designed to collapse the open end of the bag over the end of the bale. For example, the closing tool 825 is a plate or finger that pushes open ends of the bag in a given direction.

The left and right closing actuators 805, 810 are coupled to and supported by vertical beams attached at one end to the second section of the bottom frame member 105. The left and right closing actuators 805, 810 have a predetermined length and are coupled to the vertical beams to move transversely with respect to the longitudinal feed direction so that the closing tool 825 of each right and left closing actuator 805, 810 moves in a transverse direction inwardly and outwardly from a center of the sealing module 800. In this embodiment, the center of the sealing module 800 is an imaginary center of a back face of a bale positioned on the sealing module 800 closest to the actuators, so that the actuators can be used to close the open end of the bag around the bale.

The bottom closing actuator 815 is coupled centrally to the bottom frame member at one end so that the closing tool 825 on the other end of the bottom closing actuator 815 can move vertically upwardly towards the center of the sealing module 800 and downwardly away from the center.

In an embodiment, the closing actuators 805, 810, and 815 are controlled by a sealing module controller (not shown) to control the positioning and timing of the closing actuators. Additionally, a sealing element (830) is used to close the open end of the bag. The sealing element is a tape dispenser, heating element, or other device that can be used to close an open end of the bag. The sealing element can be mounted on any of the actuators to facilitate the closing of the bag.

As seen in FIGS. 1-3, the third section 215 of the conveyor system 200 is coupled to and supported by vertical beams connected to the bottom frame member 105 and comprises longitudinally rotating rollers 216 coupled to a roller frame 217. Similar to the rollers described above, the longitudinally rotating rollers 216 are rotatably coupled to the
roller frame 217 to allow the rotation of the longitudinally rotating rollers 216 in the longitudinal direction. The longitudinally rotating rollers 216 can also be driven by a motor (not shown) or allowed to freely rotate.

The simple structure of the bale bagging machine 100 provides a convenient and easy to assemble bale bagging machine that can be easily installed on-site for the bale bagging operation. The stations can be delivered pre-assembled or assembled on site, while the base frame and vertical supports would be delivered for the simple installation at the site.

B. Discussion of Various Methods of Operation of the Bale Bagging Machine According to the First Embodiments The operation of the bale bagging machine 100 will now be described in detail with reference to FIGS. 9-22.

FIGS. 9-13 show the picking up of a bag 905 from a pallet of bale bags 900. Various retrieval devices can be used for the movement of the bag, as long as the retrieval device is arranged to position the closed end of the bag in the gap section of the conveyor system. For example, the retrieval device can be mounted on a ceiling above the bale bagging apparatus having a device that can position the retrieval device in the vertical direction and longitudinally along the bale bagging machine.

In this embodiment, the pallet of bale bags 900 as shown is located in a position that is accessible by the bag retrieval assembly 720, i.e., the area in the gantry 700 between the at least four vertical supports 110 of the bale bagging machine 100. The precise position, however, is not limited to the aforementioned position, but may be adjusted as desired within the operational area of the gantry.

Figure 10:
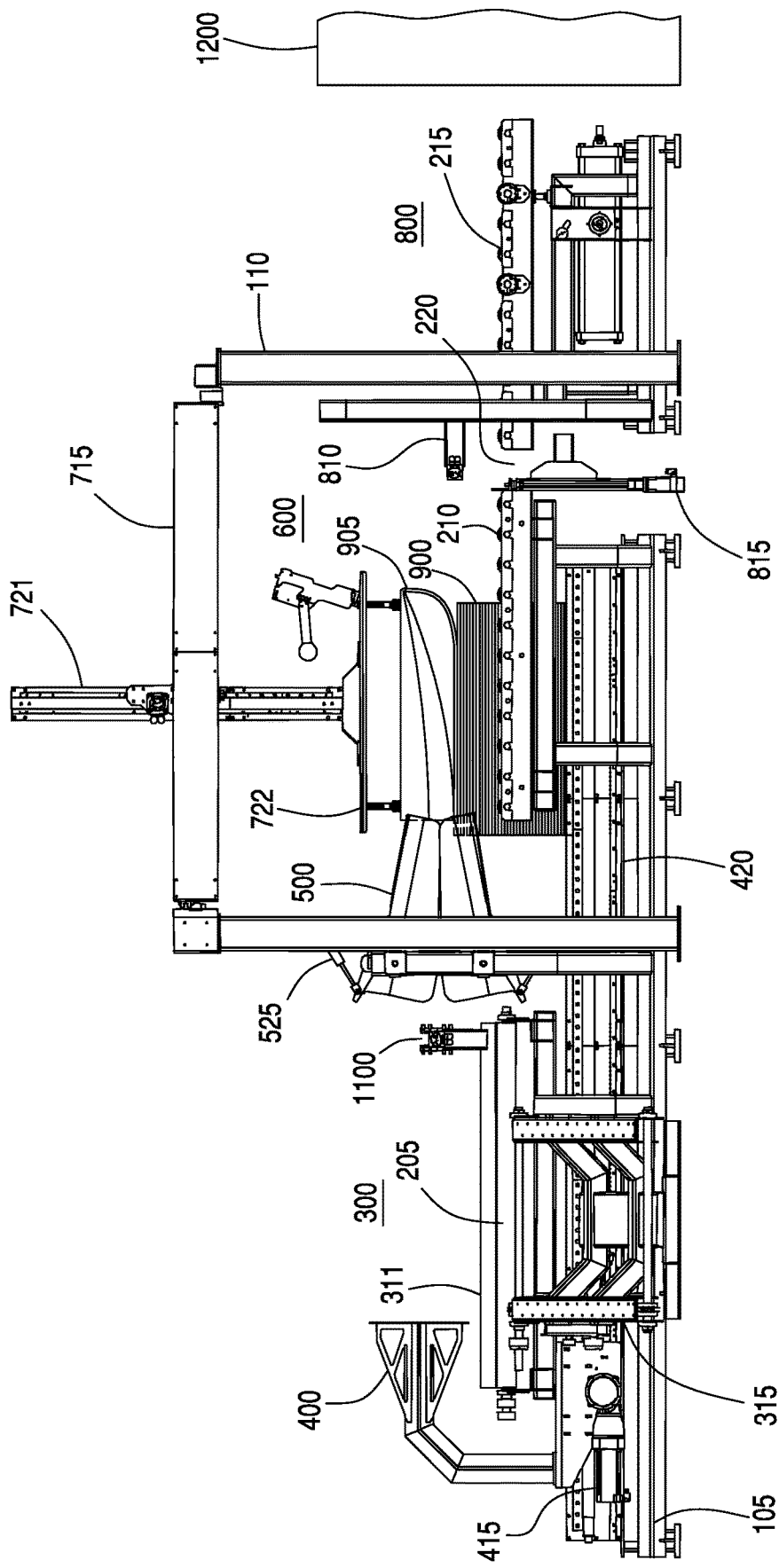
FIG. 10 is a right side view of the bale bagging apparatus according to FIG. 9 showing the picking up of the bag by the retrieval assembly so that the open end of the bag opens and the closed end hangs downwardly.

As seen in FIG. 10, the pallet of bale bags 900 are folded in a way such that an open end 910 is folded on top of a closed end 915 of the bag 1000. When the bag 900 is lifted, i.e., picked up, by the bag retrieval assembly 720, the open end 910 is openable, while the closed end 915 hangs downwardly towards the base of the bale bagging machine 100.

Figure 11:
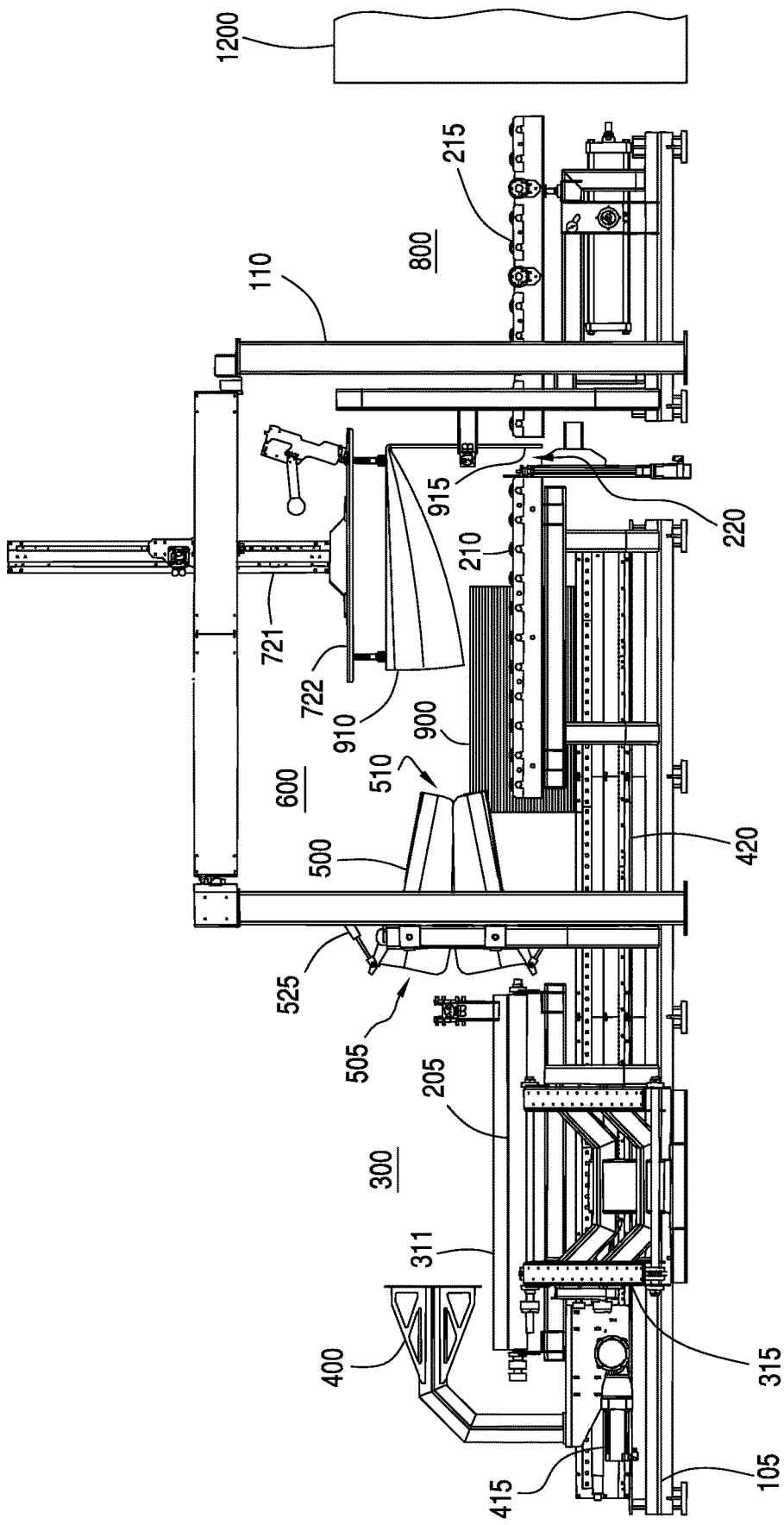
FIG. 11 shows moving the bag retrieval assembly according to an embodiment so that the closed end of the bag moves through the at least one gap section of the bagging station.

FIG. 11 illustrates the transference of the bag 905 from the pallet of bags 900 to the bale bagging station 600. After picking up the bag 905, the bag retrieval assembly 720 and bag 905 move in parallel to the longitudinal feed direction rearwardly in this example towards the second end of the bale bagging machine 100 with the closed end 915 of the bag 905 hanging downwardly.

When the bag retrieval assembly 720 is positioned perpendicular to the gap section 220 of the conveyor system 200, the bag retrieval assembly 720 is moved transversely with respect to the longitudinal feed direction, i.e., a lateral direction, so that the closed end 915 of the bag 905 moves laterally through the gap section 220, i.e., perpendicular to the longitudinal feed direction.

Once the closed end 915 of the bag 905 is positioned in the gap section 220, the gantry 700 moves the bag retrieval assembly 720 in the opposite direction, forward in this example towards the first end of the bale bagging machine 100, of the longitudinal feed direction so that the open end 910 of the bag 905 moves towards the bale chute 500.

Figure 12:
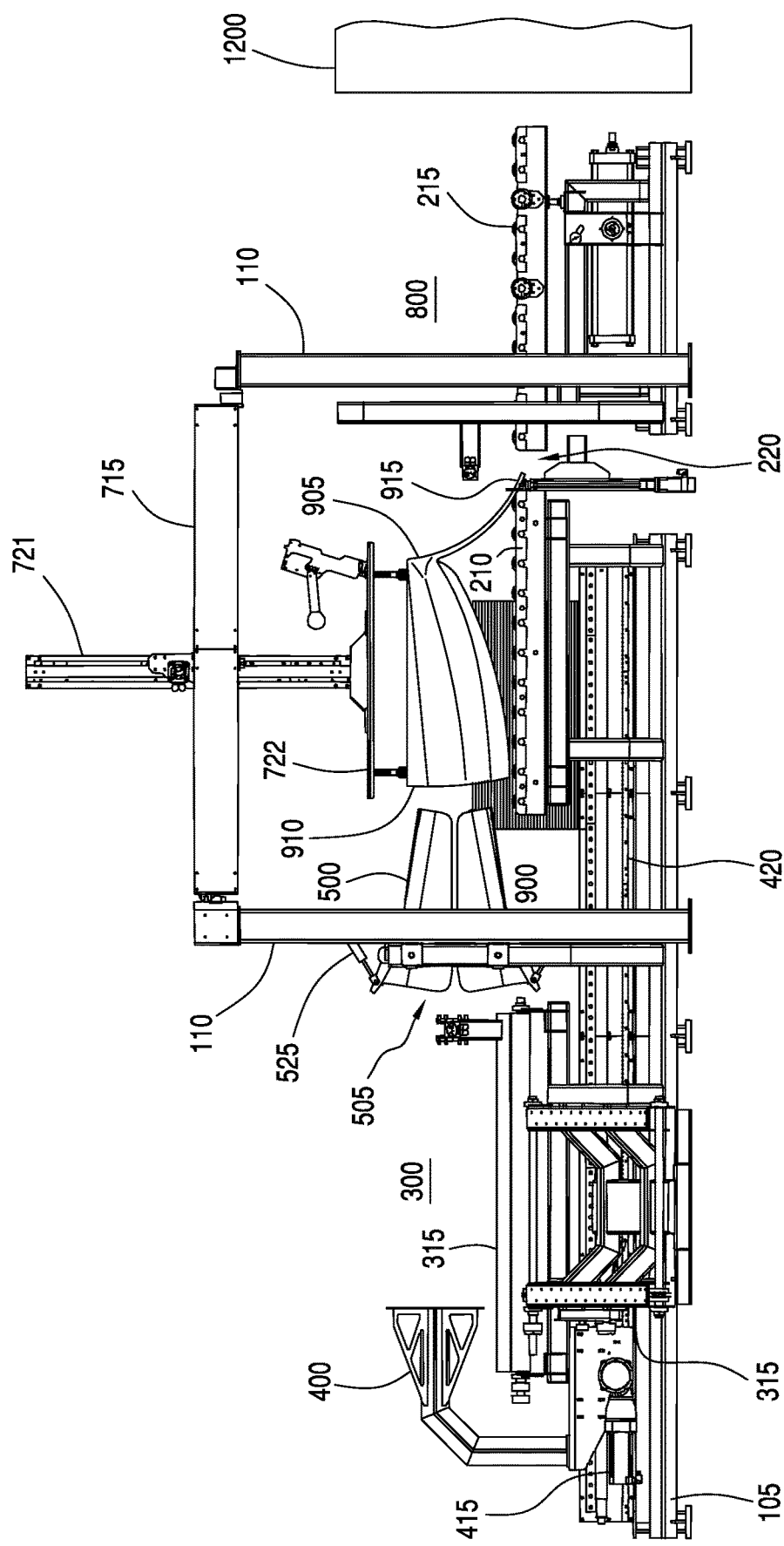
FIG. 12 illustrates moving the open end of the bag towards the bale chute so that the closed end of the bag is straightened.

As seen in FIG. 12, as the open end 910 of the bag 905 moves towards the bale chute 500, the closed end 915 of the bag 905 is positioned on the longitudinally rotating rollers 211 of the second section 210 of the conveyor system 200 in the bale bagging station 600.

Figure 13:
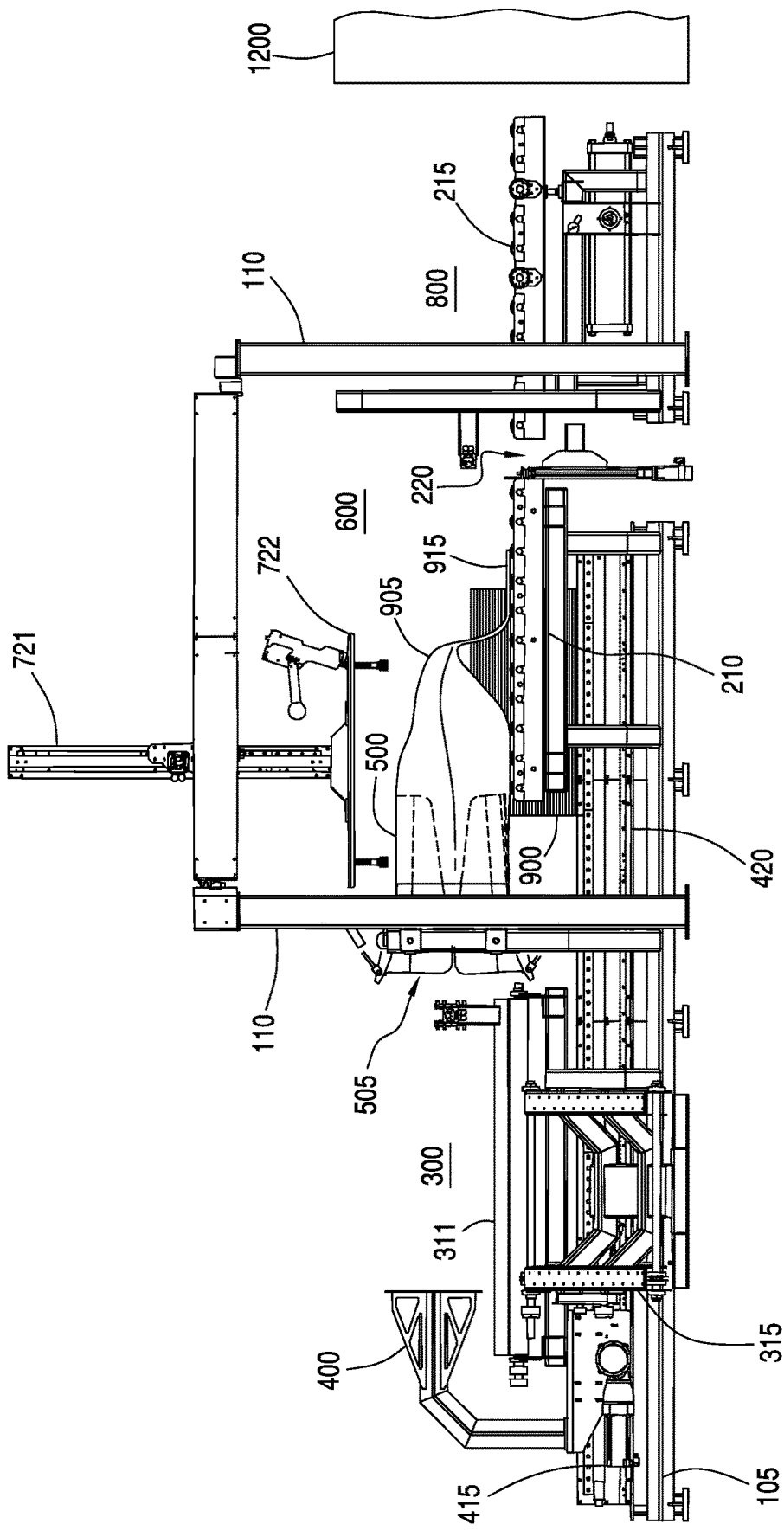
FIG. 13 shows the pivoting sections of the bale chute opening according to an embodiment to engage the open end of the bag.

When the open end 910 of the bag 905 is moved towards the bale chute 500 by the gantry 700, the pivoting sections 515, 516, 517, 518 of the bale chute 500 are in the closed position. FIG. 13 shows that after the open end 910 of the bag 905 is positioned around the pivoting sections 515, 516, 517, 518, the pivoting sections are controlled to pivot to the open position, so that the pivoting sections engage an inside surface of the open end 910 of the bag 905 to hold the bag 905 in place, i.e., securely retain the bag.

Surprisingly, it was found that by allowing the closed end 915 of the bag 905 to move through the gap section 220, the positioning of the bag 905 over the pivoting sections of the bale chute 500 and subsequent bagging of the bale was facilitated. This positioning allows the bag to be easily placed in alignment with the longitudinal feed direction to open the bag for receiving the bale, which greatly improves the bale bagging operation.

At another time or the same time as the transferring and positioning of the bag 905 around the pivoting sections of the bale chute 500, a bale 1000, e.g., a cotton bale, is fed onto the bale feeder 315 for feeding the bale 1000 into the bale feeding station 300.

Figure 14:
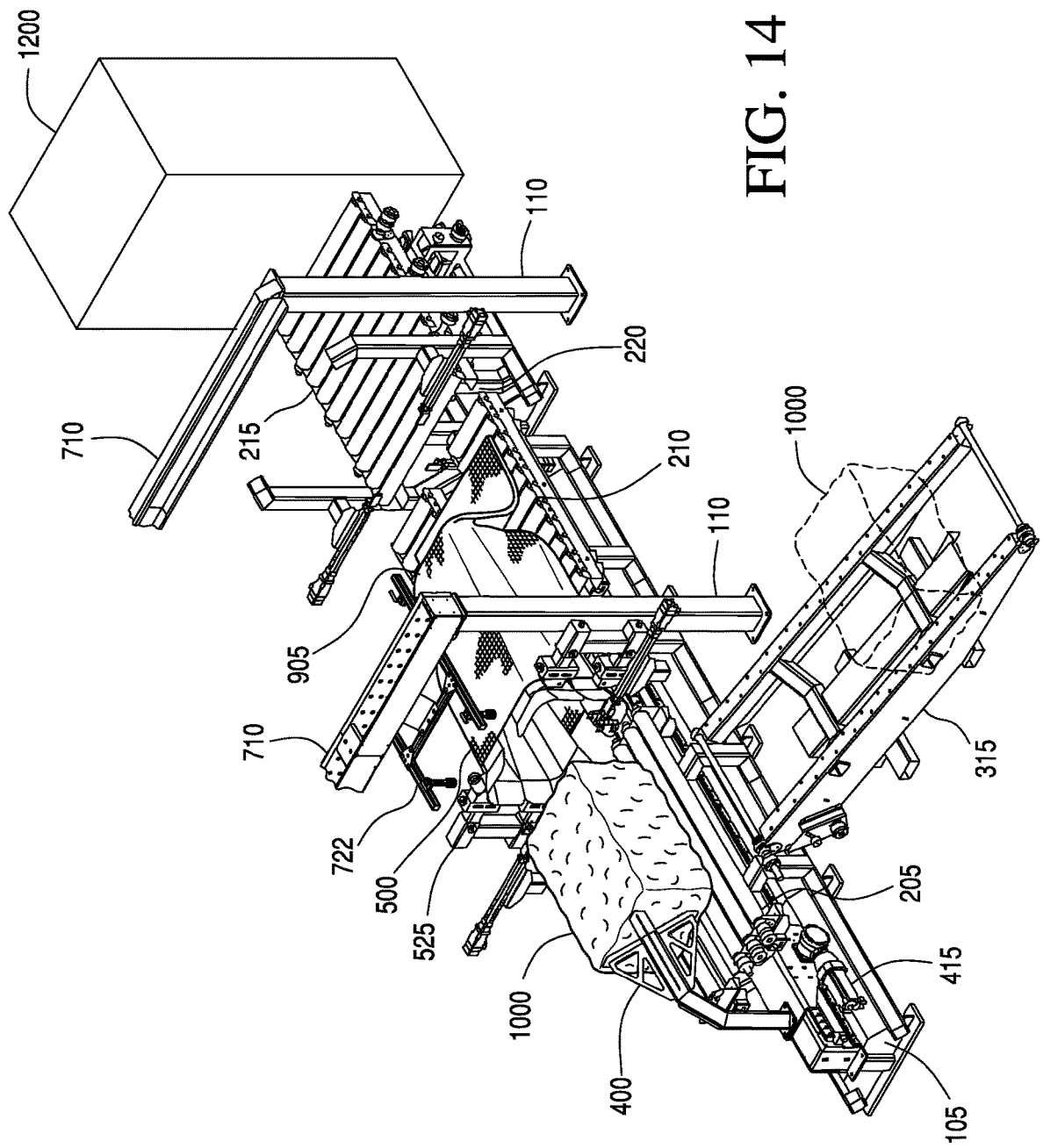
FIG. 14 illustrates the feeding of a bale from the bale feeder to the bale feeding station for feeding the bale to the bale bagging apparatus along the conveyor system.

FIG. 14 illustrates the movement of the bale 1000, where the dotted line represent a first position of the bale 1000 and the solid line represents the second position of the bale 1000 fed by an inclined bale feeder 315 towards the bale feeding section 300. As the bale feeder 315 is feeding the bale 1000 through the bale receiver 305 of the bale feeding station 300, the transverse rotating rollers 206 of the first section 205 can be controlled to rotate transversely with respect to the longitudinal feed direction.

By rotating the transverse rotating rollers 206 transversely with respect to the longitudinal feed direction, the bale 1000 is staged on the first section 205 of the conveyor for the subsequent bagging of the bale 1000 by the bale bagging machine 100. As discussed above, the transverse rotating rollers 206 are used to stage the bale 1000 by using a switch or photoeye that starts and stops the transverse rotating rollers 206 when the desired position of the bale 1000 is detected and/or rotate until the bale 1000 reaches the side bumper 311.

Figure 15:
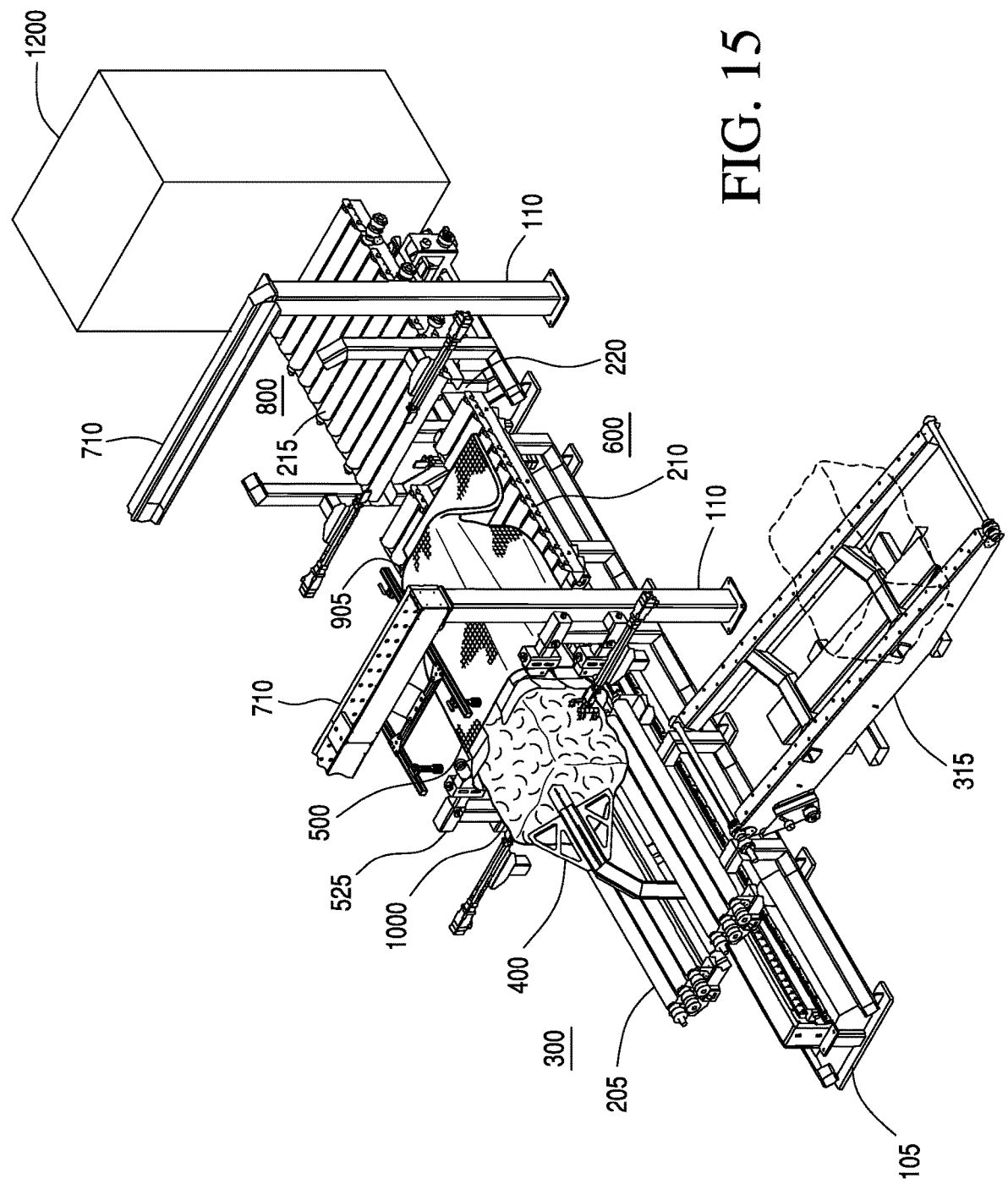
FIG. 15 shows pushing the bale down the bale bagging apparatus according to an embodiment from the bale feeding station to the bale chute along the longitudinal feed direction using the bale pusher.

As seen in FIG. 15, after the bale 1000 is staged on the first section 205, the bale pusher 400 pushes the bale 1000 along the longitudinal feed direction towards the input end 505 of the bale chute 500 by controlling the driving mechanism 415 to move along linear drive track 420. As discussed above, the first gap 207 is provided to allow the bale pusher 400 to move along a linearly positioned central line of the bale bagging machine 100 through the first section 205.

The bale pusher 400 pushes the bale 1000 to a first position where one end of the bale 1000 is positioned near the input end of the bale chute 500. The bale pusher 400 then pushes the bale 1000 through the input end 505 of the bale chute 500 with the pivoting sections 515, 516, 517, 518 on the output end 510 in the open position. When the bale chute 500 is in the open position, another gap is provided along the linearly positioned central line between at least the bottom pivoting sections to allow the bale pusher 400 to continue moving in the longitudinal feed direction towards the second end of the bale bagging machine 100.

The bale pusher 400 continues to move in the longitudinal feed direction to push the bale 1000 through the bale chute 500 into the open end 910 of the bag 905 so that the bale 1000 engages the longitudinally rotating rollers 211 of the second section 210. Since the longitudinally rotating rollers 211 are inclined, the bale 1000 only engages the second section 210 at bottom corners of the bale 1000 thereby decreasing any friction and resistance from placing the bale 1000 into the bag 905. It was also found that by inclining the second section 210, the rollers of the second section do not significantly engage baling wire that binds the bale 1000, which prevents roller damage and wear.

Figure 16:
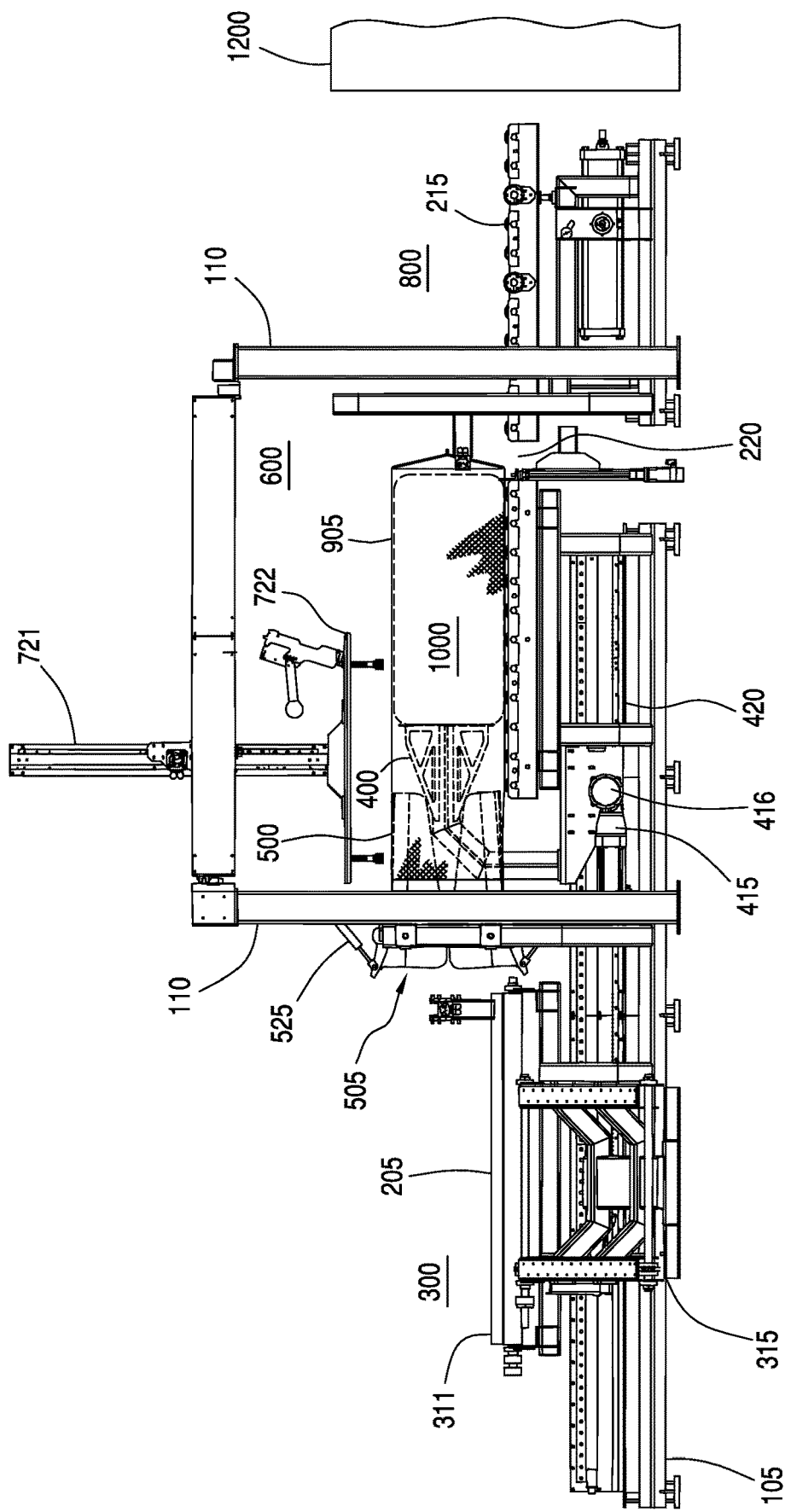
FIG. 16 depicts the bale pusher according to an embodiment continuing pushing the bale into the open end of the bag through the bale chute onto the second section of the conveyor system.

FIG. 16 shows the bale pusher 400 pushing the bale 1000 towards the second end of the bale bagging machine 100 so that the bale 1000 engages the closed end 915 of the bag 905. After the bale reaches the closed end 915, the bale pusher 400 continues pushing the bagged bale 1000 onto the second section 210 of the conveyor system 200. When the bale pusher 400 reaches a predetermined position, the pivoting sections 515, 516, 517, 518 are closed or set in the intermediary open position to allow the bag 905 to be released from the bale chute 500.

Figure 17:
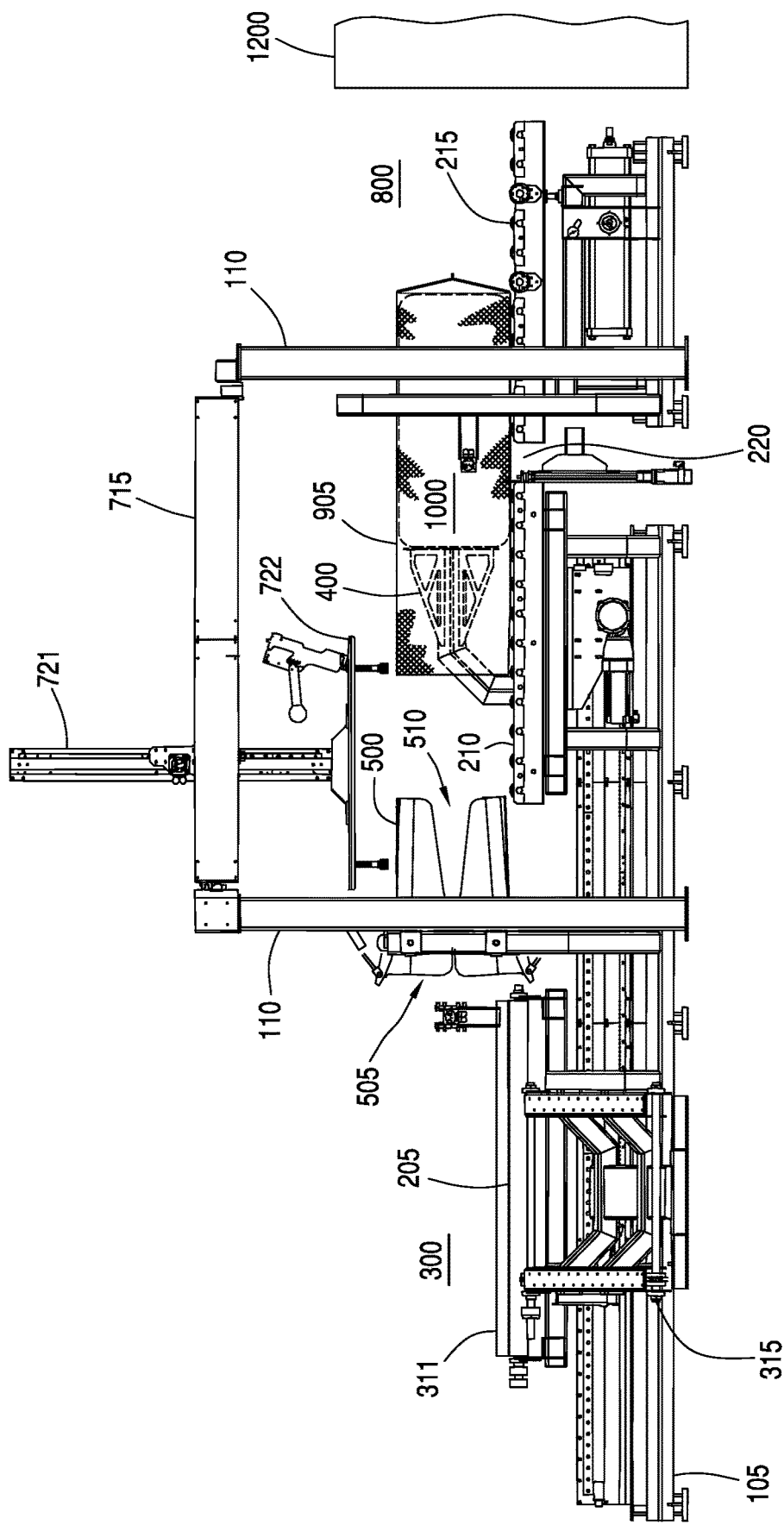
FIG. 17 illustrates the release of the open end of the bag according to an embodiment by the pivoting sections of the bale chute as the bale pusher continues pushing the bagged bale down the bale bagging apparatus in the longitudinal feed direction.
Figure 18:
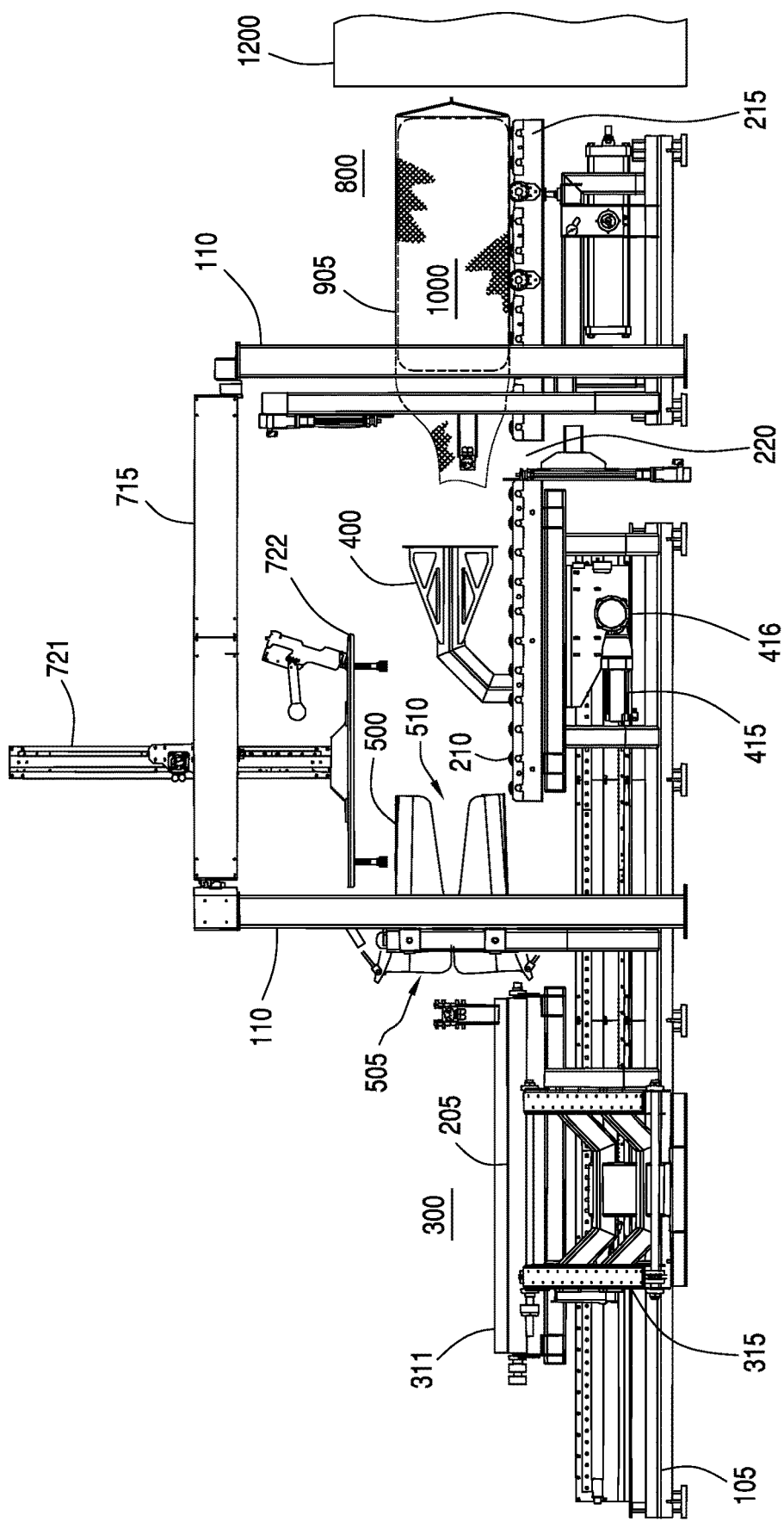
FIG. 18 shows the bale pusher reaching a second position according to an embodiment where the bagged bale is placed on a sealing module at the second end of the bottom frame member.
Figure 20:
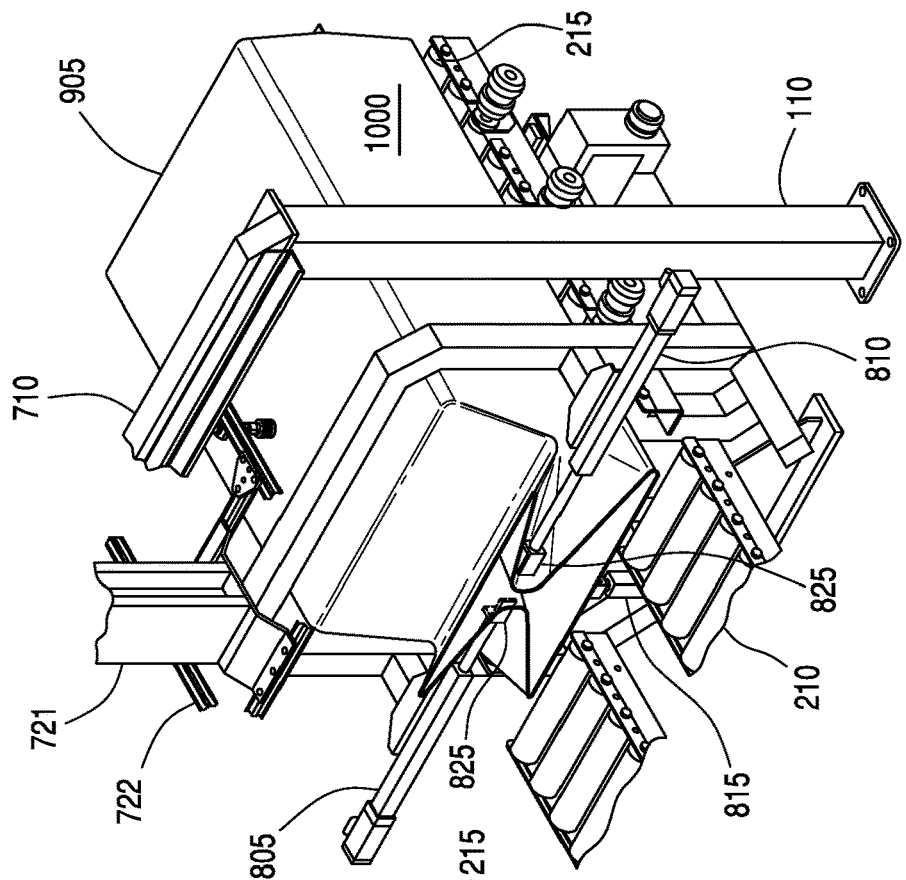
FIG. 20 shows the closing of a top flap of the open end of the bag around the bale according to an embodiment after the right and left flaps are closed.

As seen in FIGS. 17-18, the bale pusher 400 continues moving the bale 1000 in the longitudinal feed direction from the second section 210 onto the third section 215 in the sealing module 800 until the bale pusher 400 reaches a predetermined position. After which, the bale pusher 400 returns back to the bale feeding station 300, i.e., reverses direction to move in the opposite direction of the longitudinal feed direction. The travel of the bale pusher 400 can be controlled using a switch, time, or based on a predetermined length of travel.

FIG. 18 shows the bagged bale 1000 pushed on the third section 215 on the sealing module 800. The longitudinally rotating rollers 215 of the third section 215 facilitate the movement of the bagged bale 1000 onto the third section by rolling the bagged bale 1000 to a predetermined location on the sealing module 800.

Figure 19:
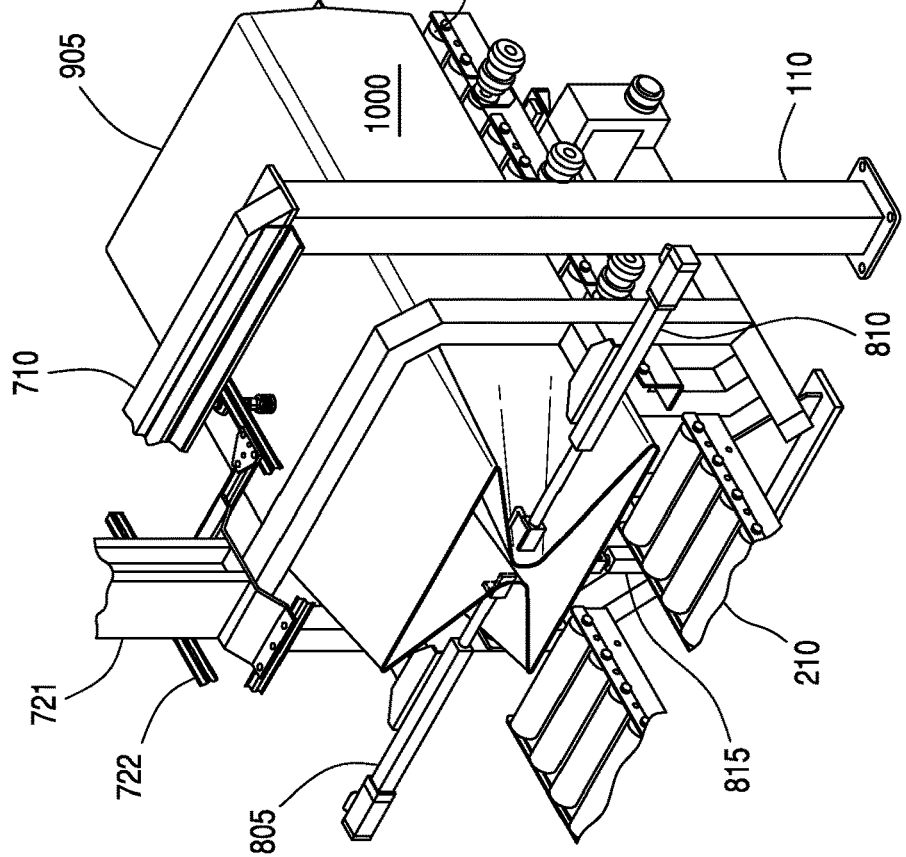
FIG. 19 illustrates the closing of the open end of the bag around the bale according to an embodiment at the sealing module by first having right and left closing actuators close the right and left flaps of the open end of the bag.
Figure 22:
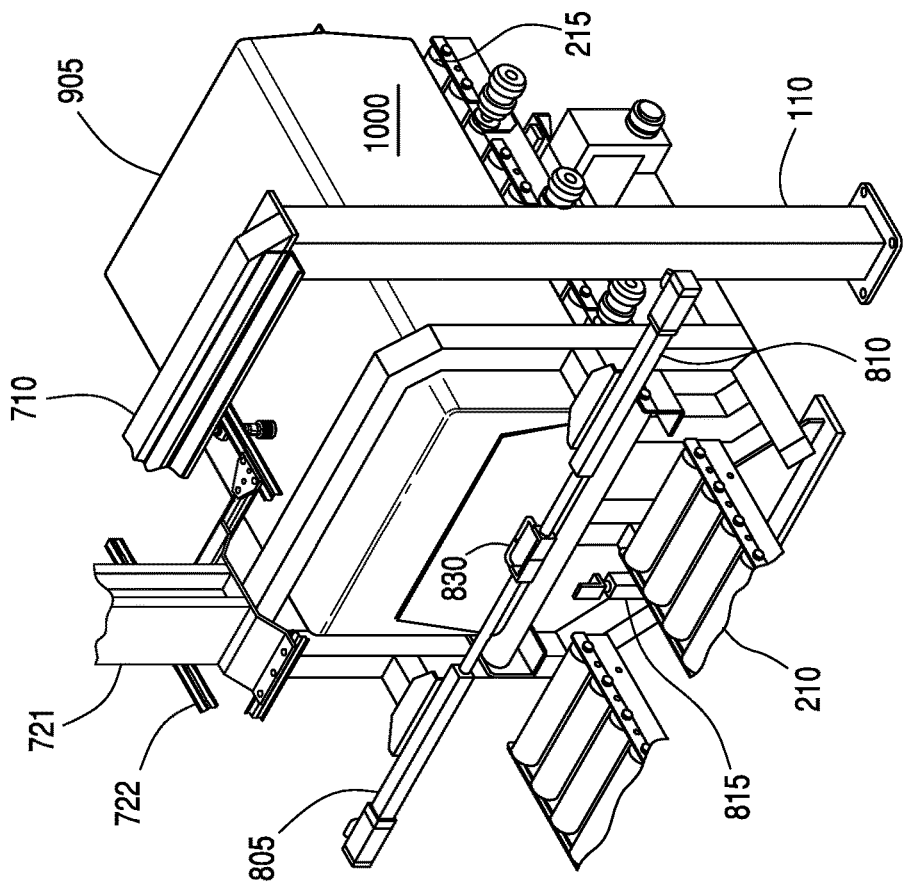
FIG. 22 illustrates a sealing element according to an embodiment used at the sealing module for sealing the open end of the bag.
Figure 21:
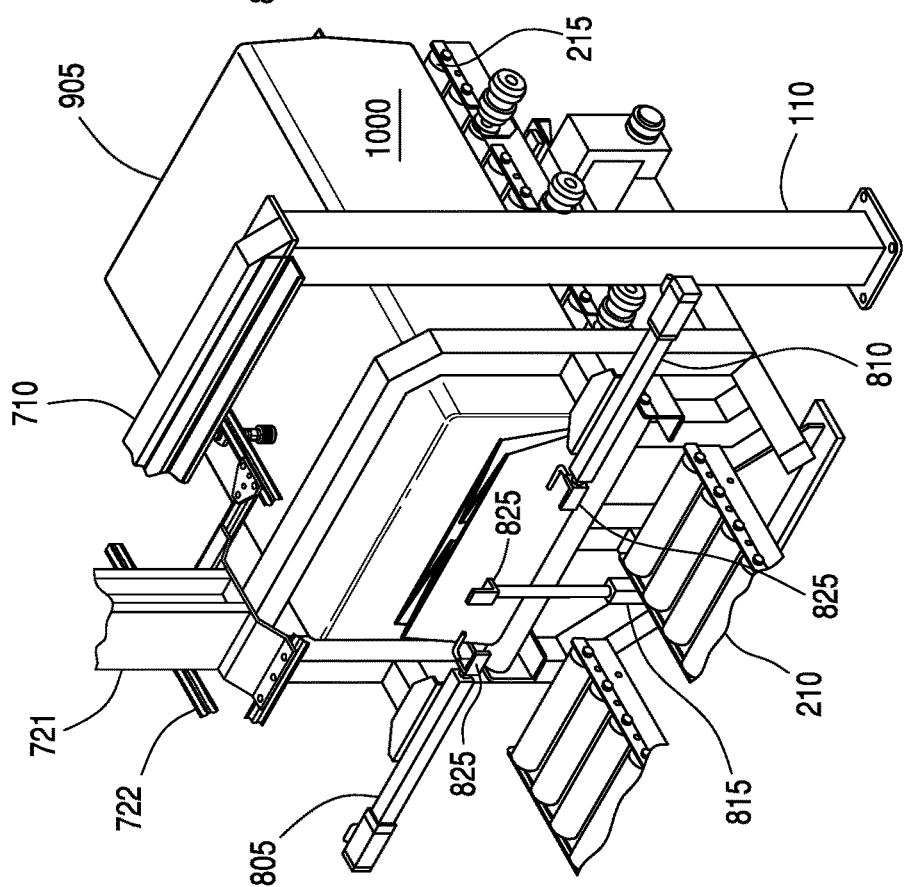
FIG. 21 depicts the closing of a bottom flap of the open end of the bag according to an embodiment after the top, right, and left flaps are closed.

FIGS. 19-22 illustrate the sealing of the open end 910 of the bag 905 using the sealing module 800. As illustrated in FIG. 19, once the bagged bale 1000 is positioned on the sealing module 800, the closing tool 825 of the right and left closing actuators 805, 810 begin a sweep from a center to the outside edges engaging the top flap of the open end 910. The right and left closing actuators, then reverse direction and sweep to move to the center of the sealing module 800 which engages right and left flaps, respectively, of the open end 910.

The bottom actuator 815 then moves the closing tool 825 on the bottom actuator 815 upwardly towards the central position of the sealing module 800 to move the bottom flap over the right, left, and top flaps to close the open end 910. Once the bottom flap is nearly closed, the right and left closing actuators 805, 810 are commanded to return the closing tool 825 to their respective start positions.

A sealing element 830, e.g., a heat sealer, tape dispenser, or stapler, is then used to close the bottom flap. The sealing of the open end 910 of the bag 905 can be sealed in a variety of ways and is not limited to the foregoing description.

Figure 23:
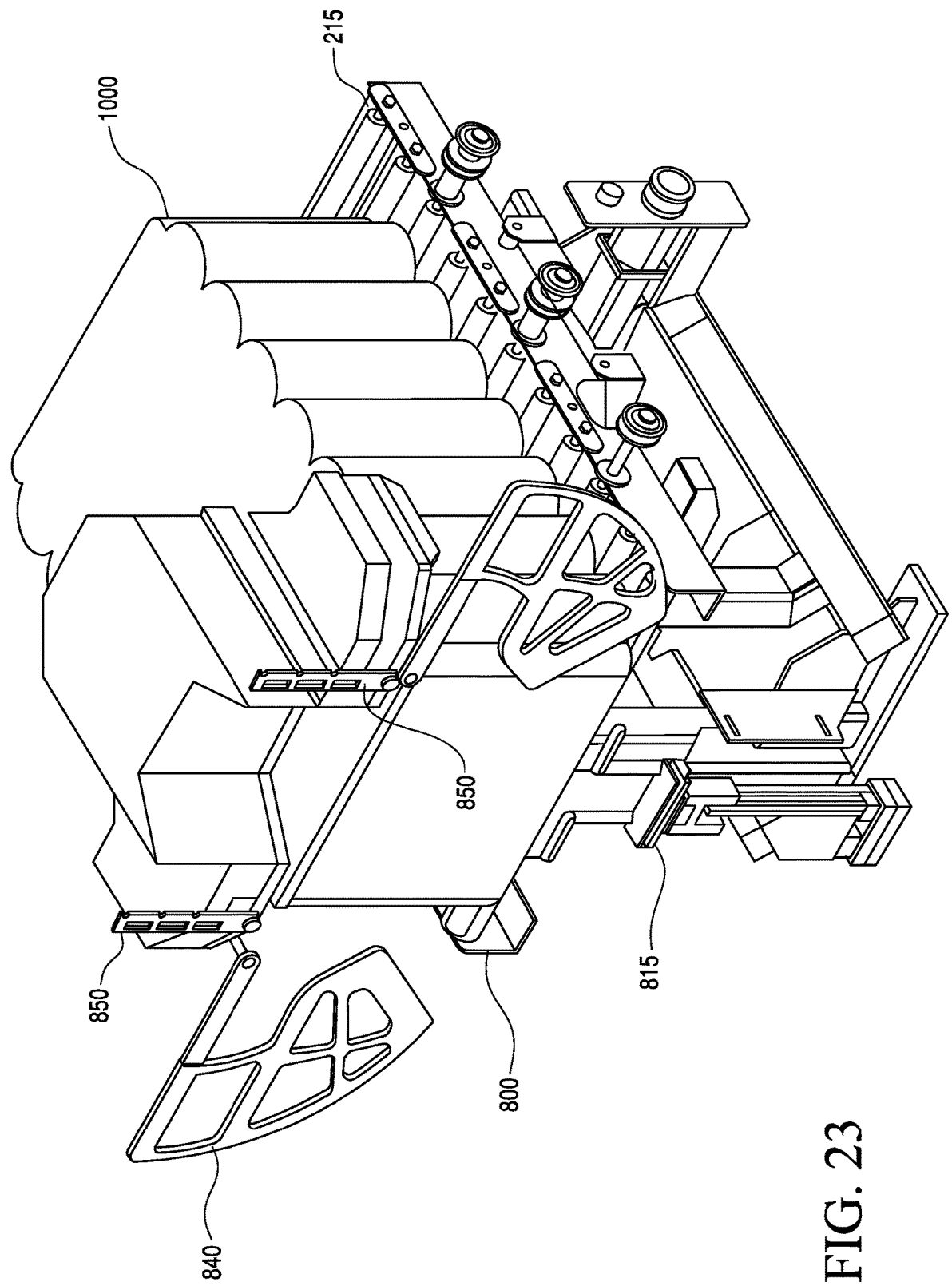
FIG. 23 illustrates an alternative embodiment wherein a sealing element is used to close and seal the open end of the bag.

For example, as seen in FIG. 23, sealing module 800 is attached to the frame member of the bale bagging machine 100 (not shown for clarity) and comprises transversely rotating side closure mechanisms 840 and rotating top closure mechanisms 850. In a similar manner as discussed above with respect to the closure actuators 805, 810 of the sealing module 800, the transversely rotating side closure mechanisms 840 are pivotably rotated to move in a transverse direction with respect to the longitudinal feed direction of the bale bagging machine 100 to engage the right and left flaps of the open end 910 of the bag 905 and move the right and left flaps towards the central position of the sealing module 800.

In this embodiment, top closure mechanisms 850 are then configured to engage the top flap of the open end 910 of the bag 905 by pivotally rotating downwardly towards the central position of the sealing module 800 to move the top flap towards the center of the sealing module 800. The bottom actuator 815 is then configured to move upwardly towards the central position of the sealing module 800 to move the bottom flap over the right and left flaps. A sealing member, similar to the devices discussed above, can then be used to close the flaps.

The disclosure is not to be limited by the description of exemplary embodiments of the disclosure, but only by the scope of the appended claims.

For example, as seen in FIG. 1, a sampling station 1100 can be installed on the bale bagging machine 100. The sample station 1100 is coupled to vertical supports having one end coupled to the bottom frame member 105. The sample station 1100 comprises automated grippers 1105 mounted on ends of an automated linear actuator 1110 with position indication devices.

The automated grippers 1105 are positioned to move transversely to the longitudinal feed direction to allow the taking of a sample of the bale 1000 from sides of the bale 1000. Once the bale 1000 is positioned at the first position, the automated grippers are controlled by a controller (not shown) to take the required samples.

The automated grippers 1105 can use fingers that open and close to grab the sample or can use other devices that allow the taking of samples from the bale. Once the sample is taken, the automated grippers 1105 are controlled to return to a position away from the bale 1000.

An automatic label applicator can also be installed on the bale bagging machine 100 after the sealing module 800. The automatic label applicator can be installed as a separate station or coupled to the bottom frame member 105. The automatic label applicator is designed to place a preprinted label on the side of the bagged bale.

As the bale pusher 400 moves the bagged bale 1000 towards the sealing module 300, a switch is used to control the positioning of the automatic label applicator to engage the side of the bagged bale 1000 by moving transversely towards the bagged bale 1000.

Additionally, the sealing module 800 can further comprise an automatic weighing station having load cells incorporated into the third section 215. The automatic weighing station is designed to obtain a legal for trade weight of every bagged bale 1000.

Specifically, driven rollers 216 are supported on the load cells (not shown) to weigh the bales. The driven rollers 216 are controlled using a controller (not shown) to optimize the interface of the bagged bale with the bag closing and sealing mechanisms, to ensure that the bagged bale is positioned correctly for weighing purposes, labeling, and data collection or tagging verification purposes, and provide the control of the necessary speed and acceleration of the driven rollers to promote the proper orientation of the bale.

A bale discharge roller conveyor 1200 can also be installed after the sealing module 800 or in place of the sealing module 800. The bale discharge roller conveyor 1200 can be coupled to the bottom frame member 105 or separately attached to the sealing module 800.

The bale discharge roller conveyor 1200 has a base designed to support bag closing, label application, bale weighing, and bale discharge from the machine. The bale discharge roller conveyor 1200 also has static rollers and driven rollers to facilitate the discharge of the bagged bale 1000. An outfeed section of the bale discharge roller conveyor 1200 has a set of gravity rollers that are isolated from the portion of the conveyor that is mounted to the load cells. These isolated rollers prevent excessive lateral forces from being exerted on the section of the conveyor mounted to the load cells. The bale discharge roller conveyor is also equipped with a linear actuator for indexing of multiple discharged bales.

The bale discharge roller conveyor 1200 is engaged when the bale pusher 400 advances to a predetermined position, so that the bagged bale 1000 engages the driven rollers for the advancement of the bagged bale 1000. After the bag has been closed and sealed, the bagged bale 1000 is weighed. Once the bale has been weighed, the bale discharge roller conveyor 1200 may begin discharging the bale 1000 by allowing the bale to reach the last roller and then fall on the floor.

Figure 24:
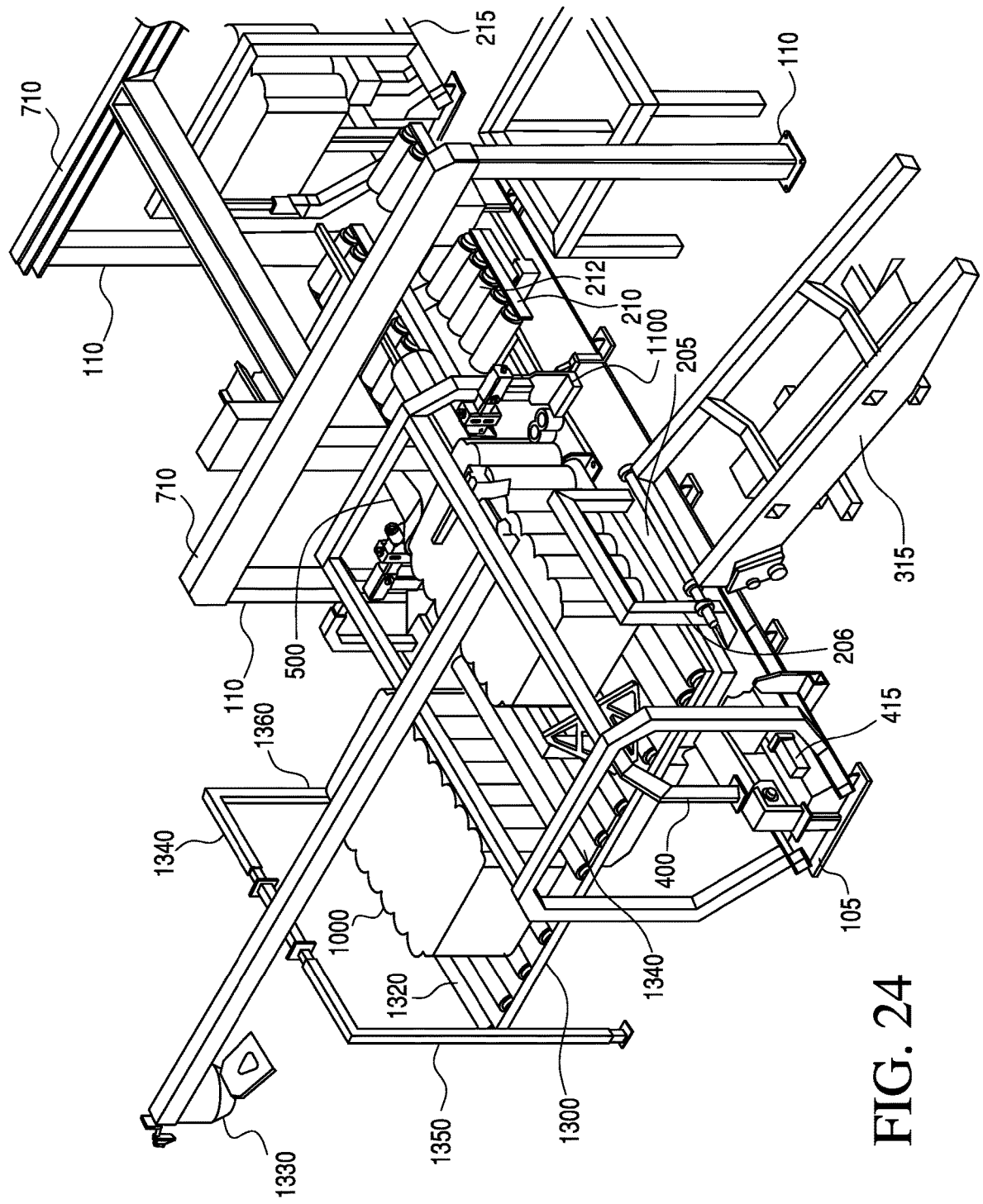
FIG. 24 illustrates an alternative feeding device at the bale feeding station.

As seen in FIG. 24, it is also contemplated that the embodiments of the bale bagging machine discussed above can further include a bale transferring system 1300 located at or near the bale feeding station 300. The bale transferring system 1300 includes a bale transferring conveyor system 1310 having static rollers 1320, an overhead transfer device 1330, and a support frame 1340. The support frame 1340 can be supported by vertical frame members 1350 and/or coupled to the bale bagging apparatus 100. A transverse gantry beam 1360 is provided on the support frame 1340 so that the overhead transfer device 1330 can move transversely with respect to the longitudinal feed direction of the bale bagging apparatus.

In this embodiment, the bale bagging station 300 does not include side bumper 311, instead, one end of the bale transferring system 1300 is coupled to the bale feeding station 300 to feed a bale from an opposite side of the bale feeding station 300 from the bale feeder 315. The other end of the bale transferring system 1300 is coupled to adjacent bale processing equipment that is used to prepare the bales for subsequent bagging, for example, a bale pressing process. After completion of the pressing process, the bale 1000 is positioned on the static rollers 1320 of the transferring conveyor system 1310 so that the overhead transfer device 1330 is engageable with the bale 1000 to move and position the bale 100 transversely into the bale feeding station 300 to begin the bagging process.

Moreover, safeguards can be installed on the bale bagging machine 100 for safety of the equipment and operators. For example, a safety switch (not shown) can be installed on the conveyor system 200 that detects any obstruction to stop the bale pusher 800 from advancing in the direction of the longitudinal feed direction.

Additionally, while the methods of operation have been discussed above in detail, the sequence of the steps is not limited to the above described method. In fact, the sequence of the steps can be performed in any order as needed for the bale bagging operation.

C. Discussion of Various Second Embodiments

Figure 25A:
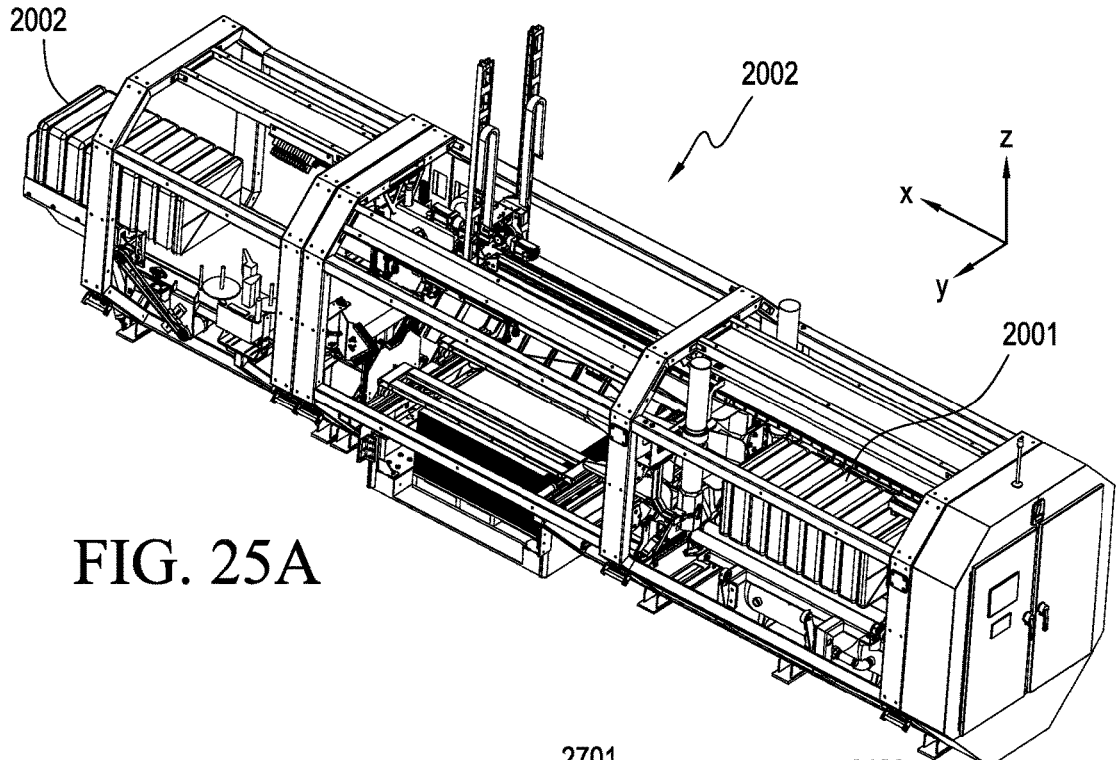
FIGS. 25A and 25B illustrate right perspective view and a left perspective view, respectively, of a bale bagging apparatus according to an alternative embodiment.
Figure 25B:
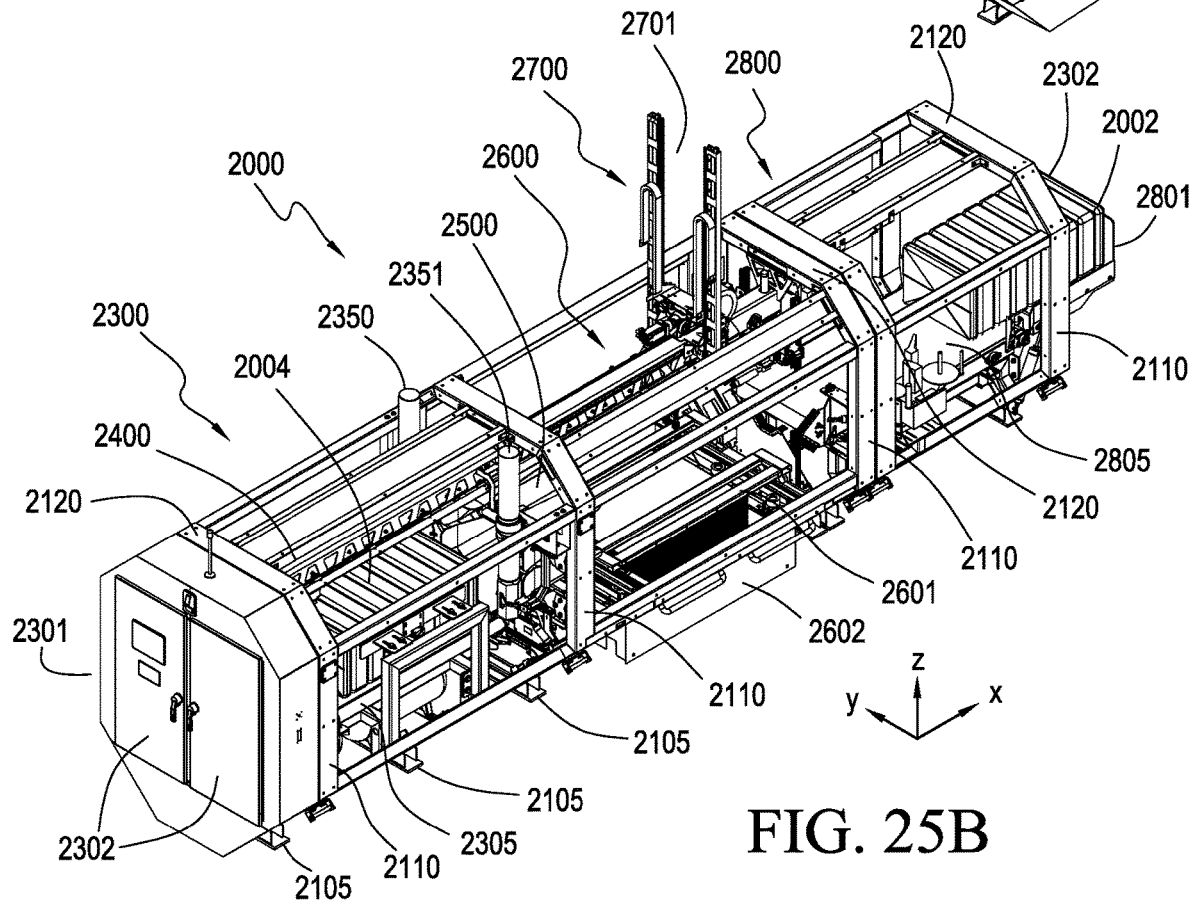
Figure 26B:
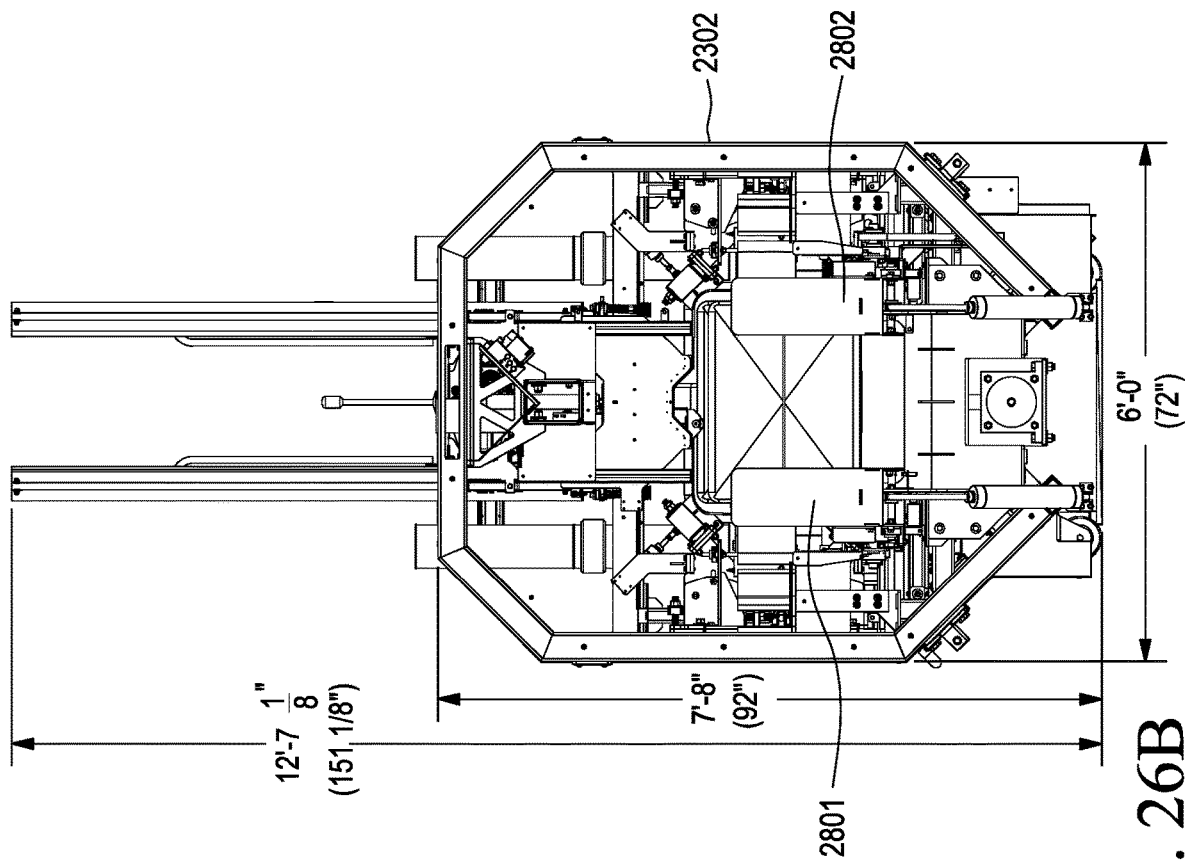
FIGS. 26A and 26B show a front view and a back view, respectively, of the bale bagging apparatus according to the embodiment of FIGS. 25A and 25B.
Figure 26A:
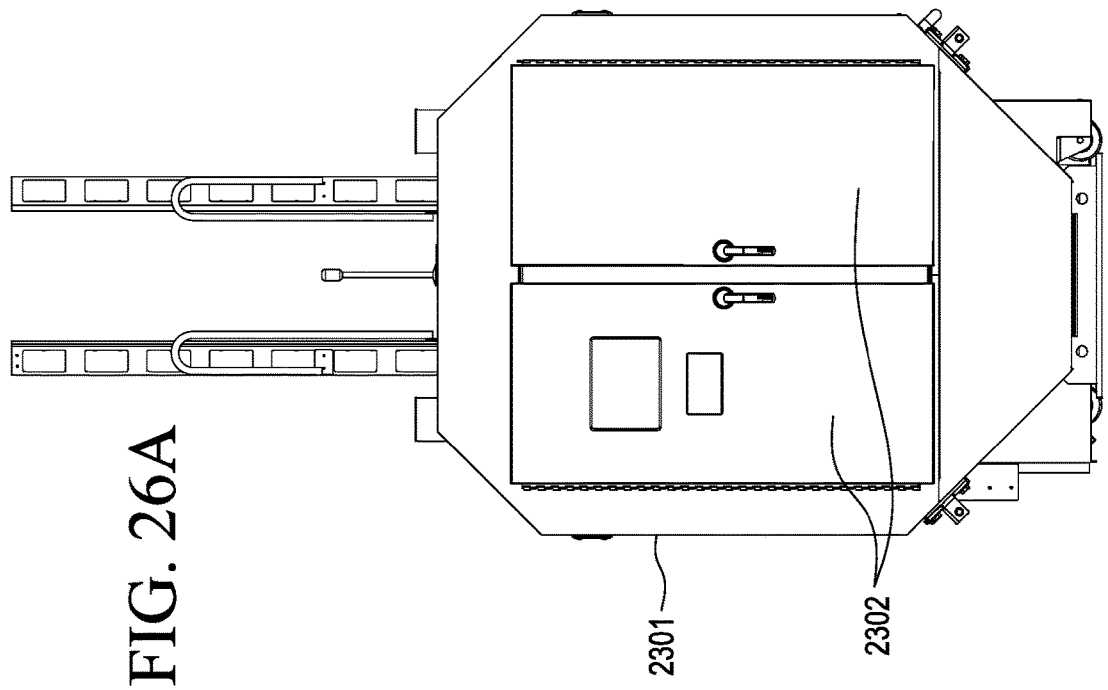
Figure 27A:
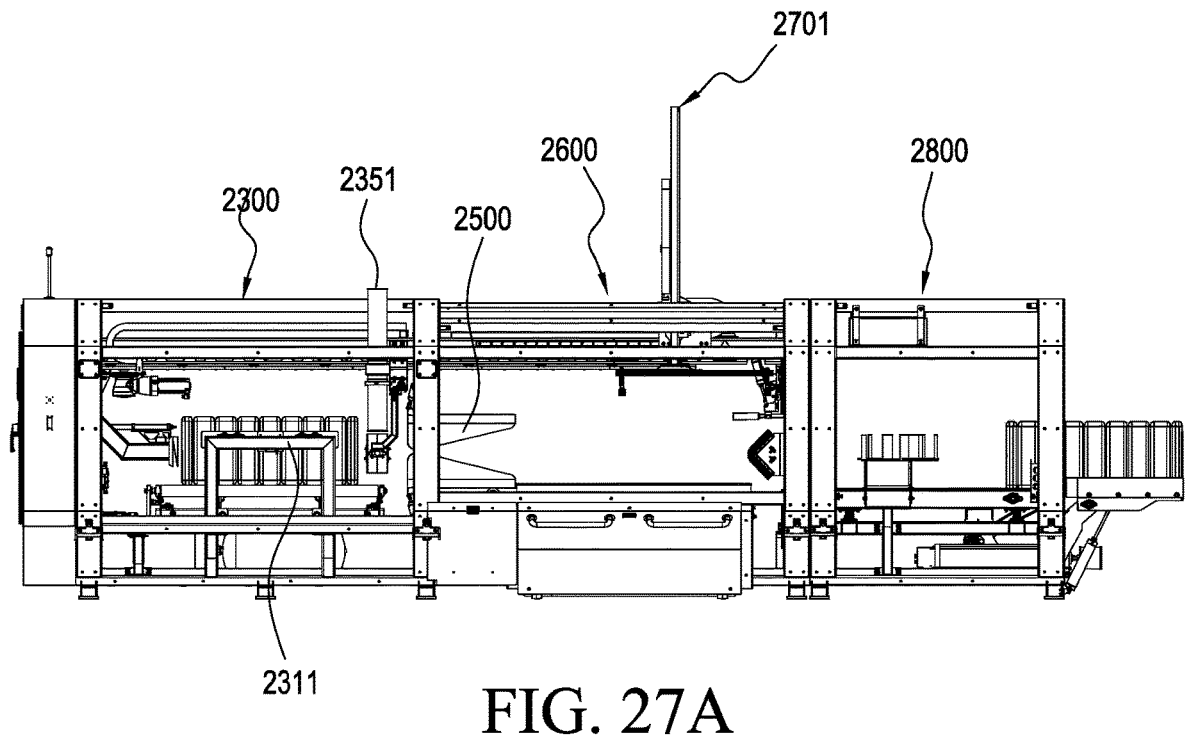
FIGS. 27A and 27B show a right view and a left view, respectively, of the bale bagging apparatus according to the embodiment of FIGS. 25A and 25B.
Figure 27B:
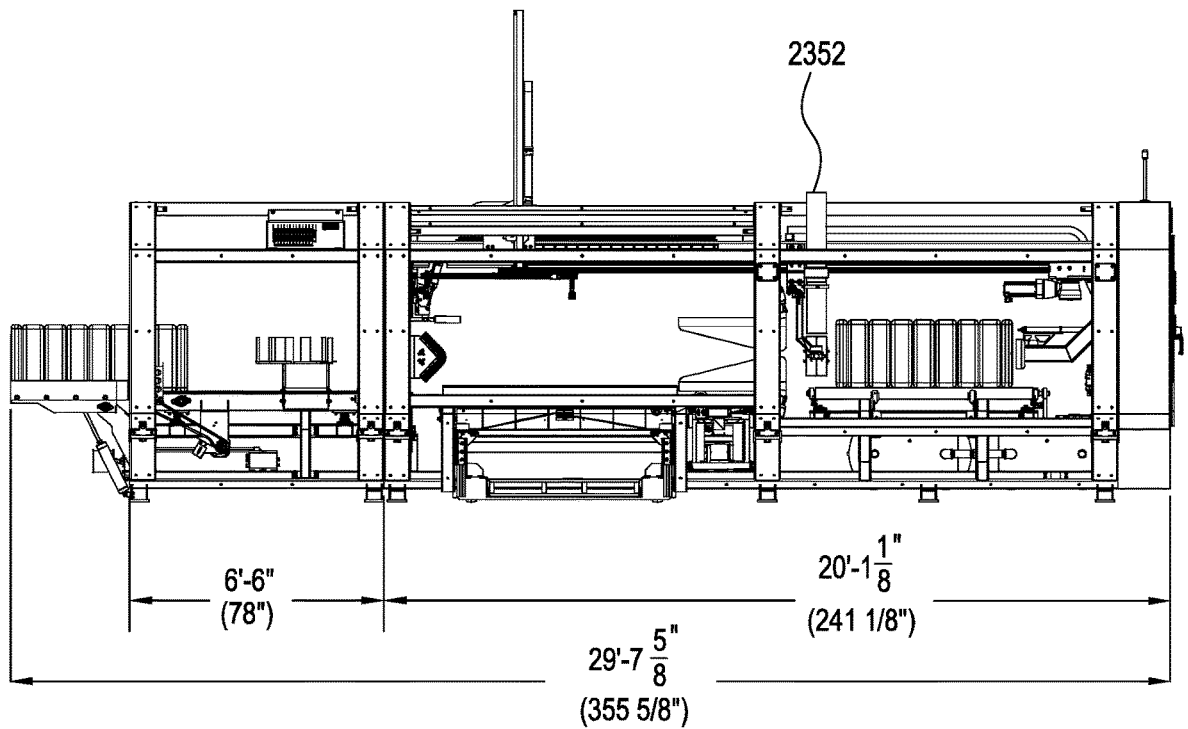
Figure 28:
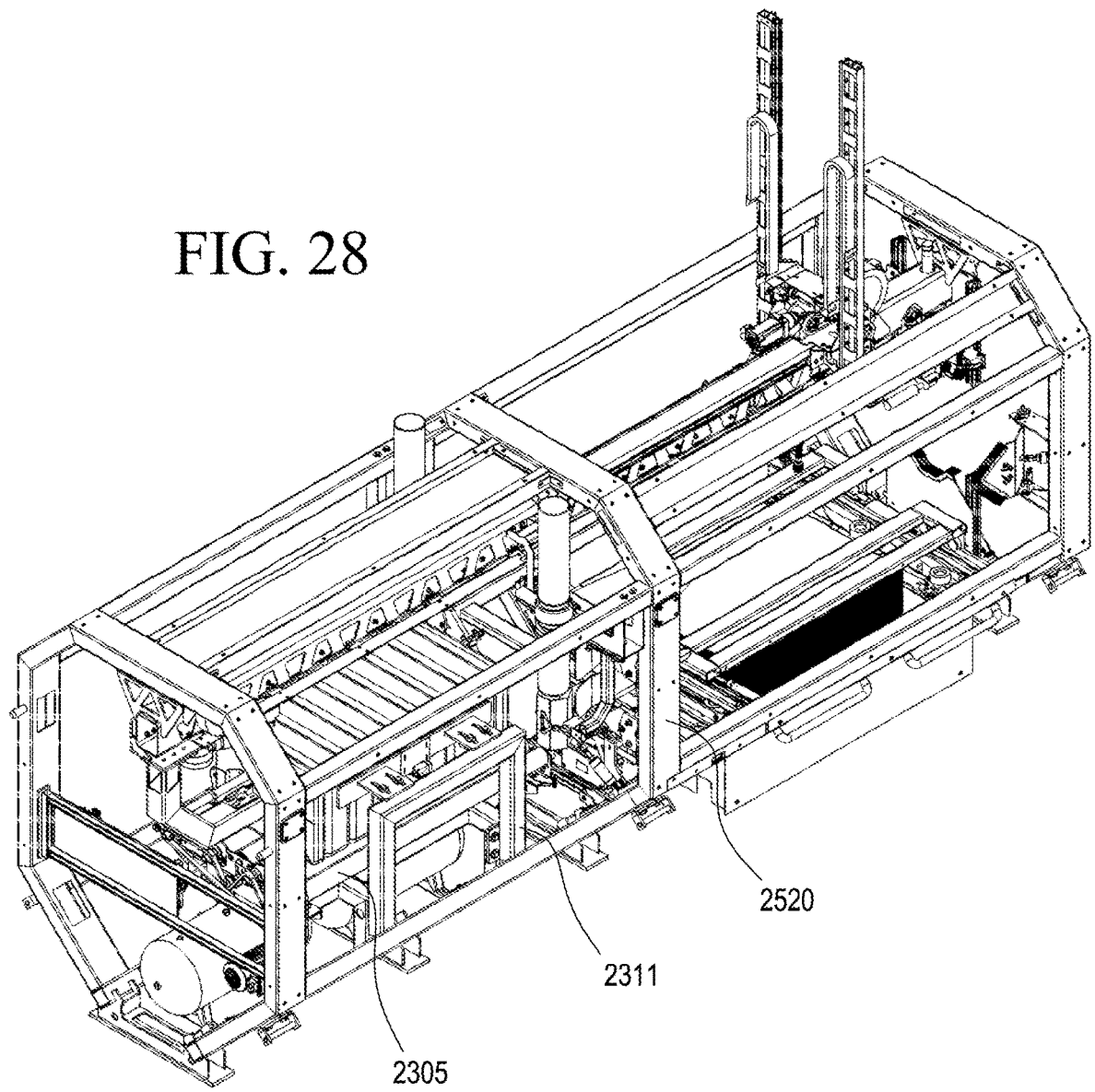
FIG. 28 shows a right perspective view of the load unit and the bag unit according to an embodiment.
Figure 29:
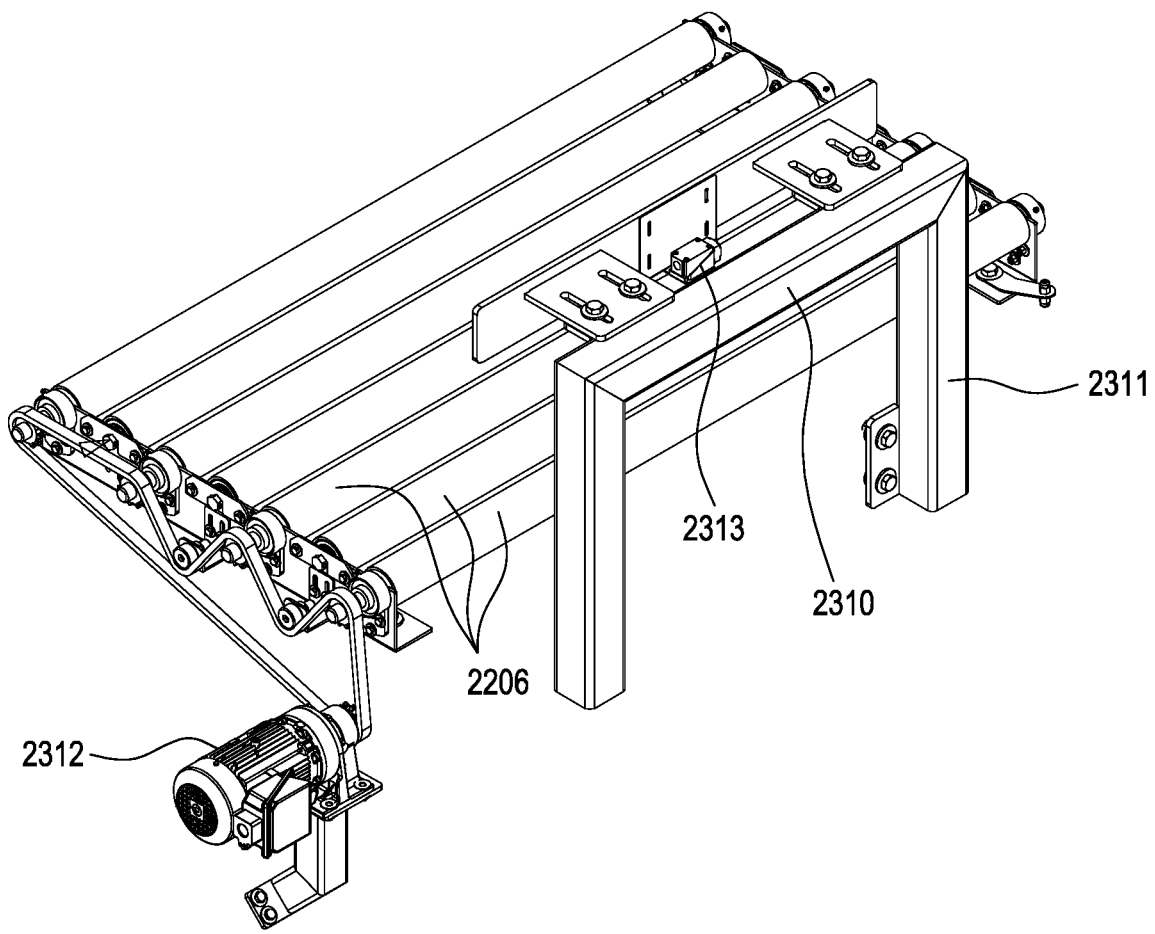
FIG. 29 shows a right perspective view of a staging device according to another embodiment.

In another embodiment, as shown in FIGS. 25A and 25B, a bale bagging machine or apparatus 2000 includes a bale feeding station 2300 on a first or front end 2301 of the bale bagging machine 2000. The bagging machine further includes a sealing module 2800 on a second or back end 2302 of the bagging apparatus 2000. According to an embodiment, the bagging apparatus 2000 further includes a bale chute 2500, a gantry 2700, and a bale bagging station 2600 between the first and second ends 2301 and 2302 of the bale bagging machine 2000.

As shown in FIGS. 25A and 25B, the bale bagging apparatus 2000, as described herein, may be aligned along shown Cartesian coordinates with an x-axis, y-axis, and z-axis. As the bale is processed through the bale bagging apparatus 2000 it may travel along the x-axis. The y-axis extends perpendicular to the x-axis and may lie in a plane parallel to the floor on which the bale bagging apparatus 2000 is positioned. The z-axis may extend perpendicular to the plane of the floor on which the bagging apparatus 2000 is placed, the z-axis also being perpendicular to the x-axis and to the z-axis.

The bale bagging apparatus 2000 may have bottom frame members 2105 and vertical support members 2110. The bagging apparatus 2000 may also have top support members 2120 extending horizontally from vertical support members 2110 across the various processing stations or modules 2300, 2600, and 2800. Panel portions, not shown, may then be attached to the vertical support members 2110 and top support members, to shield an operator from the internal mechanisms of the bagging apparatus 2000. Access doors 2302 may be located at the front end of the bale bagging apparatus 2000 to provide access to the bale feeding station or other mechanisms located on the front end of the bale bagging apparatus 2000. Other various access portions may be provided on the outer cover of the bale bagging apparatus to provide access for an operator to the internal mechanisms of the bale bagging apparatus.

The bottom frame members 2105, vertical support members 2110, and top support members 2120 may have a solid or hollow beam and/or at least two linear bars or beams to create a frame that has the linear bars or beams positioned in parallel to the longitudinal feed direction and connected transversely by feet for supporting the base. The bottom frame member 2105, vertical support members 2110, and top support members 2120 may be made from steel, ferrous alloys, composite materials, or other material that can be used to support the stations and bale during the bale bagging operation.

Figure 30:
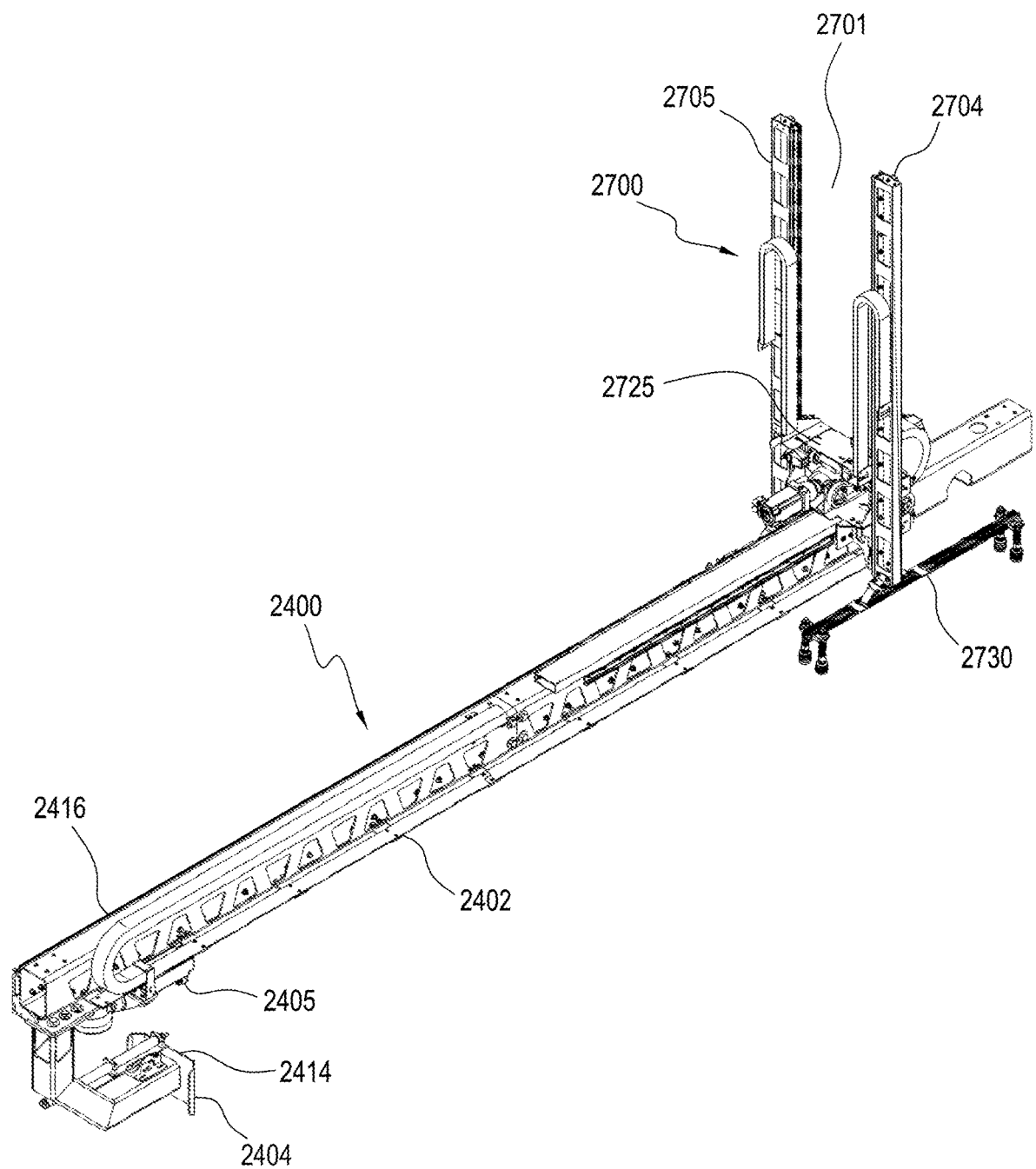
FIG. 30 shows a right perspective view of a pusher assembly of an embodiment.
Figure 31A:
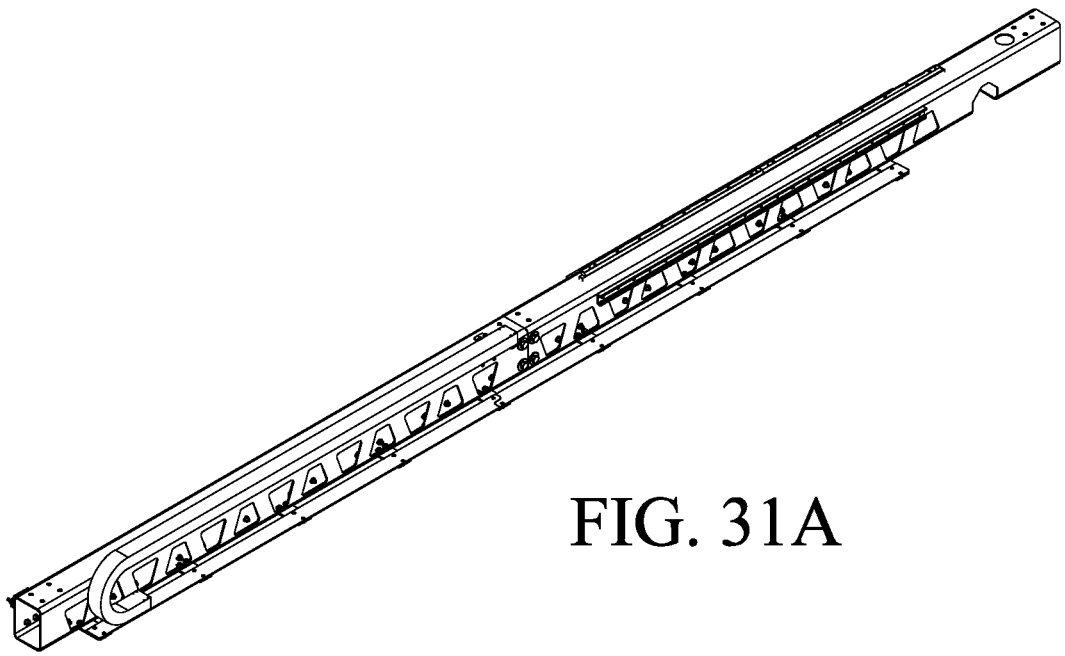
FIGS. 31A and 31B illustrate a right perspective view and a left perspective view, respectively, of the pusher track assembly according to the embodiment of FIG. 30.
Figure 31B:
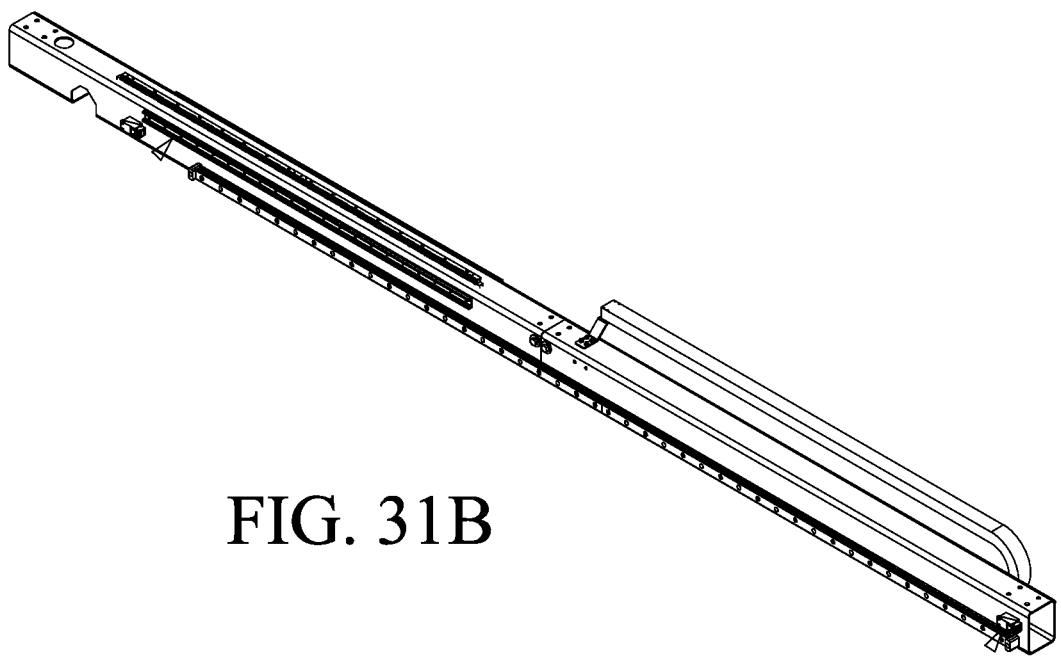
Figure 32:
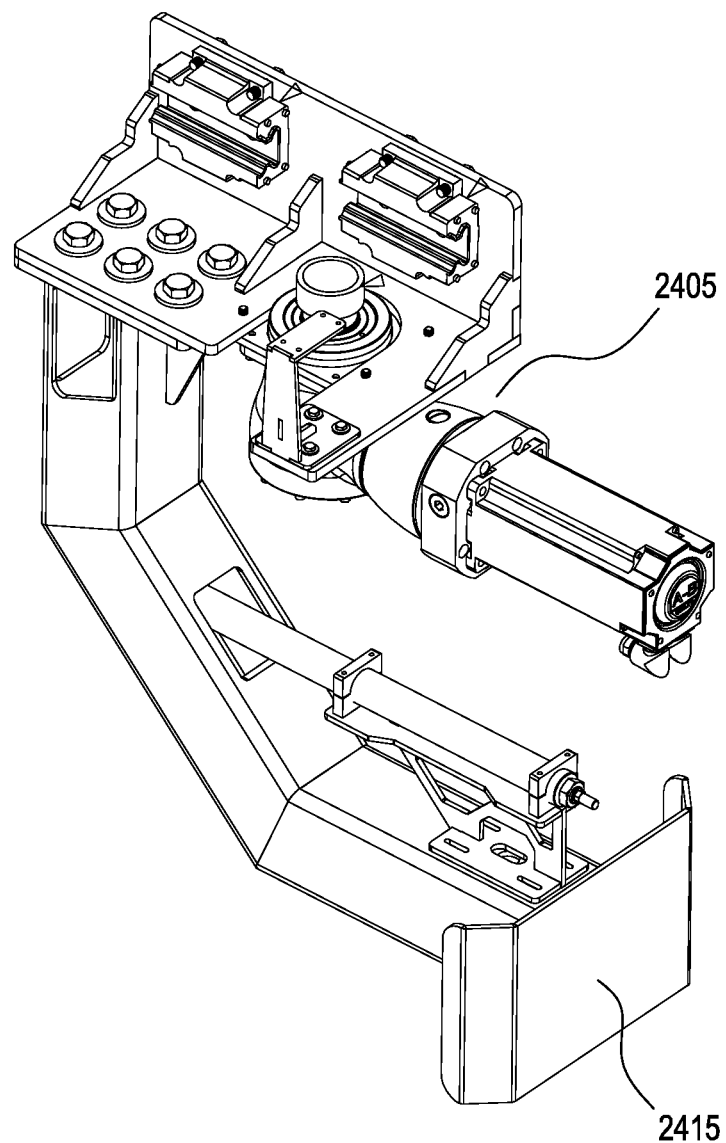
FIG. 32 shows a view of the pusher head assembly according to the embodiment of FIG. 30.

Additionally, the bottom frame members 2105, vertical support members 2110, and top support members 2120 may support a top-mounted bale pusher assembly 2400. The bale pusher assembly is configured to push a bale to be bagged along the x-axis direction of the auto bagger apparatus 2000, from the bale feeding station 2300, through the bale bagging station 2600, to the sealing module 2800. Although in the embodiment of FIGS. 25A and 25B, and as shown in FIG. 30, the bale pusher assembly 2400 may be a top-mounted bale pusher assembly 2400 with pusher head assembly 2404 extending down, the top-mounted bale pusher assembly 2400 being coupled to top support members 2120, a bale pusher assembly may also be a bottom-mounted bale pusher assembly, coupled to a lower portion of the bale bagger apparatus with a pusher head assembly 2404 extending upwards.

Alternatively, the bale pusher may be a side-mounted bale pusher assembly. Whether top-mounted, bottom-mounted, or side mounted, the bale pusher assembly may include a pusher track assembly. A drive mechanism may be configured to drive the pusher head assembly along the pusher track assembly in the direction of the x-axis, to move a bale to be bagged and processed along the x-axis. Although the bale pusher assembly is described herein as a means of moving the bale along the x-axis, the bale bagging apparatus is limited solely thereto, but may include other means of pushing, pulling, or otherwise moving a bale to be processed along the x-axis of the auto bagger 2000.

The bale feeding station 2300 may include a bale receiver 2305 that is an opening that is used to receive a bale to be bagged 2001. The bale to be bagged 2001 may be received from a direction parallel to the y-direction, which is perpendicular to the feed direction (x-direction) of the auto-bagger. Alternatively, the bale to be bagged 2001 may be received from a direction parallel to the feed direction of the auto-bagger, or in other words, parallel to the x-direction. The bale to be bagged 2001 may be received in a direction parallel to the x-direction or and aligned with the feed direction of the auto-bagger or offset from the feed direction of the auto-bagger in the y-direction or even the z-direction. The bale feeding station 2300 may alternatively receive the bale to be bagged 2001 from a direction having a component in the z-direction, or be received from an input located above the bale feeding station 2300.

The bale feeding station 2300 may have transverse rotating rollers 2206 coupled to a frame using pins or other fastening devices to allow the rollers to rotate in a direction transverse to the feed direction (x-axis) of the auto bagger 2000. Alternatively, or even preferably, instead of rollers, the bale feeding station includes stationary rails along which the bale to be bagged is slid. The exposed surface of the rails may be covered with a low-friction material. Alternatively, the bale feeding station 2300 may simply be a planar surface with support to maintain the bale to be bagged in an elevated position aligned with the other modules of the auto-bagger apparatus.

A staging device 2310 of the bale feeding station 2300 may include a side bumper 2311 located on the opposite side of the bale receiver 2305, to stop the movement of the bale to be bagged 2001 in the transverse direction (y-axis).

The staging device 2310 can also include a switch or a photoeye 2313 or light curtain to detect the presence of the bale at the appropriate location. When the bale is detected by the switch or photoeye or light curtain 2313, the switch or photoeye or light curtain can be used to control the movement of the drive unit 2312 roller device of the bale feeding station 2300.

As seen, for example, in FIGS. 25B and 30, the bale pusher 2400 may have a start position near the bale feeding station 2300. The bale pusher 2400 has a pusher head assembly 2404, a pusher track assembly 2402, and a driving mechanism 2405 for moving the bale pusher head assembly 2404 from the bale feeding section 2305 to the bagging station 2600 and back to the bale feeding section 2305. The pusher track assembly 2402 couples the pusher head assembly 2404 to the driving mechanism 2405 to allow the pushing of the bale in the longitudinal feed direction along the x-axis.

The pusher head assembly 2404 of the bale pusher 2400 may have a planar face 2414 that runs transversely to the longitudinal feed direction. The planar face 2414 may have a surface contact area 2415 that allows the distribution of force on the pushed bale, so that the pushed bale is not damaged. The pusher head assembly 2404 and pusher track assembly 2402 may be made from steel, metal alloys, composites, and other material that is designed for moving loads.

The driving mechanism 2405 may move the bale pusher 400 along a linear drive track 2402 coupled to the bottom frame member 2105 linearly in the longitudinal feed direction. The driving mechanism 2405 can be driven by a servo gear motor 2416 that drives a rack (not shown), i.e., a gear, along a pinion (not shown) on the pusher track assembly 2402. Alternatively, other drive mechanisms may be used to move the driving mechanism 2405 along the linear drive track 2402, such as, chains, pulleys, or similar devices.

Left sampling assembly 2352 and right sampling assembly 2351 may be provided to a latter portion of the bale feeding station 2300. Before a bag to be baled 2001 is pushed out of the bale feeding station 2300 and through bale chutes 2500, left and right samples or at least one, preferably at least two samples may be obtained by bale sampling apparatuses, such as left sampling assembly 2352 and right sampling assembly 2351. Such a sampling apparatus, may include the bale sampling apparatus as described by U.S. application Ser. No. 14/138,327, published as U.S. 2014/0174209, which is incorporated in its entirely herein by reference.

Figure 40B:
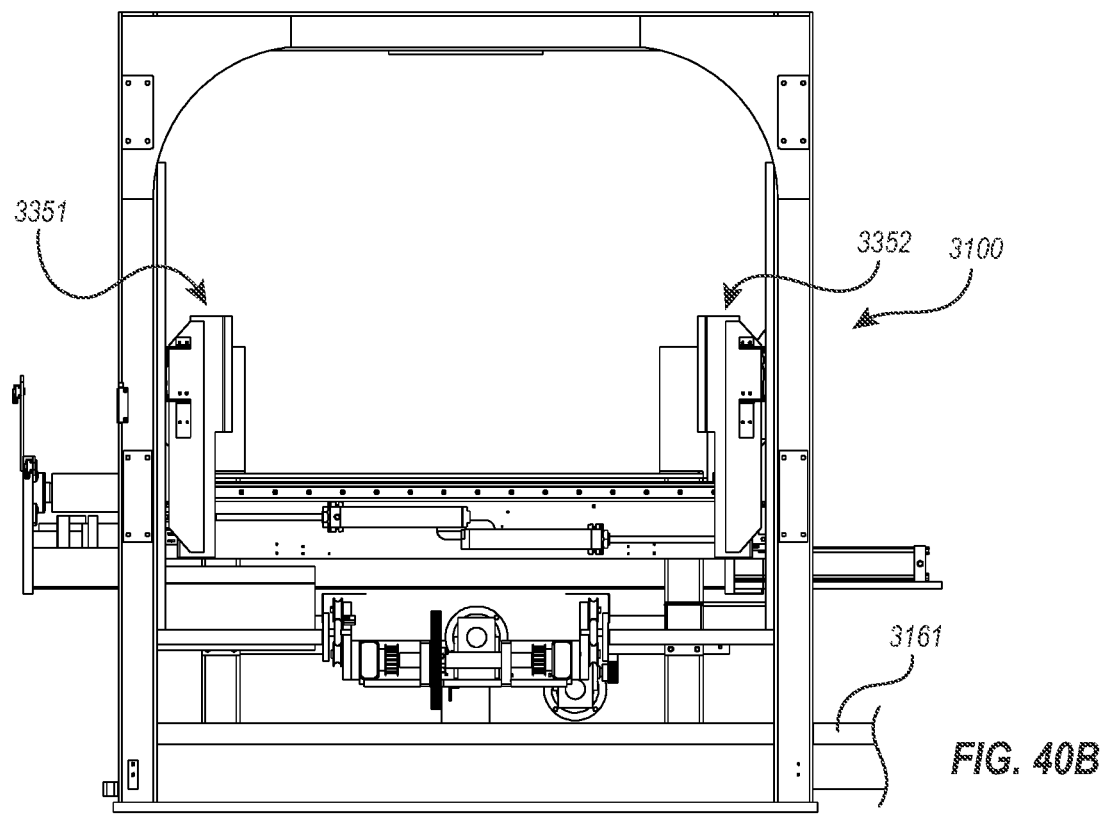
FIG. 40B shows another view of the embodiment of the bale sampling station of FIG. 40A.

FIG. 40A shows a perspective view of another embodiment of a bale sampling station 3100 within bale feeding station 3300. Bale sampling station 3100 may include a first (right) gripper assembly 3351 and an opposing second (left) gripper assembly 3352. Gripper assemblies 3351 and 3352 are arranged on opposing sides of the longitudinal axis, and may be considered to be between the bale feeding station 3300 and a bale bagging station 3600 (as shown, for example, in FIG. 46C). Gripper assemblies 3351 and 3352 are configured to obtain respective samples from opposite sides of a bale to be bagged, before the bale is transported through a chute to be placed into a bag, as shown, for example, in FIG. 46C.

While obtaining their respective samples, first and second gripper assemblies 3351 and 3352 may be configured to travel along an axis of movement M that is generally perpendicular to the longitudinal axis of the bagging apparatus. While a bale to be sampled is between first gripper assembly 3351 and second gripper assembly 3352, the first gripper assembly 3351 obtains a first sample from the bale. Second gripper assembly 3352 may correspondingly obtain a second sample from the bale, on an opposite side. The portions removed from the bale as samples may be precut to facilitate removal from the bale.

Figure 40C:
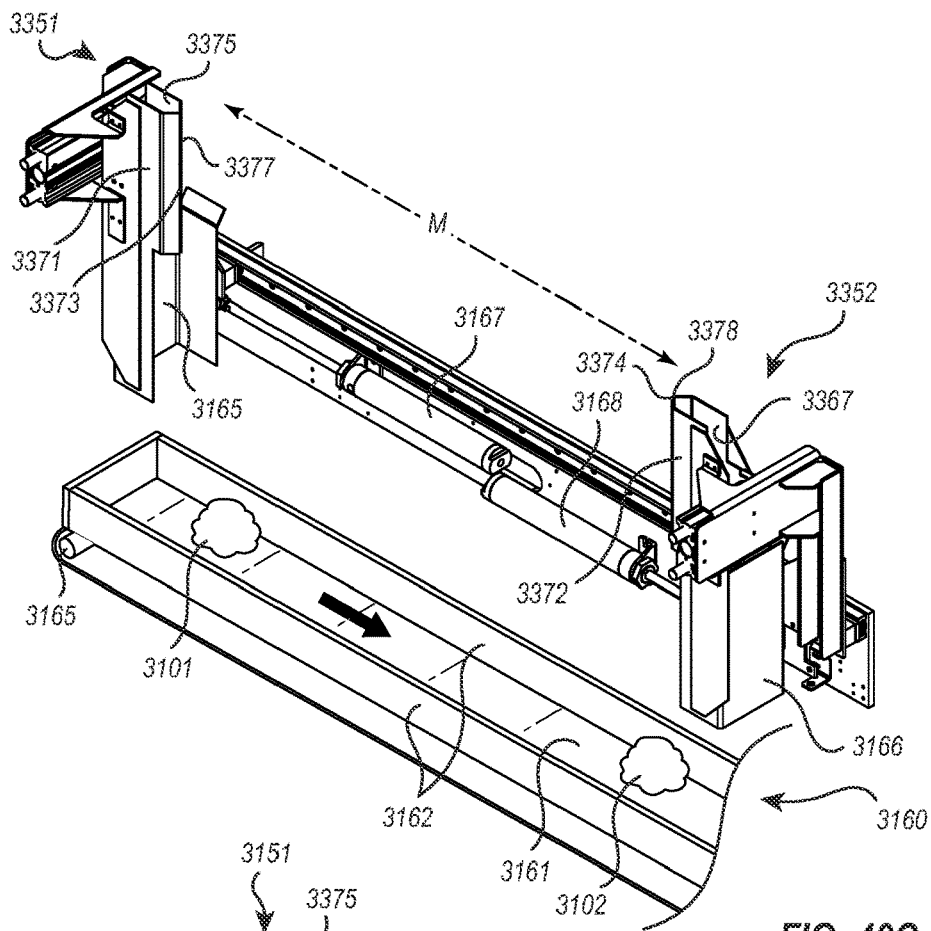
FIG. 40C shows a perspective view of an embodiment of an isolated bale sampling device in a first configuration.
Figure 40D:
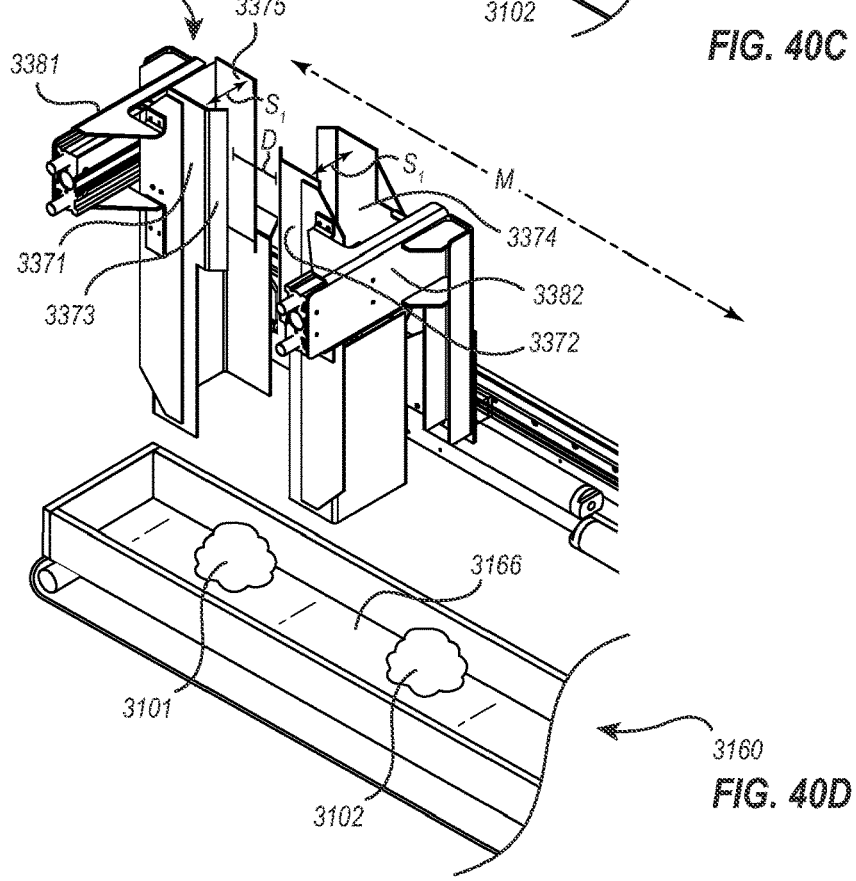
FIG. 40D shows a perspective view of an embodiment of an isolated bale sampling device in another configuration.

As shown in FIGS. 40C and 40D, first and second gripper assemblies 3351 and 3352 are configured to travel in a direction of movement along direction M, that is generally perpendicular to the longitudinal axis of the bagging apparatus by actuators 3167 and 3168, respectively. Further, first gripper assembly 3351 includes opposing jaws 3371 and 3375, with respective opposing edges 3373 and 3377. Opposing edges 3373 and 3377 may be generally straight, as shown in FIGS. 40C and 40D, or they may be curved. Opposing edges 3373 and 3377 and jaws 3371 and 3375 may be clam-shell type grippers configured to grip a bale sample. First gripper assembly 3351 may further include actuator assembly 3371 that is configured to bring first jaw 3371 into contact or close proximity to second jaw 3375. In one embodiment, one of jaws 3371, 3375 remains stationary while the other of jaws 3371, 3375 is moved toward the stationary jaw. For example, in the embodiment of FIG. 40D, first jaw 3371 remains stationary while second jaw 3375 is brought toward and moved away from the first jaw 3371 along direction S1 by actuator assembly 3381.

Similarly, second gripper assembly 3352 includes opposing jaws 3372 and 3374, with respective opposing edges 3376 and 3378. Opposing edges 3376 and 3378 may be generally straight, as shown in FIGS. 40C and 40D, or they may be curved. Opposing edges 3376 and 3378 and jaws 3372 and 3374 may be clam-shell type grippers configured to grip a bale sample. Second gripper assembly 3352 may further include actuator assembly 3382 that is configured to bring first jaw 3372 into contact or close proximity to second jaw 3374. In one embodiment, one of jaws 3372, 3374 remains stationary while the other of jaws 3372, 3374 is moved toward the stationary jaw. For example, in the embodiment of FIG. 40D, first jaw 3372 remains stationary while second jaw 3374 is brought toward and moved away from the first jaw 3372 along direction S2 by actuator assembly 3382.

Alternatively to the second jaw 3375 being brought towards the first jaw 3371 by a linear motion along direction S1, first gripper assembly 3351 may be configured such that second jaw 3375 is brought towards first jaw 3371 by an arcuate path around a pivot point. Second gripper assembly 3352 may be similarly configured. And in another embodiment, both opposing jaws can be brought toward each other by a movement of both jaws, and not, as described above, by a single jaw remaining stationary while the opposing jaw is brought to the stationary jaw.

Once a sample has been obtained, as shown in FIG. 40D, the opposing jaws of the first gripper assembly 3351 and the second gripper assembly 3352 may be opened to release the respective first and second samples. As shown in FIG. 46C, each side of sampling assembly 3100 may be provided with a receptacle or box 3355 into which the respective tripper assemblies drop their respective samples. Alternatively, a single box is provided on one side of the sampling assembly, and each of the first gripper assembly 3351 and the second gripper assembly 3352 drops its respectively obtained sample into the box, either simultaneously or at different times. It should be noted, for example, before the second gripper assembly 3152 is moved by actuator 3168 toward the first gripper assembly 3351, the bale to be bagged, from which the first and second samples have been obtained, must be moved down the longitudinal axis of the bale sampling apparatus so as to not obstruct the movement of the second gripper assembly.

In another embodiment, a conveyor system 3160 is provided below the bale sampling station 3100. Conveyor system 3160 may include belt 3166, rollers 3169, a belt powering mechanism, and opposing side-rails 3162, which serve to maintain samples 3101 and 3102 on the belt. Conveyor system 3160 may then transport obtained samples 3101 and 3102 to a different location within a bagging facility, to be combined, labeled, bagged, and/or processed. For example, conveyor system 3160 may transport the obtained samples to a sample processing station to be manually labeled and/or bagged. Covers may be provided over the conveyor belt so as to protect the path of the obtained samples. Openings with such cover may be provided through which the obtained samples may be dropped from their respective first and second gripper assemblies 3351 and 3352.

In one embodiment, as shown in FIG. 40D, the first gripper assembly 3351 and the second gripper assembly 3352 may obtain and drop their respective first and second samples 3101 and 3102 onto belt 3161 from their respective sides, without traveling toward each other relatively, after obtaining their respective samples.

According to another embodiment, the second gripper assembly 3352 is brought across the longitudinal axis of the bagging apparatus toward the first gripper assembly 3351 to a distance apart of D before dropping its obtained sample 3102 onto belt 3161. Or alternatively, the first gripper assembly 3351 is brought across the longitudinal axis of the bagging apparatus toward the second gripper assembly 3352 to within a distance D or less of from the second gripper assembly 3352 before dropping its obtained sample 3101 onto belt 3161.

For example, distance D may be 6 inches. However, distance D may be as small as zero, or in other words, the first and second gripper assemblies may come into contact with each other.

First gripper assembly 3351 may be provided with a drop chute 3165 to protect the fall of the sample obtained by the first gripper assembly 3351 into either a box or onto the conveyor system.

In another embodiment, it may be ensured that first and second grippers 3351 and 3352 do not come into contact with each other. Rather, for example, second gripper assembly 3352 may move along axis of movement M and stop at distance of about 6 inches from first gripper assembly 3351 G1. At this point second gripper assembly 3352 may drop the second sample into box 3355 and return to its original side opposite from the first gripper assembly 3351.

In one embodiment, the first sample 3101 and the second sample 3102 are dropped into the box 3355 at different times. In another embodiment, the first sample 3101 and the second sample 3102 are dropped into their conveyor system at the same time or at different times.

After one or more samples are obtained from the bale to be bagged, the bale is pushed toward a bale chute. For example, as shown in FIGS. 25A and 25B, the bale chute 2500 may be positioned at the front of the bale bagging station 2600, between the bale feeding station and the bale bagging station 2600. The bale chute 2500 has an input end 2505 near the bale feeding station 2300 and an output end 2510 near the bale bagging station 2600 for receiving and discharging the bale moved longitudinally along the bale bagging machine 2000. The bale chute 2500 comprises at least two pivoting sections, but preferably, has at least four pivoting sections 2515, 2516, 2517, 2518, mounted to the frame portion of the auto-bagger. For example, the bale chute may be coupled to chute frame 2520 and attached to the bottom frame member 2105.

Figure 36:
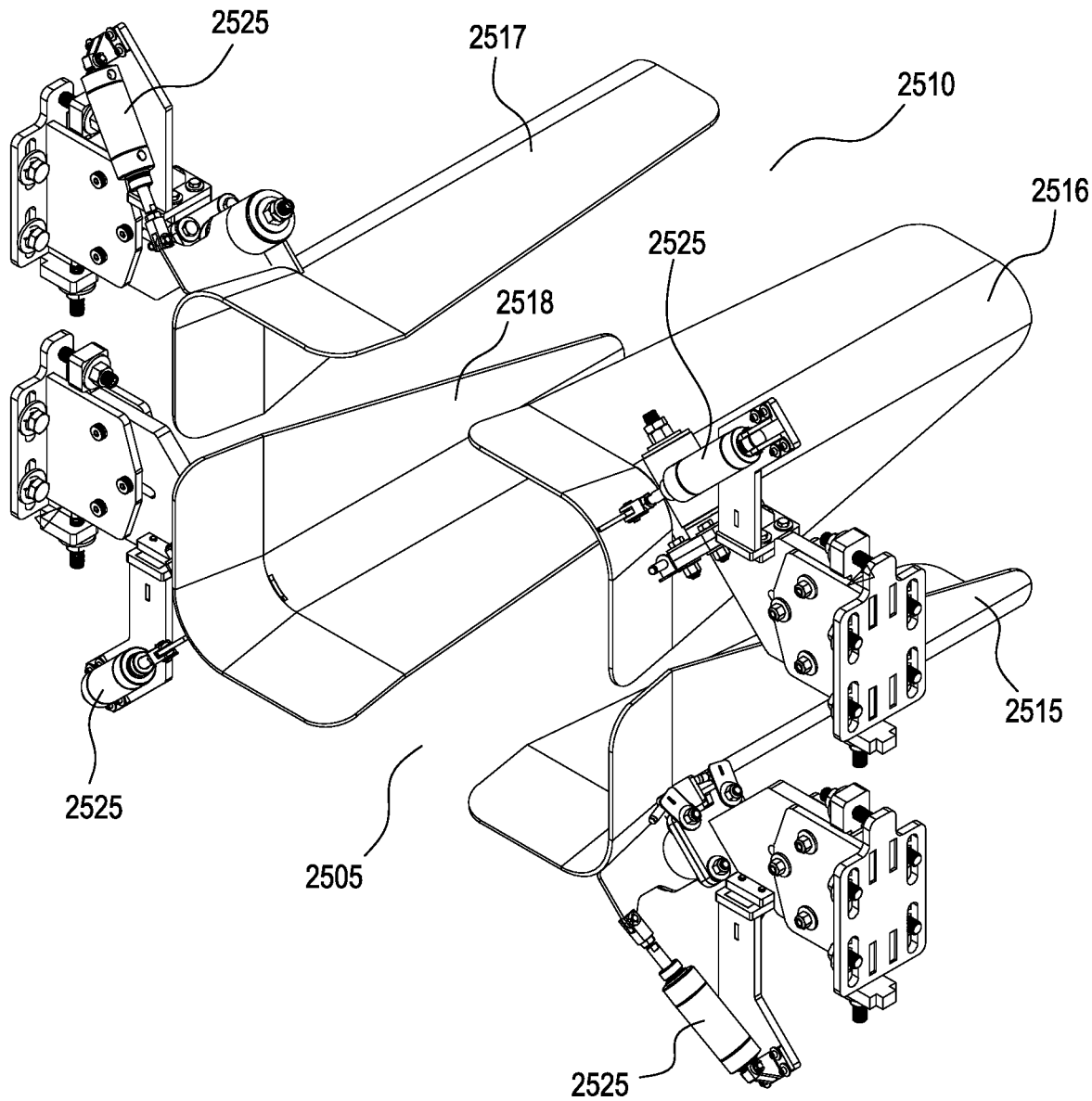
FIG. 36 illustrates a chute assembly according to an embodiment.

As seen in FIG. 36, the at least four pivoting sections 2515, 2516, 2517, 2518 may be pivotally connected to the chute frame 2520 using actuators 2525, e.g., double acting pneumatic cylinders, to move between at least a closed position and an open position. The positioning of the actuators 2525 are controlled using a controller (not shown).

FIG. 36 shows the at least four pivoting sections 2515, 2516, 2517, 2518 pivoted in the open position. In a closed position, similar to other embodiments described herein, the actuators 2525 pivot the pivoting sections 2515, 2516, 2517, 2518 towards each other to a center position of the bale chute 2500, i.e., the pivoting sections are pivoted towards the other pivoting sections. In the open position, the at least four pivoting sections 2515, 2516, 2517, 2518 are pivoted from the closed position to the open position, where the four pivoting sections 2515, 2516, 2517, 2518 are driven outwardly away from the center position of the bale chute 2500, i.e., the pivoting sections are pivoted away from the other pivoting sections.

The bagging station 2600 is located after the bale feeding station 2300 and the bale chute 2500. The bagging station 2600 according to an embodiment, instead of having a roller section, as described in other embodiments, may include a simplified bag/bale apparatus. In one embodiment, the bag/bale apparatus includes bag/bale gate 2601, which may include slides including rails 2620 and 2621 with a slide surface 2610 and 2611 formed on each respective rail 2620 and 2621. The rails may be formed of formed steel, angle iron, ferrous alloys, composite materials, or other material that can be used to support the stations and bale during the bale bagging operation. Slide surfaces 2610 and 2611 may be formed from a material that facilitates a sliding of the bale being processed (i.e., a material having a low coefficient of friction), as the bale is pushed along the top of the slide surfaces 2610 and 2611. The slide surfaces may be made from a Teflon based material, UHMW (Ultra High Molecular Weight Polyethylene), or PTFE Sheet (PolyTetraFlouro-Ethylene). A bag receptacle 2651, which may include a drawer mechanism 2650 openable by traveling in a direction parallel to the y-axis by an operator pulling on handles 2655, may be placed within the bagging station 2600 below the bag/bale gate 2601 and below the pusher track assembly 2402. At ends 2622, 2623, 2624, and 2427, of the rails 2620, 2621, rollers of linear bearings may be provided to allow travel of the rails 2620, 2621, along support members 2615, 2616, in a direction parallel to the y-axis, as represented by the large arrows.

Alternatively, rails 2620 and 2621 may be provided, according to one embodiment, the rails are stationary with respect to the support members 2615, 2616, are positioned at such a position as to provide a sufficient gape or opening 2660 through which a bag to be used in the bagging of the bale may be retrieved, while still providing sufficient vertical support for the bale to be bagged.

According to an embodiment, when the gantry 2700 is to obtain a bag to be placed around the bag to be baled 2001, rails 2620, 2621 of bag/bale gate 2601 may be pushed by actuator 2625 to a position toward the outer edge of the bagging station 2600, to provide space through which to retrieve the bag through gap or opening 2660. Then, after the bag is retrieved, the rails 2620, 2621 may be pushed backed toward a center line of the bag bail gate to allow the bale to be bagged to slide across the top surfaces of the side surfaces 2610, 2611.

Figure 37:
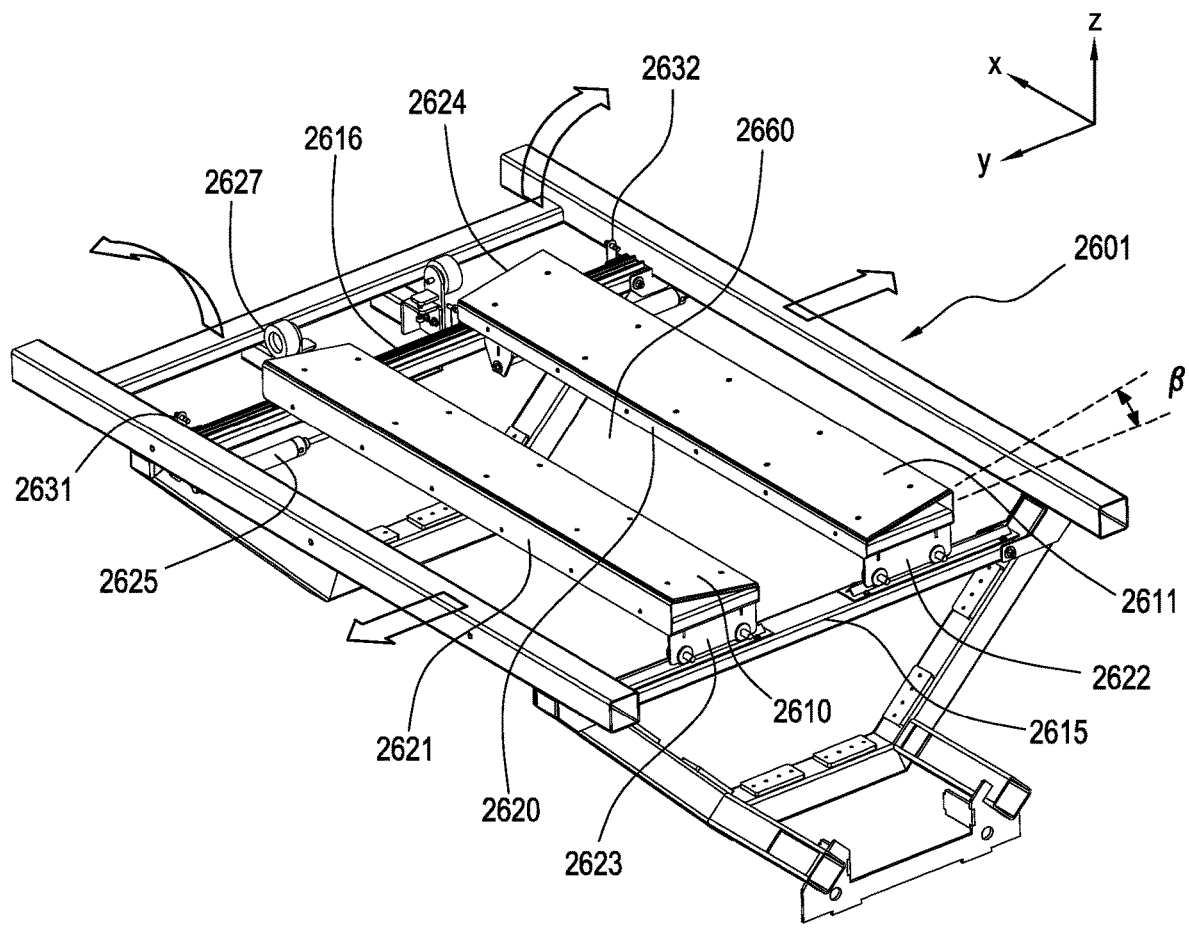
FIG. 37 shows a bag/bale gate assembly according to an embodiment.
Figure 38:
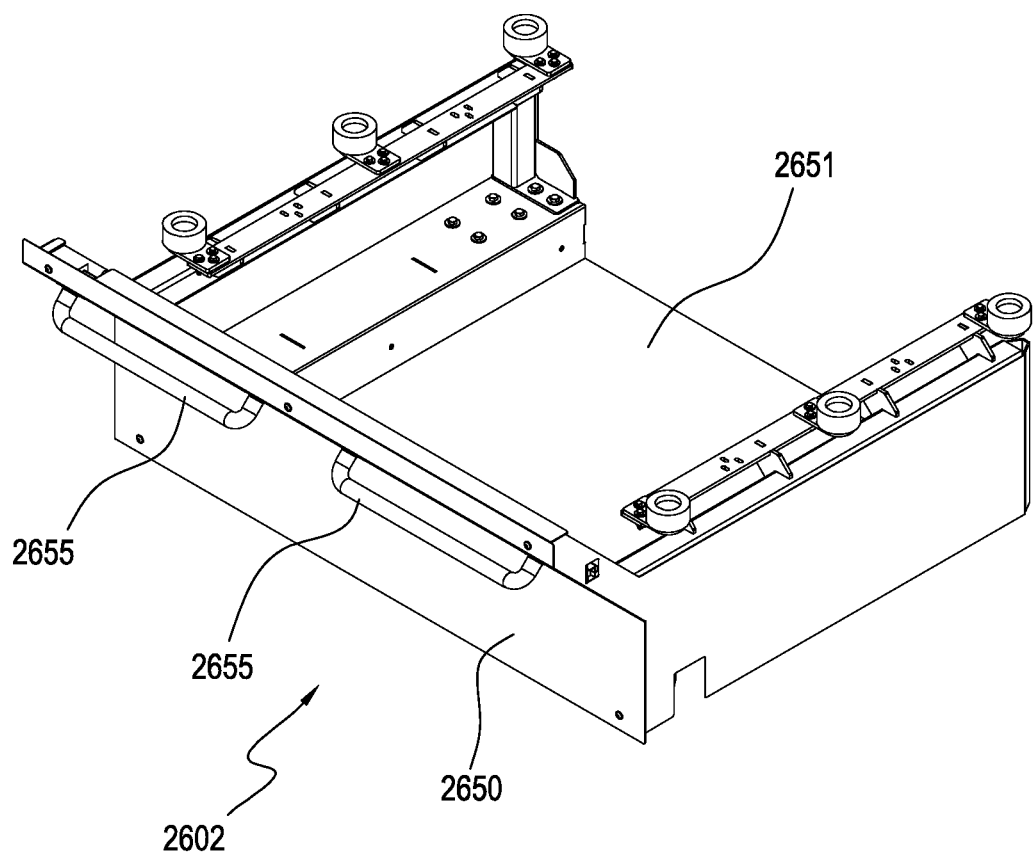
FIG. 38 illustrates a bag drawer assembly according to an embodiment.
Figure 39A:
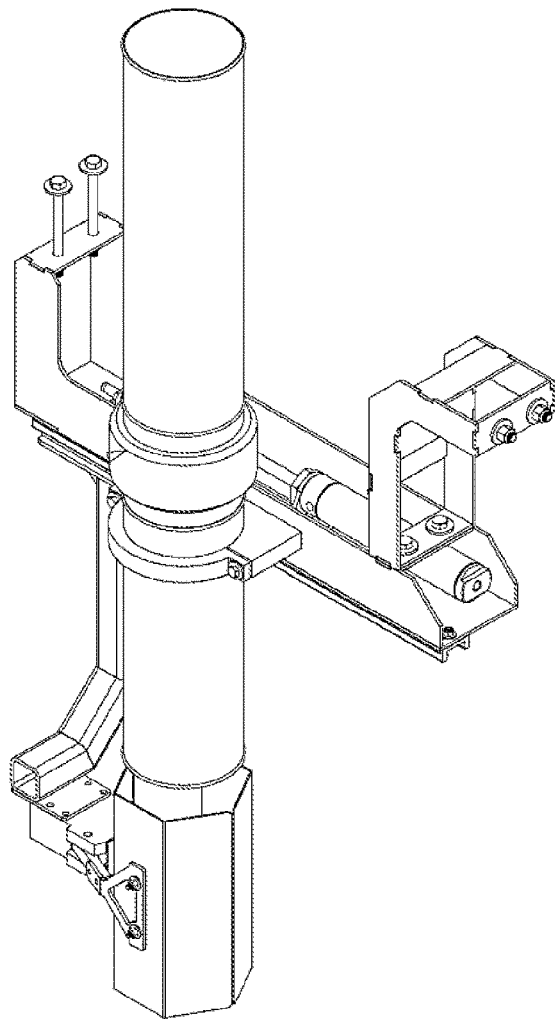
FIGS. 39A and 39B shows a left-side sample assembly and a right-side sample assembly, respectively, according to another embodiment.
Figure 39B:
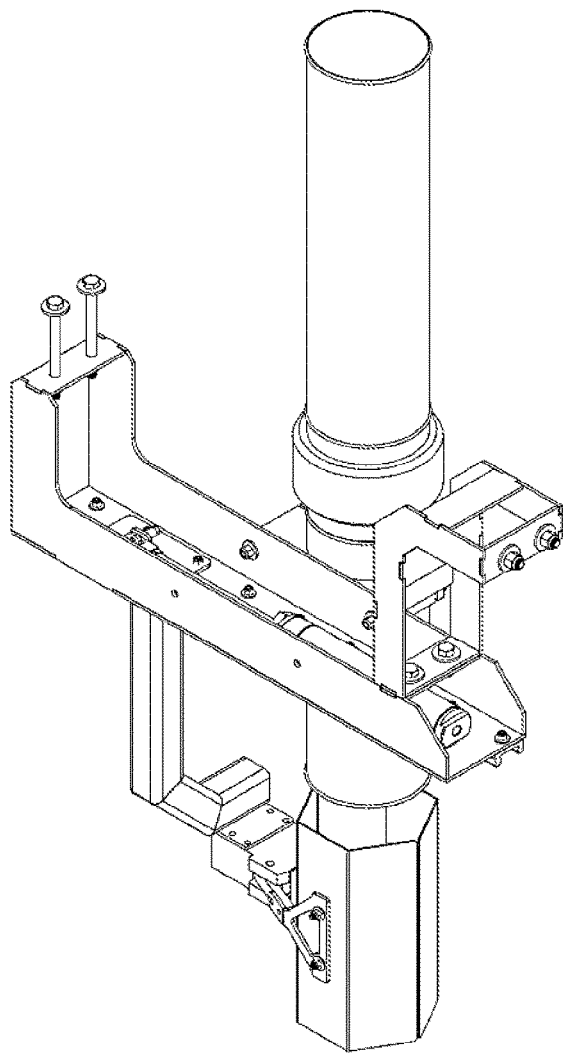

Additionally, as shown in the arched arrows of FIG. 37, depending on the size or geometry of the bag to be placed over the bale to be bagged, rails 2620, 2621 may be pivoted around pivot points, for example, as shown at points 2631 and 2632, when pushed to the outer position, to provide even more room or a larger opening 2660 through which to retrieve the bag. For example in the case that larger bag is to be used to bag the bale, for example, in the case that a non-gusseted bag is used, the non-gusseted bag has a larger cross section area, when viewed in the top-plan view, and thus a larger opening 2660 is preferable. Additionally, to provide control of the bale being processed, rails may be formed to provide a slide surfaces angled in at an angle β with a horizontal plane. Such an arranged bale bagging station 2600 may be preferable to bagging stations of other embodiments described herein, as the bale bagging station 2600 does not include rollers which may pinch or remove the bag or a portion of the bag from the bale, or otherwise stall the transport of the bale. Additionally, providing the bag receptacle 2602 within the lower portion of the bale bagging station as opposed to the side of the bale bagging station, permits the bale bagging station 2600 to be self-contained and covered and thus less exposed and susceptible to damage or harm to operators.

Figure 33:
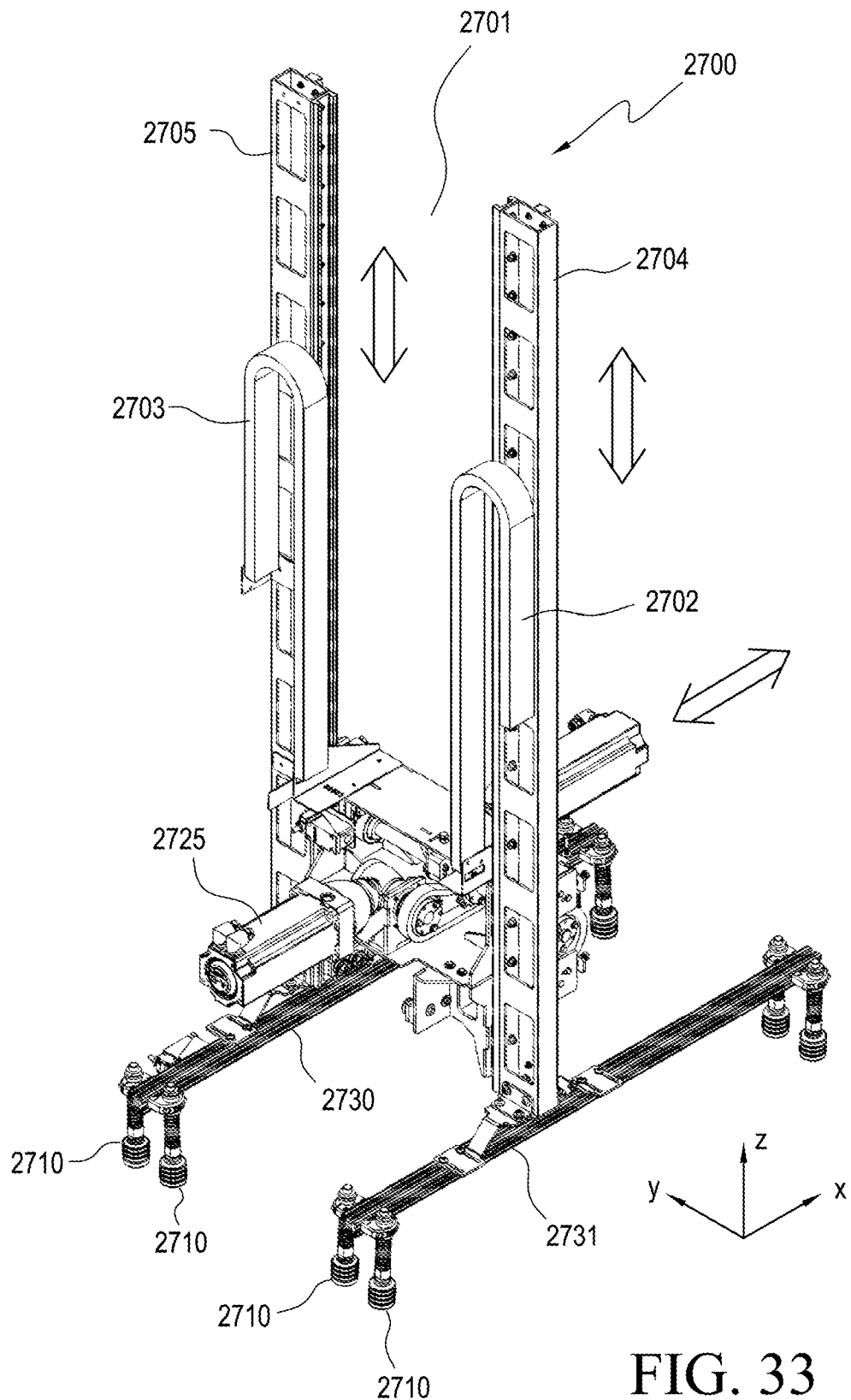
FIG. 33 shows a right perspective view of the gantry assembly according to an embodiment.
Figure 34:
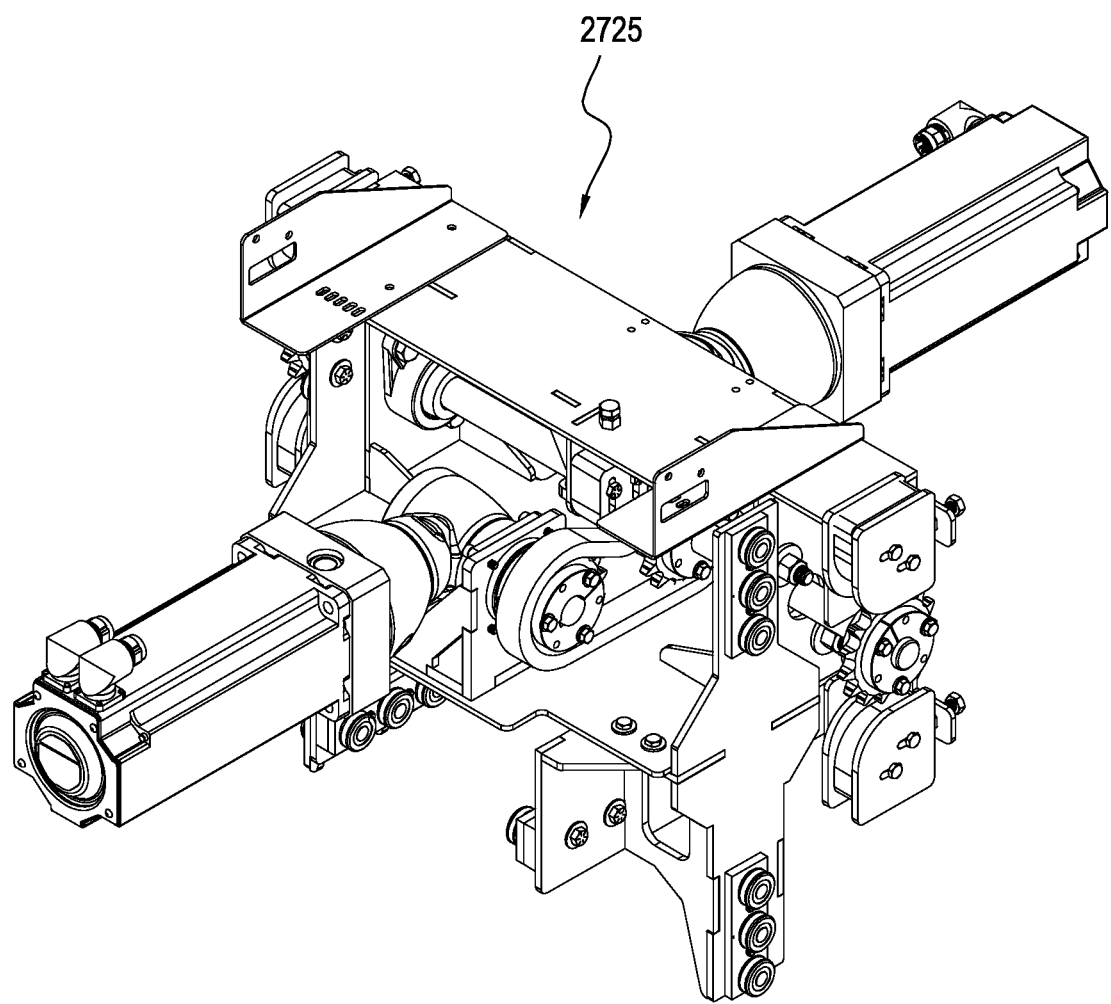
FIG. 34 shows a right perspective view of the gantry trolly assembly according to the embodiment of FIG. 33.
Figure 35:
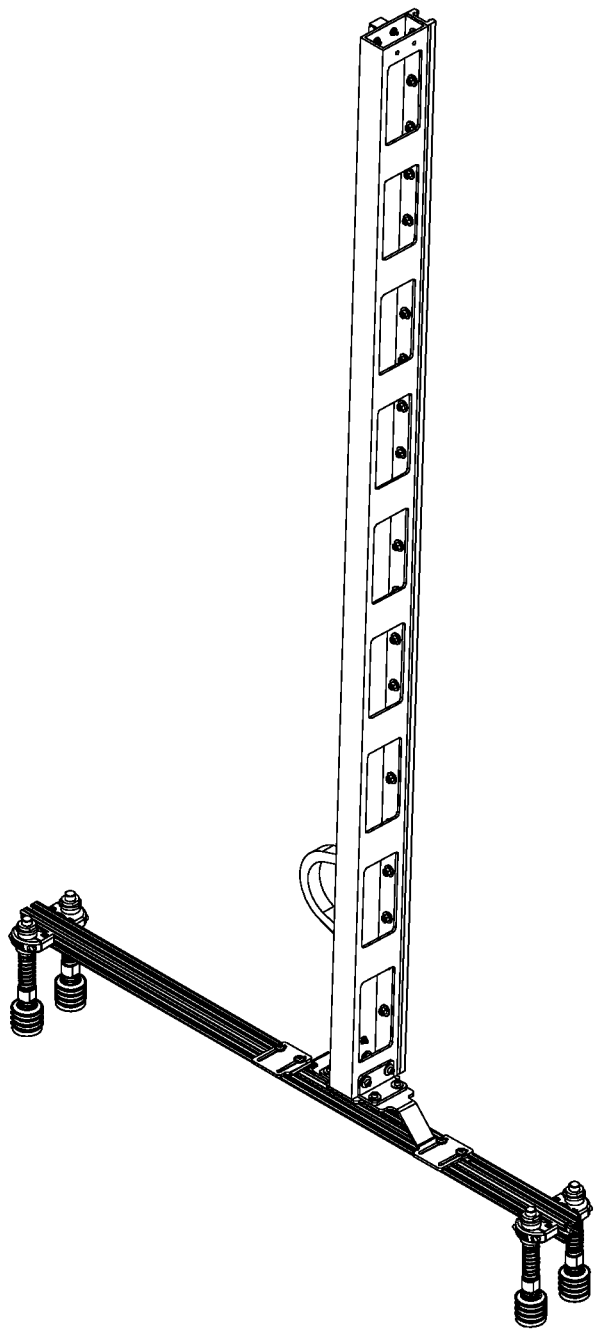
FIG. 35 illustrates a gantry arm assembly according to the embodiment of FIG. 33.

As shown in FIGS. 30 and 33, gantry assembly 2700 may travel along a portion of the pusher track assembly 2402 in a direction parallel to the feed direction of the auto bagger, parallel to the x-axis. Gantry assembly 2700 includes left and right gantry arms 2705, 2704, configured to be driven in the z-direction by drive mechanisms 2703 and 2702, respectively. Bag retrieving units 2730, 2731, are provided on a lower portion of gantry assembly 2700, coupled to a lower end of gantry arms 2703 and 2704. Bag retrieving units 2730, 2731 may have suction cups 2710 configured to grasp a bag to be retrieved from bag receptacle 2650. Other bag grasping mechanisms may be used beside suction cups, such as clamps, gripping fingers, that are configured to grasp the baling bags for displacing the bags, i.e., pick up, from a bag receptacle provided below the bag/bale gate. The movement of the gantry 2700 in the x-axis may be provided by gantry trolly 2725.

According to an embodiment, servo motors, gear or chain drivers, or various structures or assemblies may be used by gantry trolly and within the gantry assembly to provide movement of the gantry 2700 in the x-direction and movement of the gantry arms 2705, 2704 in the z-direction, to allow the gantry to receive a bag from the bag receptacle positioned below the bag/bale gate, move the bag forward to be placed around the chutes, and provide support to the open end of the bag while the bale is pushed through the chutes and into the open end of the bag.

Upon being placed inside the bag, the bag is pushed through the bale bagging station 2600 by the bale pushing apparatus, and into the sealing module 2800, wherein the open end of the bag, which faces the front of the bagging apparatus, is closed and fastened closed.

The sealing module 2800 may fasten the bag closed using tape or a heating element 2830 to close the open end of the bag around a bagged bale. Staples, pins, or other fastening mechanism may also be used to fasten the open end of the bag closed once properly folded closed within the sealing module.

Figure 41A:
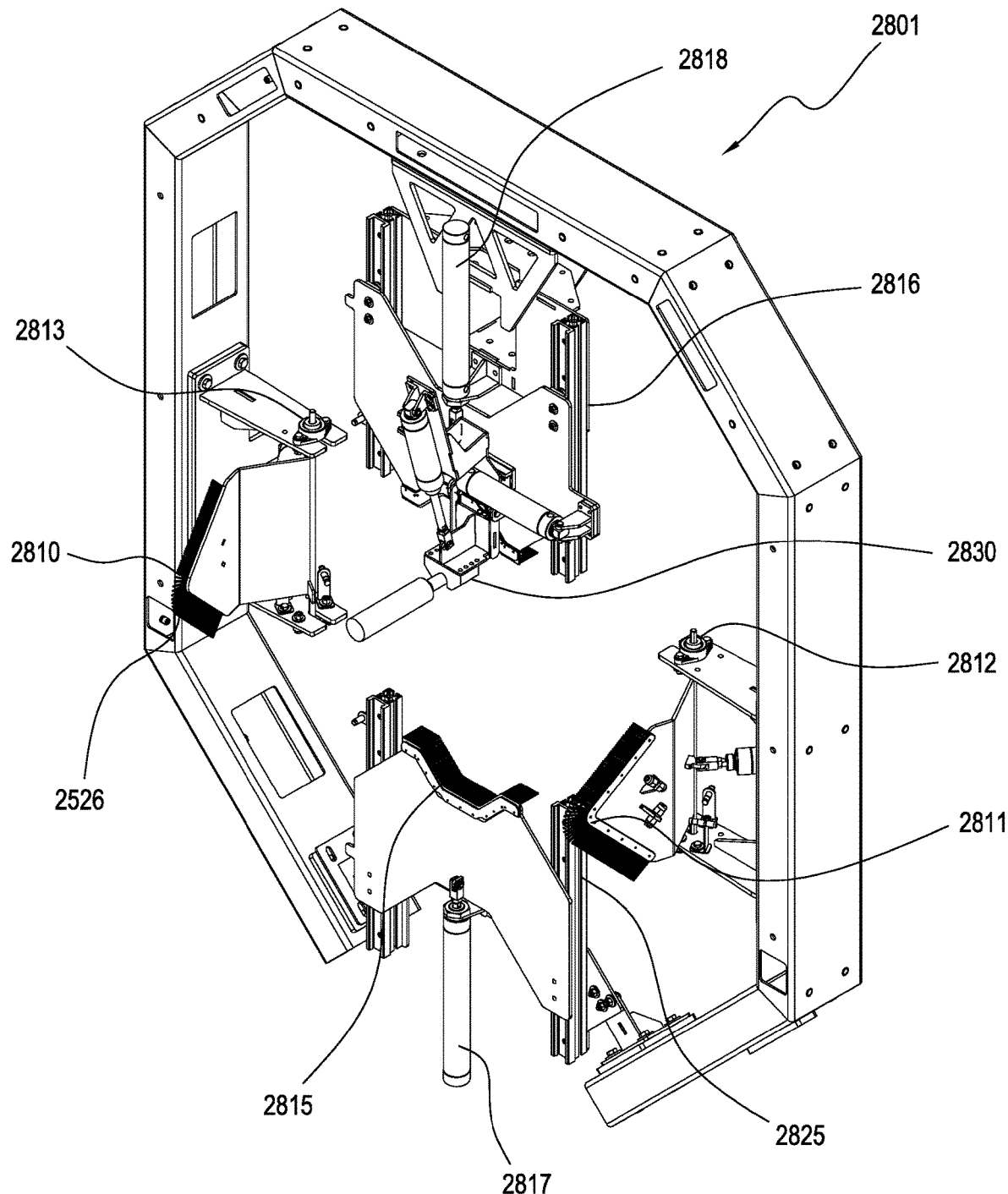
FIG. 41A shows a right perspective view of a closer assembly according to an embodiment.

The sealing module 2800 may include closure assembly 2801, which as shown in FIG. 41A, may include a left side closure 2810 and a right side closure 2811, which are made to pivot at pivot units 2813 and 2812, respectively, when pushed by actuators (not shown) to sweep the side closures 2810, 2811, to make contact with the open end of the bag, and push the side flaps together.

Sweeping side closures or the pivoting two stage side closures may be utilized to close the open end of the bag. In the two-stage side closures, the first stage may be a pivoting action swinging the side closures in to make contact with the open bag, and the second stage being an extension of the side closures pushing the flaps to together.

The angled edges 2825, 2826 of side closures 2810, 2811, provide a useful edge shape to bring the side flaps of the bag together. When the side flaps of the open end of the bag are brought together, the bottom portion of the bag may then be formed over the folded side flaps by bottom folding unit 2815, when pushed by actuator 2817. Upon folding the bottom flap over the folded side flaps, the top folding unit 2816, pushed by actuator 2818, may push the last flap, the top flap over the bottom and side flaps. The top flap may be fastened closed in various ways, although a heat element 2830 may be preferable, to heat seal the top flap closed.

Although in this embodiment, the bottom flap is described as being folded before folding and scaling the top flap, the order of the top flap and bottom flap may be reversed, with the top flap being folded first and the bottom flap being folded and then sealed or fastened to the top flap. Similarly, the bottom and top flaps may be folded in either order (top then bottom or bottom then top), then either the left or right side flap can be folded over the bottom and top flaps, and the other of the left or right side flap can be folded over and heat-sealed or otherwise fastened to the other folded flaps.

Figure 43:
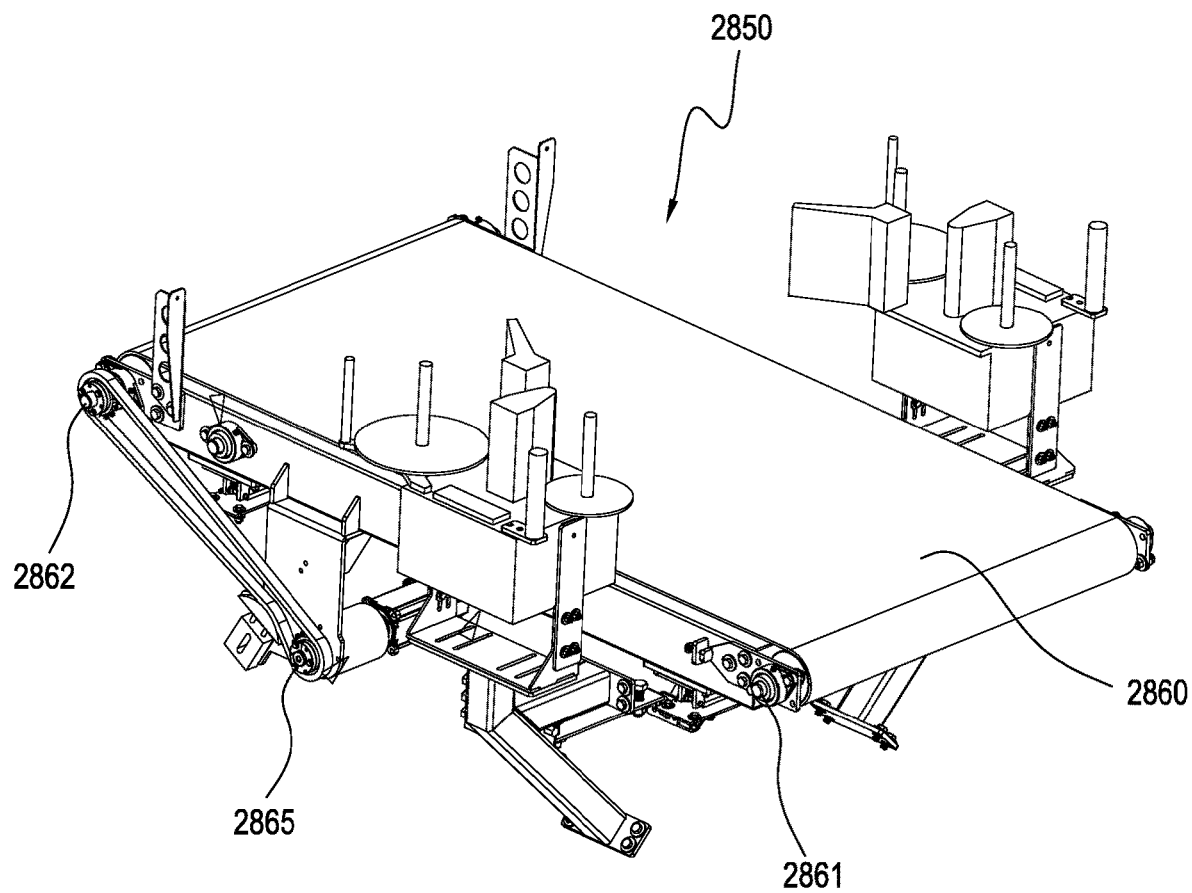
FIG. 43 illustrates a perspective view of a weigh table assembly according to the embodiment of FIG. 42.

Upon fastening the open end of the bag closed by the closure assembly, the bagged bale can be weighed within the sealing module 2800 on weight table assembly 2850, as shown in FIG. 43. The weight table assembly may include a support structure that supports the bagged bale and may include a scale to weigh the scale. In one embodiment that is not shown, rails may be provided that extend in the x-direction, which allow the bagged bale 2002 to be slid across the weight table assembly. In another embodiment, may include a non-slip belt 2860, driven by belt drive unit 2865 around rollers 2861 and 2862. Other final processing steps, such as labelling, printing, and label scanning may also be performed to the bagged bale, while it is located within the scaling module 2800.

Figure 44:
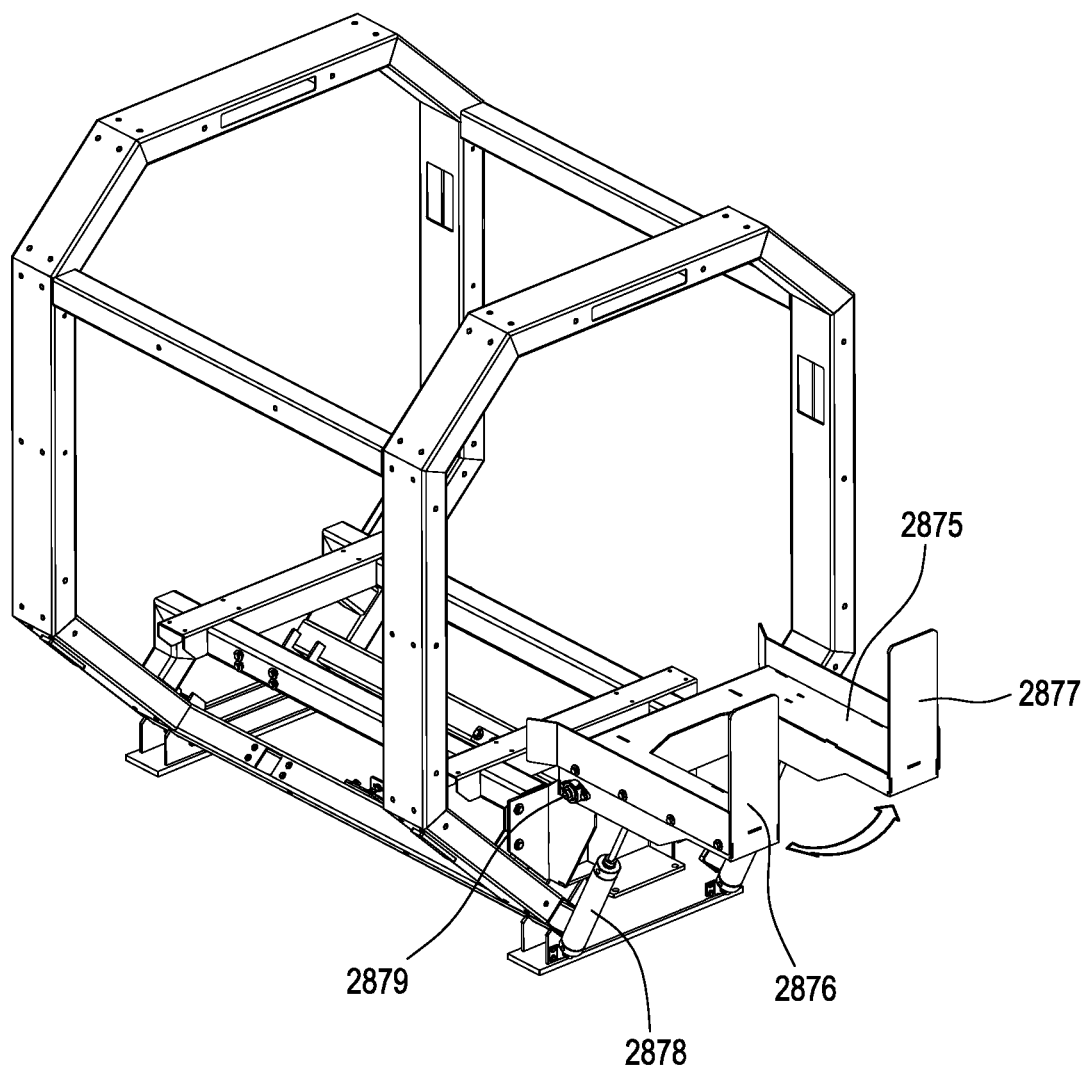
FIG. 44 illustrates a perspective view of a bale drop unit assembly according to the embodiment of FIG. 42.

As shown in FIG. 44, when all processing of the bagged bale 2002 is performed, bagged bale 2002 may be moved along the x-direction by movement of non-slip belt 2860 until the bale makes contact with feet 2876, 2877 of bale drop unit 2875. Actuator 2879 may drive a pivot motion, as shown by the arced arrow below the bale drop unit 2875, pivoting around pivot point 2879.

Figure 41C:
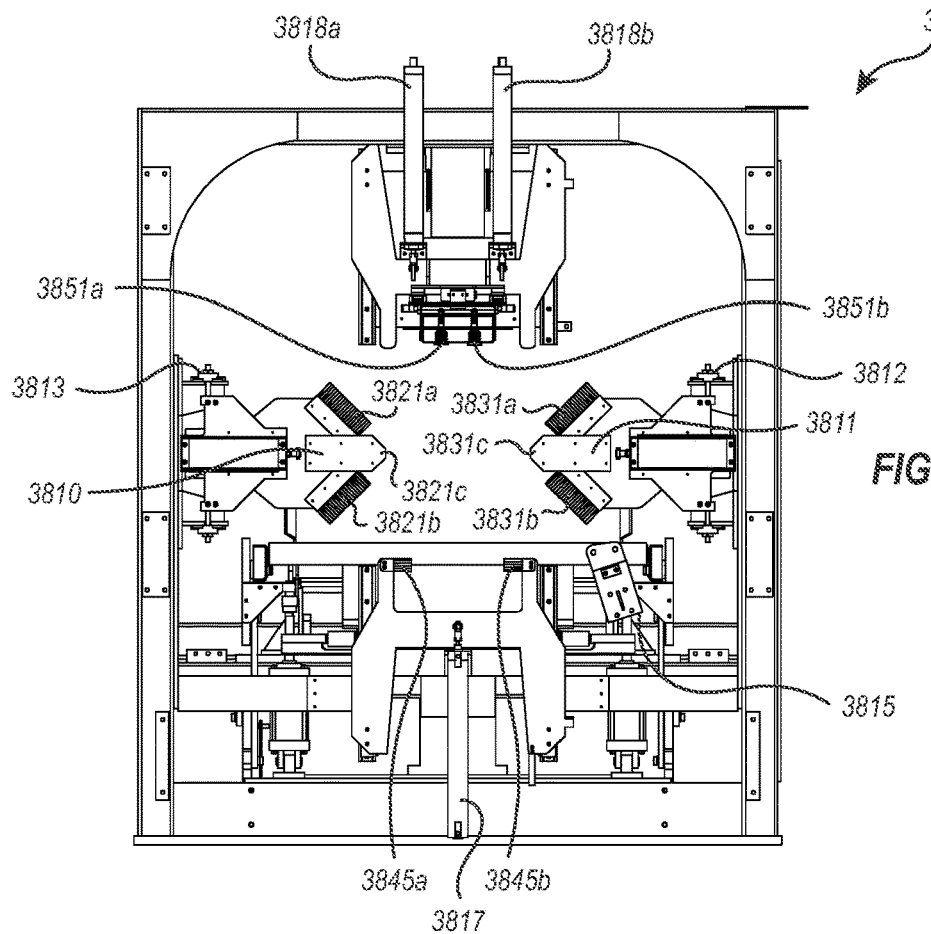
FIG. 41C shows a front view of the closer assembly according the embodiment of FIG. 41B along a longitudinal axis of the bale bagging apparatus.
Figure 41D:
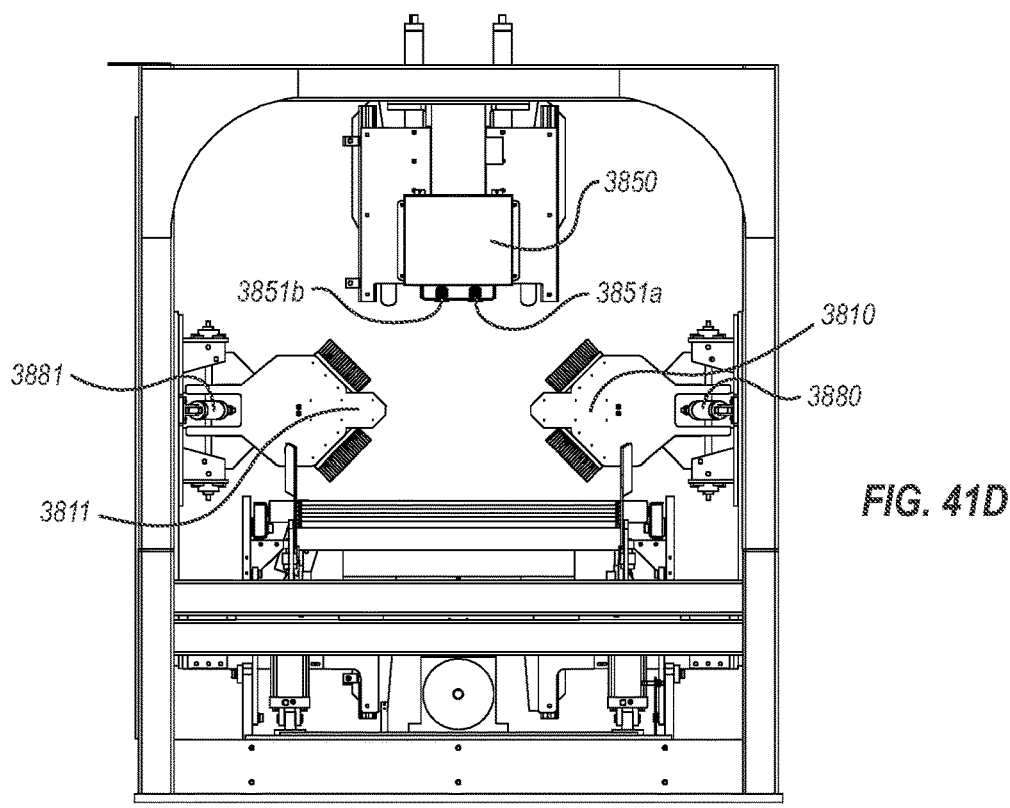
FIG. 41D shows a back view of the closer assembly according the embodiment of FIG. 41B along a longitudinal axis of the bale bagging apparatus.
Figure 42:
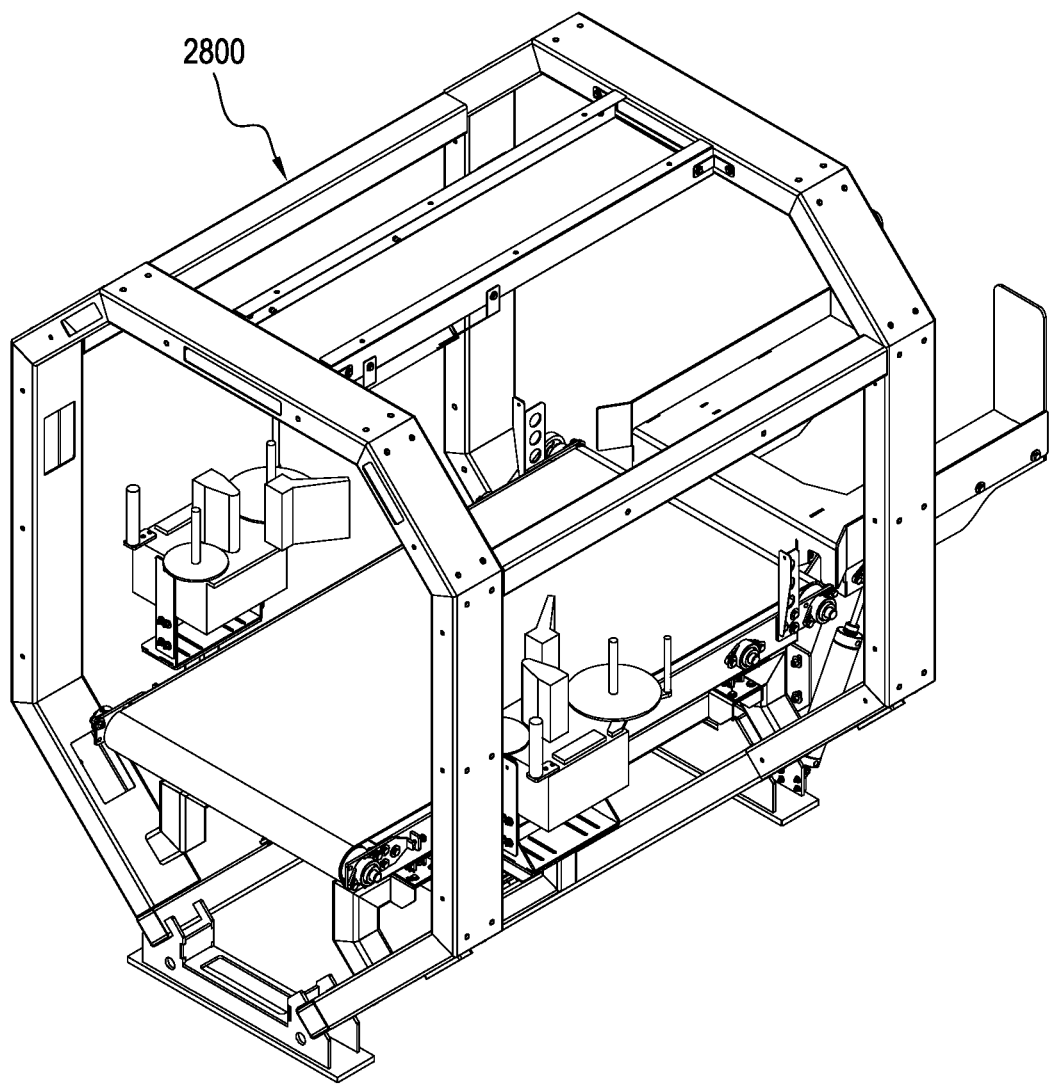
FIG. 42 shows a right perspective view of weigh and drop unit according to an embodiment.

In another embodiment, as shown in FIGS. 41B, 41C, and 41D, a sealing module 3800 may include closure assembly 3801, which as shown in FIG. 41B, may include a left side closure 3810 and a right side closure 3811, which are made to pivot inwardly at pivot units 3813 and 3812, respectively, when pushed by actuators 3880, 3881, respectively, to sweep the side closures 3810, 3811, to make contact with the open end of the bag, and push the side flaps together.

Sealing modules 2800 or 3800 may include an upper bag gripper assembly configured to grip an upper portion of the first end of the bag while the first lateral portion of the first end of the bag is folded towards a center of the bale to be bagged. The upper sealing assembly 3850 of FIGS. 41B, 41C, and 41D may suction cups 3851a and 3851b configured to grip an upper portion of the first end of the bag while a first lateral portion of the first end of the bag is folded towards a center of the bale to be bagged and/or while a second lateral portion of the first end of the bag is folded towards the center by left and right side closure 3810 and 3811, respectively. Upper sealing assembly 3850 may be moved up and down in the z-direction by one or more actuators. For example, as shown in FIGS. 41B, 41C, and 41D, actuators 3818a and 3818b may provide movement of the upper sealing assembly along respective tracks from a position to with suction cups 3851a and 3851b to make contact and hold the upper portion of the first end of the bag while a first (right) lateral portion of the first end of the bag is folded towards a center of the bale to be bagged and a second (left) lateral portion of the first end of the bag is folded towards the center by left and right side closure 3810 and 3811, respectively. While suction cups 3818a and 3818b are used in the embodiment of FIGS. 41B, 41C, and 41D, the bale bagging apparatus is not limited to suction cups. Other bag grasping mechanisms may be used beside suction cups to grip the upper portion of the open end of the bag, such as clamps, gripping fingers, or other forms of gripping mechanisms that are configured to grasp a baling bags to hold the upper portion of the baling bag in place while the side or lateral portions are folded towards the center.

The angled edges 3821a and 3821b of left side closure 3810 may be provided with brushes or flaps that are useful to bring the left side flap of the bag together towards the center, similar to the way a present is wrapped with wrapping paper. Similarly, the angled edges 3831a and 3831b of left side closure 3811 may be provided with brushes or flaps that are useful to bring the left side flap of the bag together towards the center. Center angled portions 3821c and 3831c may be provided at a central portion of the respective left and right side closures 3810 and 3811 to provide more support for the lateral bag portions when folding toward the center.

When the left and right side flaps of the open end of the bag are brought together, the bottom portion of the bag may then be formed over the folded side flaps by bottom folding unit 3815, when pushed by actuator 3817. Contact areas 3845a and 3845b are provided on bottom folding unit to contact the lower portion of the open end of the bag. Upon folding the bottom flap over the folded side flaps, the top folding unit 3816, pushed by actuators 3818a and 3818b, may push the last flap, the top flap, over the bottom and side flaps. The top flap may be fastened closed in various ways, including a heat element within upper sealing assembly 3850, which is preferable, to heat seal the top flap closed.

Although in this embodiment, the bottom flap is described as being folded before folding and sealing the top flap, the order of the top flap and bottom flap may be reversed, with the top flap being folded first and the bottom flap being folded and then sealed or fastened to the top flap. Similarly, the bottom and top flaps may be folded in either order (top then bottom or bottom then top), then either the left or right side flap can be folded over the bottom and top flaps, and the other of the left or right side flap can be folded over and heat-sealed or otherwise fastened to the other folded flaps.

The sealing module 2800 may fasten the bag closed using tape or a heating element within upper sealing assembly 3850 to close the open end of the bag around a bagged bale. Staples, pins, or other fastening mechanism may also be used to fasten the open end of the bag closed once properly folded closed within the sealing module.

Figure 45:
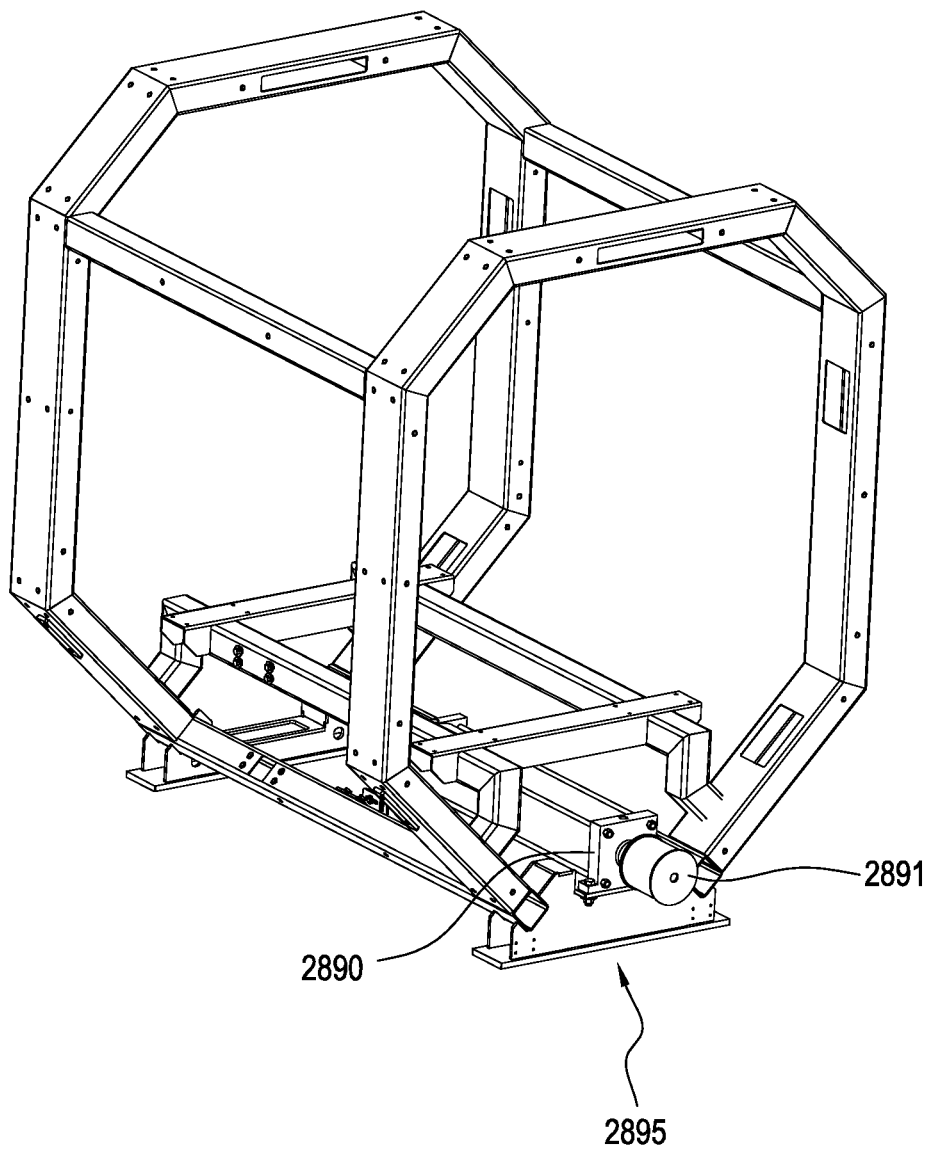
FIG. 45 illustrates a right-rear perspective view of a bale push unit according to an embodiment.

As shown in FIG. 45, according to one embodiment, when the bagged bale is dropped or pivoted to the floor, a bale push unit 2895 may be provided, which includes cylinder 2890 that pushes push head 2891. The push head 2891 pushes the bagged bale in a direction parallel with the x-axis, to remove the upright or otherwise placed bagged bale from the feet 2876, 2877 of the bale drop unit 2875. Bagged, weighed, labelled, scanned, and fully processed bale 2002 may then be moved to another location.

Figure 46A:
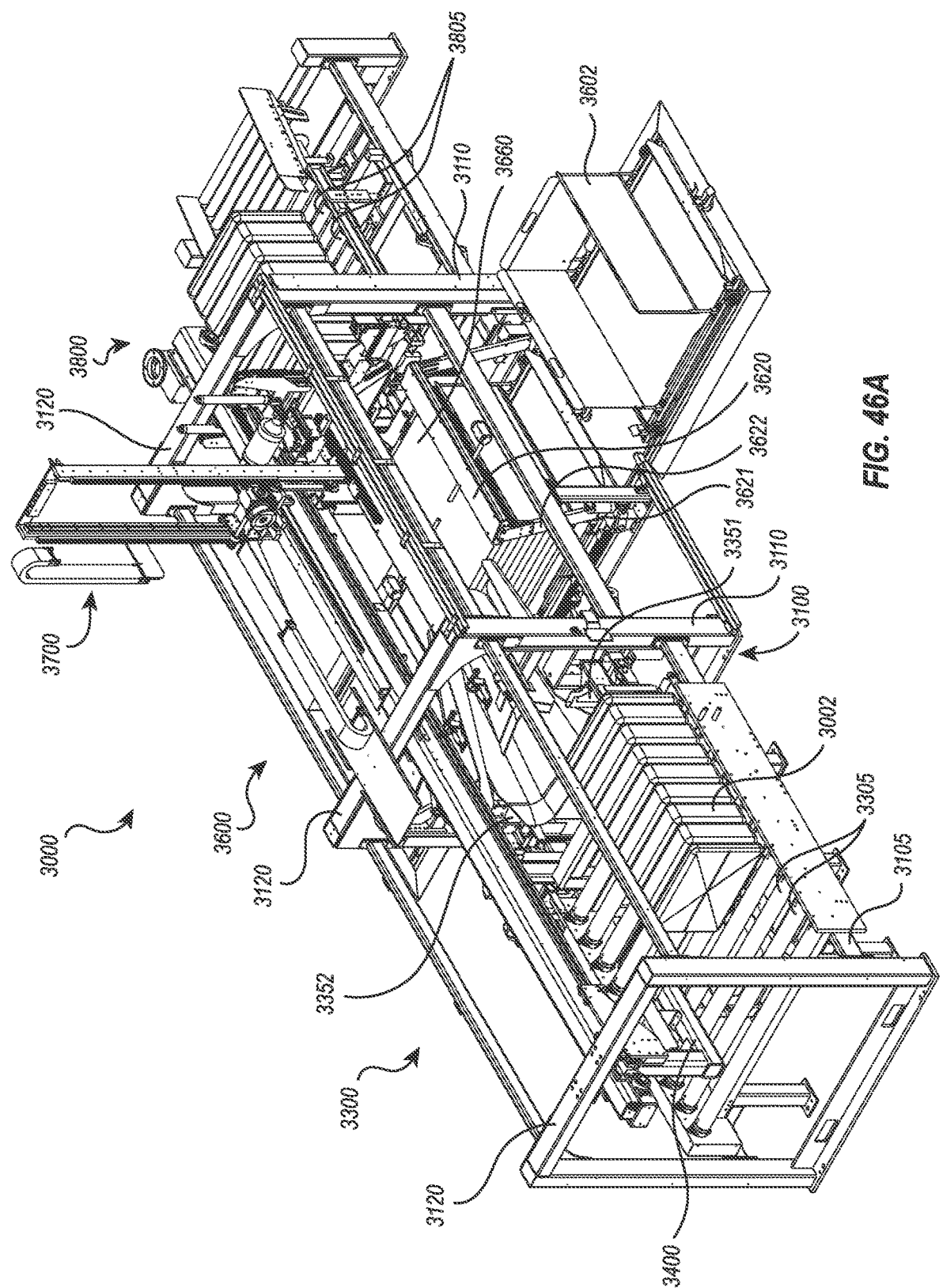
FIG. 46A illustrates right-front perspective view of a bale bagging apparatus according to another embodiment.
Figure 46B:
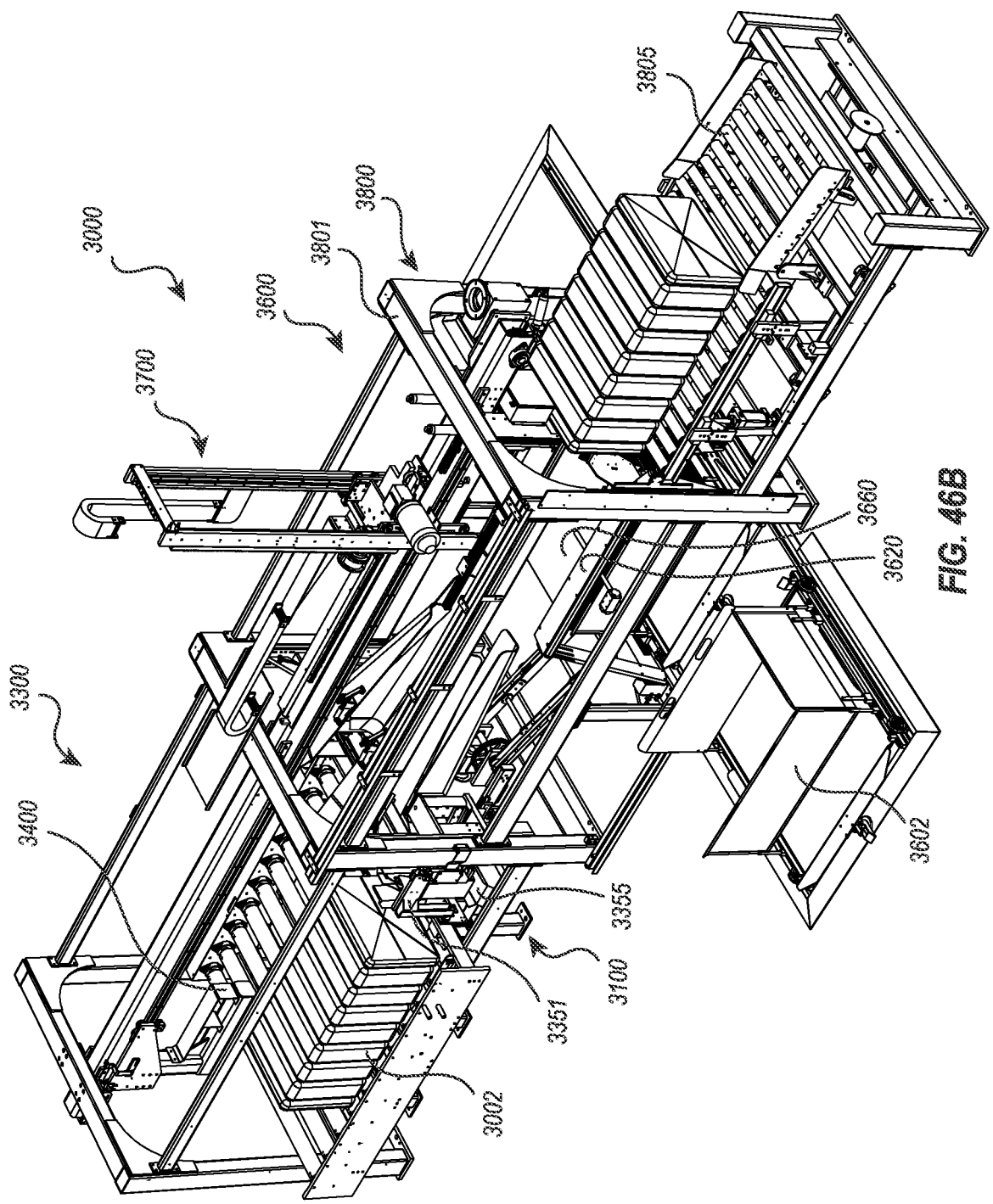
FIG. 46B illustrates right-back perspective view of the bale bagging apparatus according to the embodiment of FIG. 46A.

Another embodiment is of a bale bagging apparatus is shown in FIGS. 46A, 46B, and 46C. In the embodiment of FIG. 46A, another bale bagging machine or apparatus 3000 includes a bale feeding station 3300 as a first module on a first or front end of the bale bagging machine 3000. The bagging machine further includes a subsequent sealing module 3800 on a second or back end of the bagging apparatus 3000. The bagging apparatus 3000 further includes a bale chute 3500, a gantry 3700, and a bale bagging station 3600 between the first and second ends of the bale bagging machine 3000. A bale sampling station 3100 may be included in the bale feeding station 3300, or the bale sampling station 3100 may be considered to be between the bale feeding station 3300 and the bale bagging station 3600. Bale sampling station 3100 may include right sampling assembly 3351 and left sampling assembly 3352, arranged on opposite sides of the longitudinal axis of the bale bagging apparatus, or on opposite sides of a path that a bale to be bagged 3002 will travel as the bale 3002 is pushed from along the longitudinal axis of the bale bagging apparatus 3000.

As shown in FIGS. 46A, 46B, and 46C, the bale bagging apparatus 3000, as described herein, may be aligned along Cartesian coordinates with an x-axis, y-axis, and z-axis, similar to the bale bagging apparatuses described herein. As the bale is processed through the bale bagging apparatus 3000 it travels along what sill be termed herein as the x-axis, or in other words, along a longitudinal axis of the bale bagging apparatus, as the bale to be bagged 3002 passes into the bale feeding station 3300, through the bale bagging station, and into the sealing module 3800. The y-axis may be considered to extend perpendicularly to the x-axis and may lie in a plane parallel to the floor on which the bale bagging apparatus 3000 is positioned. The z-axis may be considered to extend perpendicularly to the plane of the floor on which the bagging apparatus 3000 is placed, the z-axis also being perpendicular to the x-axis and to the z-axis.

The bale bagging apparatus 3000 may have bottom frame members 3105 and vertical support members 3110. The bagging apparatus 3000 may also have top support members 3120 extending horizontally from vertical support members 3110 across the various processing stations or modules 3300, 3600, and 3800. Panel portions, not shown, may then be attached to the vertical support members 3110 and top support members, to shield an operator from the internal mechanisms of the bagging apparatus 3000. Access doors may be located at the front end of the bale bagging apparatus 3000 to provide access to the bale feeding station or other mechanisms located on the front end of the bale bagging apparatus 3000. Other various access portions may be provided on the outer cover of the bale bagging apparatus to provide access for an operator to the internal mechanisms of the bale bagging apparatus.

The bottom frame members 3105, vertical support members 3110, and top support members 3120 may have a solid or hollow beam and/or two linear bars or beams to create a frame that has the linear bars or beams positioned in parallel to the longitudinal feed direction and connected transversely by feet for supporting the base. The bottom frame member 3105, vertical support members 3110, and top support members 3120 may be made from steel, ferrous alloys, composite materials, or other material that can be used to support the stations and bale during the bale bagging operation.

Additionally, the bottom frame members 3105, vertical support members 3110, and top support members 3120 may support a top-mounted bale pusher assembly 3400. The bale pusher assembly is configured to push a bale to be bagged along the x-axis direction of the auto bagger apparatus 3000, from the bale feeding station 3300, through the bale bagging station 3600, to the sealing module 3800. Although in the embodiment of FIGS. FIGS. 46A, 46B, and 46C, the bale pusher assembly 3400 may be a top-mounted bale pusher assembly 3400 with a pusher head assembly extending down, the top-mounted bale pusher assembly 3400 being coupled to top support members 3120, a bale pusher assembly may also be a bottom-mounted bale pusher assembly, coupled to a lower portion of the bale bagger apparatus with a pusher head assembly extending upwards.

Alternatively, the bale pusher may be a side-mounted bale pusher assembly. Whether top-mounted, bottom-mounted, or side mounted, the bale pusher assembly may include a pusher track assembly. A drive mechanism may be configured to drive the pusher head assembly along the pusher track assembly in the direction of the x-axis, to move a bale to be bagged and processed along the x-axis. Although the bale pusher assembly is described herein as a means of moving the bale along the x-axis, the bale bagging apparatus is limited solely thereto, but may include other means of pushing, pulling, or otherwise moving a bale to be processed along the x-axis of the auto bagger 2000.

The bale feeding station 3300 may include a series of rollers 2305 aligned in the x-y plane and extending generally in a direction perpendicular to both the x-axis and the x-axis. A bale to be bagged may be fed into the bale feeding station from a position aligned on the x-axis (front a most front end) or from a direction parallel to the y-axis (from a lateral side of the bale feeding station 3300). The bale to be bagged 3002 may be received in a direction parallel to the x-direction or and aligned with the feed direction of the auto-bagger or offset from the feed direction of the auto-bagger in the y-direction or even the z-direction. The bale feeding station 3300 may alternatively receive the bale to be bagged 3002 from a direction having a component in the z-direction, or be received from an input located above the bale feeding station 3300.

Rollers 3305 may be coupled to a frame using pins or other fastening devices to allow the rollers to rotate in a direction transverse to the feed direction (x-axis) of the auto bagger 3000. Alternatively, instead of rollers 3305, the bale feeding station may include stationary rails having a low-friction material along a top or exposed contact surface, along which the bale to be bagged 3002 may be slid. Alternatively, the bale feeding station 3300 may simply be a planar surface with support to maintain the bale to be bagged in an elevated position aligned with the other modules of the auto-bagger apparatus.

As seen, for example, in FIGS. 46A, 46B, and 46C, the bale pusher 3400 may have a start position near the bale feeding station 3300. The bale pusher 2400 may have a pusher head assembly, a pusher track assembly, and a driving mechanism for moving the bale pusher head assembly from the bale feeding section 3300 to the bagging station 3600 and to the sealing module 3800, and then back to the bale feeding section 3300. The pusher track assembly couples the pusher head assembly to the driving mechanism to allow the pushing of the bale in the longitudinal feed direction along the x-axis.

The pusher head assembly of the bale pusher assembly 3400 may have a planar face that runs transversely to the longitudinal feed direction. The planar face may have a surface contact area that allows the distribution of force on the pushed bale, so that the pushed bale is not damaged. Alternatively, the pusher head assembly of the bale pusher assembly 3400 may have a curved contact surface to further ensure contact is made with the bale to be bagged. The pusher head assembly and pusher track assembly may be made from steel, metal alloys, composites, and other material that is designed for moving loads.

The driving mechanism of the bale pusher assembly may move the bale pusher 3400 along a linear drive track coupled to the bottom frame member linearly in the longitudinal feed direction. The driving mechanism can be driven by a servo gear motor that drives a rack (not shown), i.e., a gear, along a pinion (not shown) on the pusher track assembly. Alternatively, other drive mechanisms may be used to move the driving mechanism along the linear drive track, such as, chains, pulleys, or similar devices.

Bale bagging station 3600 may include rails 3620 and 2621 arranged above a stack of bags to be placed over bales. Rails 3620 and 2621 may define an opening 3660 through which bags to be placed around chute 3500 are retrieved by a bag retrieval system on a lower side of gantry 3700. Each of rails 3620 and 3623 may be supported by respective movable vertical supports 3622. Each of vertical supports 3622 may be pivotable at pivot point 3621 to provide an arcuate movement by being pushed by an actuator when a bale is not arranged on a top, low-friction contact surface of rails 3620 and 3623 so as to enlarge the opening 3660 through which the bags are to be retrieved. According to another embodiment, the rails are stationary with respect to the support members 3622, are positioned at such a position as to provide a sufficient gape or opening 3660 through which a bag to be used in the bagging of the bale may be retrieved, while still providing sufficient vertical support for the bale to be bagged.

According to an embodiment, when the gantry 3700 is to obtain a bag to be placed around the bag to be baled 3002, rails 3620, 3623 of bag/bale gate 3601 may be pushed by actuator(s) to a position toward the outer edge of the bagging station 3600, to provide space through which to retrieve the bag through gap or opening 3660. Then, after the bag is retrieved, the rails 3620, 3623 may be pushed backed toward a center line of the bag bail gate to allow the bale to be bagged to slide across the top surfaces of rails 3620, 3623.

In one example where a larger opening 3660 is required, for example, in the case that larger bag is to be used to bag the bale, for example, in the case that a non-gusseted bag is used, the non-gusseted bag has a larger cross section area, when viewed in the top-plan view, and thus a larger opening 2660 is preferable.

Bale bagging apparatus may be provided with a rolling bag receptacle 3602 within the lower portion of the bale bagging station 3600. The rolling bag receptacle 3602 may be configured to roll out from a position below the opening 3660 for placement of a stack of bags. Alternatively, the bale bagging apparatus 3000 may be configured and spaced so below the bale bagging station 3600 to have a pallet of bags to be used by the bagging apparatus.

Gantry assembly 3700 may travel along a portion of the pusher track assembly in a direction parallel to the feed direction of the auto bagger, parallel to the x-axis. Gantry assembly 3700 includes left and right gantry arms, configured to be driven in the z-direction by drive mechanisms, respectively. Bag retrieving units may be provided on a lower portion of gantry assembly 3700, coupled to a lower end of gantry arms. Bag retrieving units may have suction cups configured to grasp a bag to be retrieved from bag receptacle 3602. Other bag grasping mechanisms may be used beside suction cups, such as clamps, gripping fingers, that are configured to grasp the baling bags for displacing the bags, i.e., pick up, from a bag receptacle provided below the bag/bale gate. The movement of the gantry 3700 in the x-axis may be provided by gantry trolly.

According to an embodiment, servo motors, gear or chain drivers, or various structures or assemblies may be used by gantry trolly and within the gantry assembly to provide movement of the gantry 3700 in the x-direction and movement of the gantry arms in the z-direction, to allow the gantry to receive a bag from the bag receptacle positioned below the bag/bale gate, move the bag forward to be placed around the chutes, and provide support to the open end of the bag while the bale is pushed through the chutes and into the open end of the bag.

Upon being placed inside the bag, the bale 3002 is pushed through the bale bagging station 3600 by the bale pushing apparatus 3400, and into the sealing module 3800, wherein the open end of the bag, which faces the front of the bagging apparatus, is closed and fastened closed.

The sealing module 3800 may fasten the bag closed using tape or a heating element within sealing element 3850 to close the open end of the bag around a bagged bale. Staples, pins, or other fastening mechanism may also be used to fasten the open end of the bag closed once properly folded closed within the sealing module. The bagged bale may then roll along a series of rollers 3805 arranged transverse to the longitudinal axis of the bale bagging apparatus. In one embodiment, as shown in FIGS. 46B and 46C, at least a latter portion of the series of rollers 3805 are arranged along a plane that is angled to the horizontal plane, or in other words, angled with respect to the x-y plane such that upon being sealed within the bag, the bales travels at least in part, under the force of its own weight to exit the bale bagging apparatus 3000.

Although the above embodiments describe a bale bagging apparatus configured to bale a cotton bale, the disclosure is not limited to bagging a cotton bale, but can be equally applied to bagging a bale of any fibrous material, for example a bale of agricultural products, such as, but not limited to, wool, cotton, hemp, flax, etc., or other fibrous materials, either naturally or synthetically produced.

Additionally, while the methods of operation have been discussed above in detail, the sequence of the steps is not limited to the above described method. In fact, the sequence of the steps can be performed in any order as needed for the bale bagging operation.

The invention claimed is:

1. A bale bagging apparatus comprising:
a bale feeding station;
a bale chute;
a bale bagging station; and
a transportation system configured to transport a bale to be bagged from the bale feeding station through the bale chute and into the bale bagging station,
wherein the bale bagging station includes a bag receptacle, a first opening, and a bag retrieval assembly, the bag retrieval assembly being configured to retrieve a bag from the bag receptacle through the first opening,
wherein the bag retrieval assembly is configured to position a first end of said bag around at least a portion of the bale chute before the bale to be bagged is transported through the bale chute by the transportation system, and
wherein the bale bagging station includes one or more support members configured to support the bale to be bagged, and wherein the one or more support members define at least in part the first opening.

2. The bale bagging apparatus according to claim 1, the first opening being defined by a first rail and a second rail, the bag receptacle being positioned on a side opposite of the first opening from the side of the first opening on which the bale to be bagged is to be transported.

3. The bale bagging apparatus according to claim 1, further comprising a sealing module configured to close the first end of said bag after the bale to be bagged has been placed into said bag.

4. The bale bagging apparatus according to claim 3, wherein the sealing module includes at least a first closure arm and a second closure arm, the first closure arm configured to fold a first portion of the first end of the bag towards a center of the bale to be bagged and the second closure arm folding a second portion of the first end of the bag towards the center of the bale to be bagged.

5. The bale bagging apparatus according to claim 4, wherein the first closure arm includes a first brush that contacts the first portion of the bag while the first portion of the bag is folded towards the center of the first end of the bale to be bagged, and the second closure arm includes a second brush that contacts the second portion of the bag while the second portion of the bag is folded towards the center of the second end of the bale to be bagged.

6. The bale bagging apparatus according to claim 3, wherein the sealing module includes an upper bag gripper configured to grip an upper portion of the first end of the bag while a first lateral portion of the first end of the bag is folded towards a center of the bale to be bagged.

7. The bale bagging apparatus according to claim 1, further comprising a sampling station that includes a first gripper and a second gripper, the first gripper being configured to obtain a first bale sample from a first side of the bale to be bagged and the second gripper being configured to obtain a second bale sample from a second side of the bale to be bagged, the first side of the bale to be bagged being opposite from the second side of the bale to be bagged.

8. The bale bagging apparatus according to claim 7, further comprising a bale sample conveyor system that conveys the obtained first bale sample and second bale sample to a bale sample processing station.

9. The bale bagging apparatus according to claim 1,
wherein the bag receptacle is positioned below the first opening,
wherein the first opening is provided between a first rail and a second rail, and the first rail and the second rail are support rails configured to support the bale to be bagged when the bale to be bagged is transported past the opening.

10. The bale bagging apparatus according to claim 1, wherein the one or more support members includes two support members configured to support the bale to be bagged, and wherein the two support members define at least in part the first opening.

11. A bale bagging method comprising:
providing a bale bagging apparatus according to claim 1;
retrieving a bag from the bag receptacle through the first opening;
positioning a first end of said bag around at least a portion of the bale chute before the bale to be bagged is transported through the bale chute by the transportation system; and
transporting a bale to be bagged from the bale feeding station through the bale chute and into the bale bagging station.

12. A bale bag sealing apparatus configured to seal a bag arranged around a bale, the bale sealing apparatus comprising:
a first closure arm and a second closure arm, the first closure arm being configured to fold a first portion of the bag towards a center of a first end of the bale to be bagged and the second closure arm being configured to fold a second portion of the bag towards the center of the first end of the bale; and
a first folding unit configured to fold a third portion of the bag towards the center of the first end of the bale; and
a second folding unit configured to fold a fourth portion of the bag towards the center of the first end of the bale,
wherein the first portion of the bag is arranged at a first lateral side of the bale and the second portion of the bag is arranged at a second lateral side of the bale, the first lateral side of the bale being opposite from the second lateral side of the bale, and
wherein the first closure arm includes a first pivoting unit configured to sweep the first closure arm to make contact with the first portion of the bag and push the first portion of the bag towards the center of a first end of the bale to be bagged, and the second closure arm includes a second pivoting unit configured to sweep the second closure arm to make contact with the second portion of the bag and push the second portion of the bag towards the center of a second end of the bale to be bagged.

13. The bale bag sealing apparatus according to claim 12, wherein the first portion of the bag is arranged at a first lateral side of the bale and the second portion of the bag is arranged at a second lateral side of the bale, the first lateral side of the bale being opposite from the second lateral side of the bale.

14. The bale bag sealing apparatus according to claim 13, wherein the third portion of the bag is a bottom portion of the bag and the fourth portion of the bag is a top portion of the bag.

15. The bale bag sealing apparatus according to claim 14, wherein the second folding unit includes a bag gripper configured to grip the fourth portion of the bag to push the fourth portion of the bag down towards the center of the first end of the bale.

16. The bale bag sealing apparatus according to claim 12, wherein the first closure arm includes a first pivoting unit configured to sweep the first closure arm to make contact with the first portion of the bag and push the first portion of the bag towards the center of a first end of the bale to be bagged, and the second closure arm includes a second pivoting unit configured to sweep the second closure arm to make contact with the second portion of the bag and push the second portion of the bag towards the center of a second end of the bale to be bagged.

17. The bale bag sealing apparatus according to claim 12, wherein the first closure arm includes a first angled edge that contacts the first portion of the bag while the first portion of the bag is folded towards the center of the first end of the bale to be bagged, and the second closure arm includes a second angled edge that contacts the second portion of the bag while the second portion of the bag is folded towards the center of the second end of the bale to be bagged.

18. The bale bag sealing apparatus according to claim 12, wherein the first closure arm includes a first flap that contacts the first portion of the bag while the first portion of the bag is folded towards the center of the first end of the bale to be bagged, and the second closure arm includes a second flap that contacts the second portion of the bag while the second portion of the bag is folded towards the center of the second end of the bale to be bagged.

19. The bale bag sealing apparatus according to claim 12, further comprising a heating element configured to heat seal a portion of at least one of the first, second, third, or fourth portions of the bag to fasten the bag closed.

20. The bale bag sealing apparatus according to claim 12, wherein the first pivoting unit is configured to pivot the first closure arm with an arcuate movement generally in a plane that is parallel to a plane of the top of the bale to be bagged.

21. The bale bag sealing apparatus according to claim 20, wherein the second pivoting unit is configured to pivot the second closure arm with an arcuate movement generally in a plane that is parallel to the plane of the top of the bale to be bagged.

22. The bale bag sealing apparatus according to claim 12, wherein the first pivoting unit is configured to pivot the first closure arm with an arcuate movement generally in a plane that is perpendicular to a plane of the first lateral side of the bale to be bagged.

23. The bale bag sealing apparatus according to claim 22, wherein the second pivoting unit is configured to pivot the second closure arm with an arcuate movement generally in a plane that is perpendicular to a plane of the second lateral side of the bale to be bagged.

24. The bale bag sealing apparatus according to claim 12, wherein the first closure arm includes a first brush that contacts the first portion of the bag while the first portion of the bag is folded towards the center of the first end of the bale to be bagged, and the second closure arm includes a second brush that contacts the second portion of the bag while the second portion of the bag is folded towards the center of the second end of the bale to be bagged.

25. A bale bagging apparatus comprising the bale bag sealing apparatus according to claim 12.

26. A bale bagging method comprising:
   providing a bale bag sealing apparatus according to claim 12;
   folding a first portion of the bag towards a center of a first end of a bale to be bagged with a first closure arm;
   folding a second portion of the bag towards the center of the first end of the bale with a second closure arm;
   folding a third portion of the bag towards the center of the first end of the bale with a first folding unit; and
   folding a fourth portion of the bag towards the center of the first end of the bale with a second folding unit.

27. A bale bag sealing apparatus configured to seal a bag arranged around a bale, the bale sealing apparatus comprising:
   a first closure arm and a second closure arm, the first closure arm being configured to fold a first portion of the bag towards a center of a first end of the bale to be bagged and the second closure arm being configured to fold a second portion of the bag towards the center of the first end of the bale; and
   a first folding unit configured to fold a third portion of the bag towards the center of the first end of the bale; and
   a second folding unit configured to fold a fourth portion of the bag towards the center of the first end of the bale,
   wherein the first closure arm includes a first brush that contacts the first portion of the bag while the first portion of the bag is folded towards the center of the first end of the bale to be bagged, and the second closure arm includes a second brush that contacts the second portion of the bag while the second portion of the bag is folded towards the center of the second end of the bale to be bagged.

* * * * *